(12) United States Patent
Kondo

(10) Patent No.: US 10,902,763 B2
(45) Date of Patent: Jan. 26, 2021

(54) DISPLAY DEVICE, DISPLAY CONTROL METHOD, AND PROGRAM

(71) Applicant: Saturn Licensing LLC, New York, NY (US)

(72) Inventor: Masao Kondo, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 151 days.

(21) Appl. No.: 14/366,969

(22) PCT Filed: Dec. 13, 2012

(86) PCT No.: PCT/JP2012/082377
§ 371 (c)(1),
(2) Date: Jun. 19, 2014

(87) PCT Pub. No.: WO2013/099631
PCT Pub. Date: Jul. 4, 2013

(65) Prior Publication Data
US 2014/0361968 A1    Dec. 11, 2014

(30) Foreign Application Priority Data

Dec. 28, 2011 (JP) ................. 2011-288089

(51) Int. Cl.
*G09G 3/14* (2006.01)
*G09G 5/00* (2006.01)
(Continued)

(52) U.S. Cl.
CPC ............... *G09G 3/14* (2013.01); *G09G 5/003* (2013.01); *H04N 5/64* (2013.01); *H04N 21/426* (2013.01);
(Continued)

(58) Field of Classification Search
CPC ...... G09G 3/14; G09G 5/003; G09G 2340/14; G09G 2340/12; G09G 2320/08;
(Continued)

(56) References Cited

U.S. PATENT DOCUMENTS 5,594,469 A * 1/1997 Freeman .............. G05B 19/106
345/157
5,889,509 A * 3/1999 Sudo .................. H04M 1/72544
345/168
(Continued)

FOREIGN PATENT DOCUMENTS

JP         355034510 A  *  2/1993
JP        2002-077758 A     3/2002
(Continued)

OTHER PUBLICATIONS

Machine translation of JP 5-30442 (corresponding to JP355034510A).*
(Continued)

*Primary Examiner* — Patrick N Edouard
*Assistant Examiner* — Joseph P Fox
(74) *Attorney, Agent, or Firm* — Lerner, David, Littenberg, Krumholz & Mentlik, LLP

(57) ABSTRACT

The present technology relates to a display device, a display control method, and a program that enable various states of the device to be expressed in a limited region.
A television receiver set includes an indicator unit disposed at least in a part of a periphery of a display unit and including indicator configured to be lit at a predetermined luminance, and an indicator control unit configured to control lighting of the indicator. The indicator control unit performs control such that a lighting method of the indicator is changed according to passage of time. The present invention can be applied to a display device such as a television receiver set.

14 Claims, 47 Drawing Sheets

(51) Int. Cl.
  *H04N 21/488* (2011.01)
  *H04N 5/64* (2006.01)
  *H04N 21/426* (2011.01)
  *H04N 21/4788* (2011.01)
  *H04N 21/472* (2011.01)
  *H04N 21/485* (2011.01)
  *G06F 3/14* (2006.01)

(52) U.S. Cl.
  CPC ... *H04N 21/4788* (2013.01); *H04N 21/47214* (2013.01); *H04N 21/485* (2013.01); *H04N 21/4882* (2013.01); *G06F 3/1423* (2013.01); *G09G 2320/08* (2013.01); *G09G 2340/12* (2013.01); *G09G 2340/14* (2013.01)

(58) Field of Classification Search
  CPC ......... H04N 21/4788; H04N 21/47214; H04N 21/485; H04N 21/426; H04N 21/4882; H04N 5/64; H04N 1/00411; H04N 1/0477; H04N 1/00488; H04N 1/0049; H04N 1/00824; H04N 1/00405; H04N 1/2392; H04N 9/30; G06F 3/1423
  See application file for complete search history.

(56) References Cited

U.S. PATENT DOCUMENTS

| | | | |
|---|---|---|---|
| 6,348,952 B1 | 2/2002 | Jeong | |
| 8,291,335 B2 | 10/2012 | Okamoto | |
| 2002/0186144 A1* | 12/2002 | Meunier | G07B 15/00 340/4.6 |
| 2004/0032394 A1 | 2/2004 | Ayatsuka et al. | |
| 2004/0156192 A1 | 8/2004 | Kerr et al. | |
| 2007/0057876 A1* | 3/2007 | Kwon | G09G 3/3216 345/76 |
| 2008/0036575 A1* | 2/2008 | Kim | H04M 1/22 340/332 |
| 2008/0256471 A1 | 10/2008 | Okamoto | |
| 2009/0123086 A1 | 5/2009 | Iwanami et al. | |
| 2010/0091193 A1* | 4/2010 | Hoogenstraaten | G02B 6/001 348/578 |
| 2010/0165000 A1* | 7/2010 | Seuntiens | H04N 9/73 345/690 |
| 2010/0313143 A1* | 12/2010 | Jung | G06F 3/1446 715/753 |
| 2011/0051019 A1* | 3/2011 | Hardacker | H04N 5/64 348/739 |
| 2011/0267374 A1 | 11/2011 | Sakata et al. | |
| 2015/0215565 A1* | 7/2015 | Kondo | H04N 5/445 348/569 |
| 2015/0312514 A1* | 10/2015 | Kondo | H04N 5/64 348/569 |

FOREIGN PATENT DOCUMENTS

| | | |
|---|---|---|
| JP | 2005-267897 A | 9/2005 |
| JP | 2008-257442 A | 10/2008 |
| JP | 2010-166172 A | 7/2010 |
| WO | 2011073817 A1 | 6/2011 |

OTHER PUBLICATIONS

International Search Report from International Publication PCT/JP2012/082377 dated Feb. 26, 2013.

Chinese Office Action for Application No. 201280063409.7 dated Dec. 5, 2016.

Supplementary European Search Report for Application No. EP12861745, dated Jul. 29, 2015.

Japanese Office Action for Application No. 2013-551601, dated Jan. 4, 2017.

* cited by examiner

DISPLAY DEVICE, DISPLAY CONTROL METHOD, AND PROGRAM

CROSS-REFERENCE TO RELATED APPLICATION

The present application is a national phase entry under 35 U.S.C. § 371 of International Application No. PCT/JP2012/082377 filed Dec. 13, 2012, published on Jul. 4, 2013 as WO 2013/099631 A1, which claims priority from Japanese Patent Application No. JP 2011-288089, filed in the Japanese Patent Office on Dec. 28, 2011.

TECHNICAL FIELD

The present technology relates to a display device, a display control method, and a program, and particularly to a display device, a display control method, and a program that enable various states of the device to be expressed in a limited region.

BACKGROUND ART

In recent years, in a television receiver set, a frame part around a panel on which images are displayed has been gradually thinned (narrow-framed). For example, a light sensing unit of a remote controller, an indicator (lamp) that indicates power-on, standby, and the like, operation buttons for performing operations for setting functions of a main body, and the like are disposed in such a frame part in the related art (for example, refer to Patent Literature 1).

CITATION LIST

Patent Literature

Patent Literature 1: JP 2005-267897A

SUMMARY OF INVENTION

Technical Problem

However, the region in which the indicator that indicates operations and states of a display device is arranged is limited as the frame part becomes thinned, and a new method for expressing operations and the like of the display device has been demanded.

It is desirable to enable various states of a device to be expressed in a limited region.

Solution to Problem

According to the first aspect of the present technology, there is provided a display device including an indicator unit disposed at least in a part of a periphery of a display unit and including indicator configured to be lit at a predetermined luminance, and an indicator control unit configured to control lighting of the indicator. The indicator control unit performs control such that a lighting method of the indicator is changed according to passage of time.

According to the first aspect of the present technology, there is provided a display control method of a display device including an indicator unit disposed at least in a part of a periphery of a display unit and including an indicator configured to be lit at a predetermined luminance and an indicator control unit configured to control lighting of the indicator, the method including performing control such that a lighting method of the indicator is changed according to passage of time by the indicator control unit.

According to the first aspect of the present technology, there is provided a program causing a computer configured to control a display device including an indicator unit disposed at least in a part of a periphery of a display unit and including an indicator configured to be lit at a predetermined luminance, to execute a process of performing control such that a lighting method of the indicator is changed according to passage of time.

According to the first aspect of the present technology, control is performed such that a lighting method of the indicator is changed according to passage of time.

According to the second aspect of the present technology, there is provided a display device including an indicator unit disposed at least in a part of a periphery of a display unit and including an indicator configured to be lit at a predetermined luminance, and an indicator control unit configured to control lighting of the indicator. The indicator control unit sets a light emission luminance of the indicator to be a first luminance and then gradually changes the light emission luminance to a second luminance different from the first luminance.

According to the second aspect of the present technology, there is provided a display control method of a display device including an indicator unit disposed at least in a part of a periphery of a display unit and including an indicator configured to be lit at a predetermined luminance and an indicator control unit configured to control lighting of the indicator, the method including setting a light emission luminance of the indicator to be a first luminance and then gradually changing the light emission luminance to a second luminance different from the first luminance by the indicator control unit.

According to the second aspect of the present technology, there is provided a program causing a computer configured to control a display device configured to include an indicator unit disposed at least in a part of a periphery of a display unit and including an indicator configured to be lit at a predetermined luminance, to execute a process of: setting a light emission luminance of the indicator to be a first luminance and then gradually changing the light emission luminance to a second luminance different from the first luminance.

According to the second aspect of the present technology, a light emission luminance of the indicator is set to be a first luminance, and then is gradually changed to a second luminance different from the first luminance.

The display device may be an independent device, or may be an internal block constituting one device.

Advantageous Effects of Invention

According to the first and the second aspects of the present technology, various states of a device can be expressed in a limited region.

DESCRIPTION OF EMBODIMENTS

Figure 1:
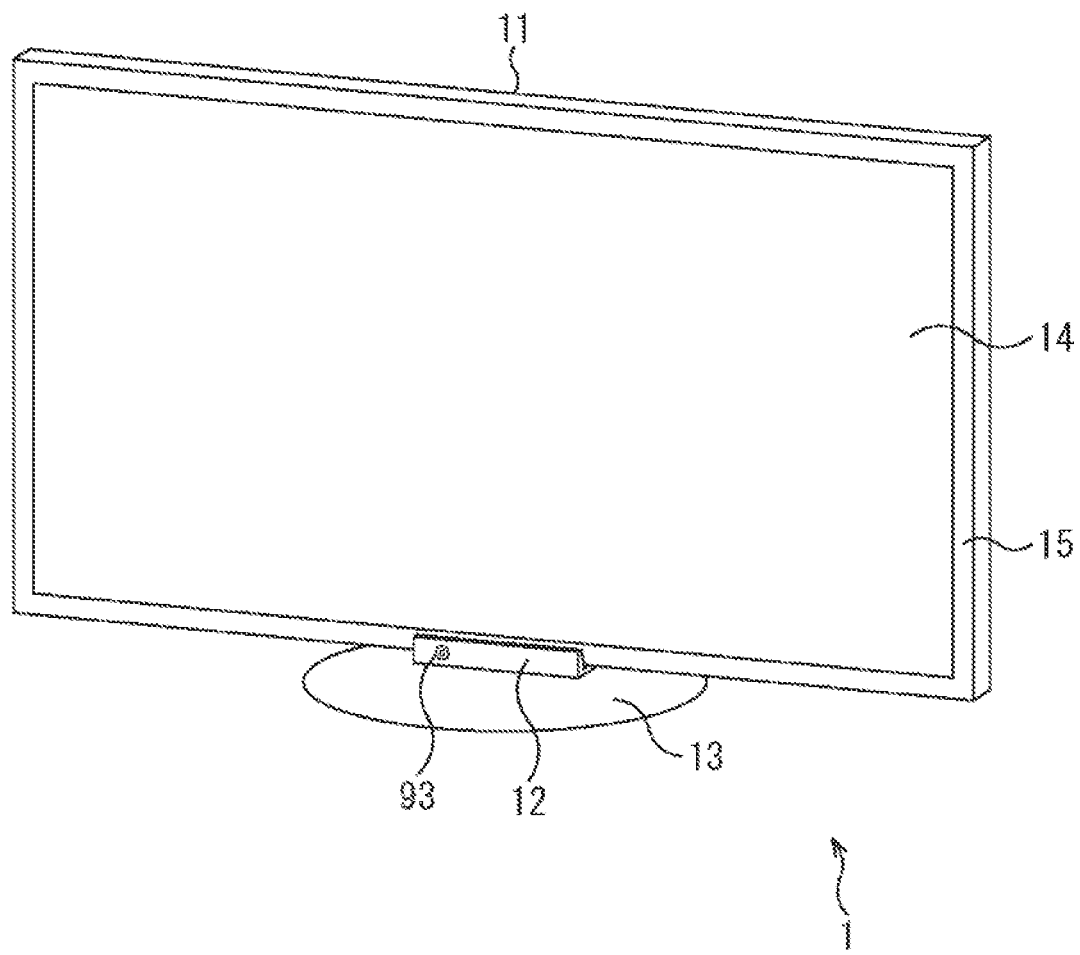
FIG. 1 is a perspective view of a television receiver set as an embodiment of a display device to which the present technology is applied.

Hereinafter, embodiments for implementing the present technology (hereinafter referred to as embodiments) will be described. Note that description will be provided in the following order.

1. Exterior configuration example of a display device
2. Control block diagram
3. Basic lighting example of an LED indicator
4. Sequential lighting example of the LED indicator
5. Lighting examples associated with image displays
6. Lighting expression of the LED indicator corresponding to an operation of a TV
7. Associated lighting expression with a screen-off operation
8. Association of a video chatting screen with the LED indicator
9. Information expression of the LED indicator based on video viewing experience
10. Associated expression corresponding to a user operation performed with respect to a smart unit
11. Flowchart for realizing an associated expression

[1. Exterior Configuration Example of a Display Device]

FIG. 1 shows an exterior configuration example of a television receiver set as an embodiment of a display device to which the present technology is applied.

The television receiver set (hereinafter referred to as a TV) 1 of FIG. 1 is constituted by a display main body 11, a smart unit 12, and a stand 13. The display main body 11 is constituted by a display 14 on which predetermined images such as received images of broadcasting programs are displayed and a frame part 15 disposed in a peripheral part thereof.

The smart unit 12 is an indicator unit that at least has an LED (Light Emitting Diode) indicator 84 (FIG. 4) as a lighting unit that indicates operations and states of the TV 1 using lighting. On a front face of the smart unit 12, a camera 93 is provided.

Note that, although the smart unit 12 is disposed in the frame part 15 on the lower side of the display main body 11 in FIG. 1, the smart unit 12 may be disposed in any portion of the frame part 15 of the upper, left, and right sides of the display main body 11. In other words, the smart unit 12 may be disposed in at least one portion on the periphery of the display 14.

A configuration of the LED indicator 84 in the smart unit 12 will be described with reference to FIGS. 2 and 3.

Figure 2:
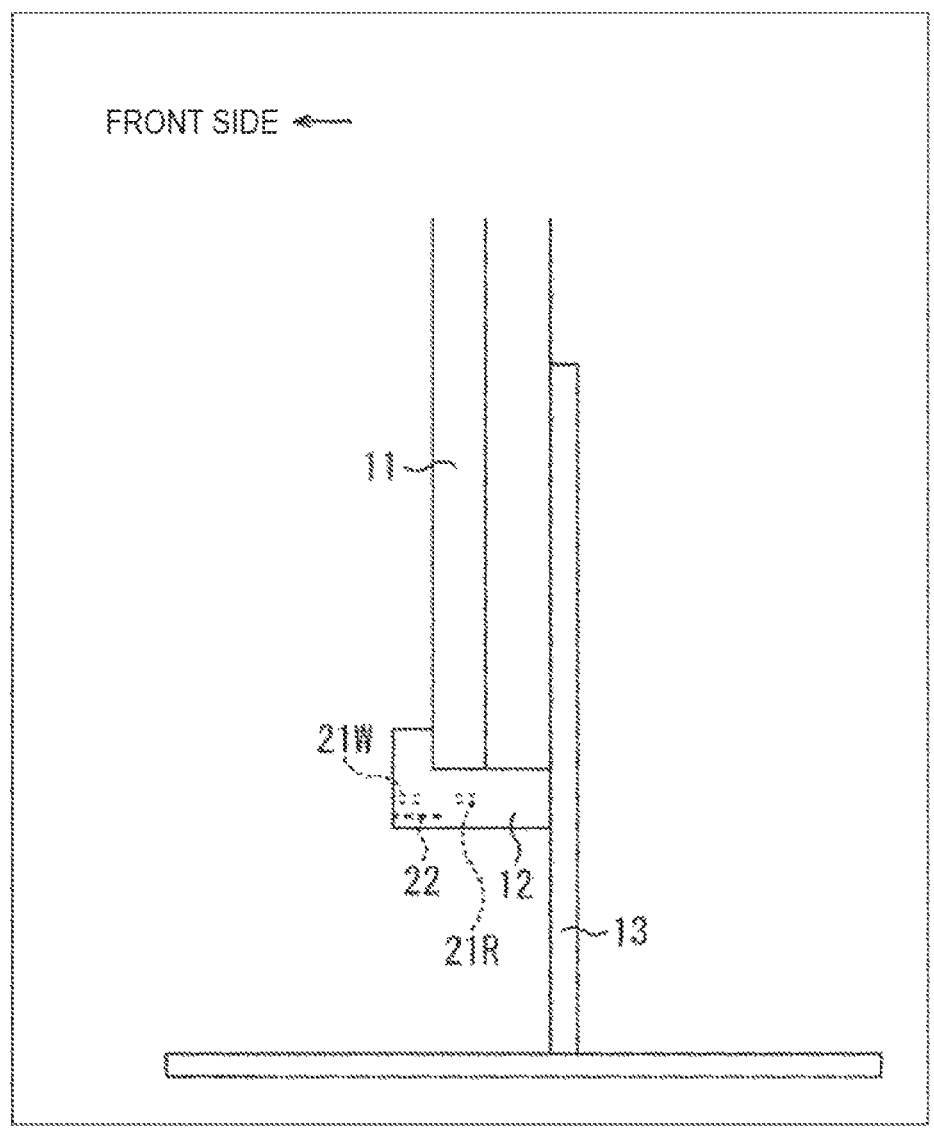
FIG. 2 is a diagram for describing a configuration of an LED indicator in a smart unit.
Figure 3:
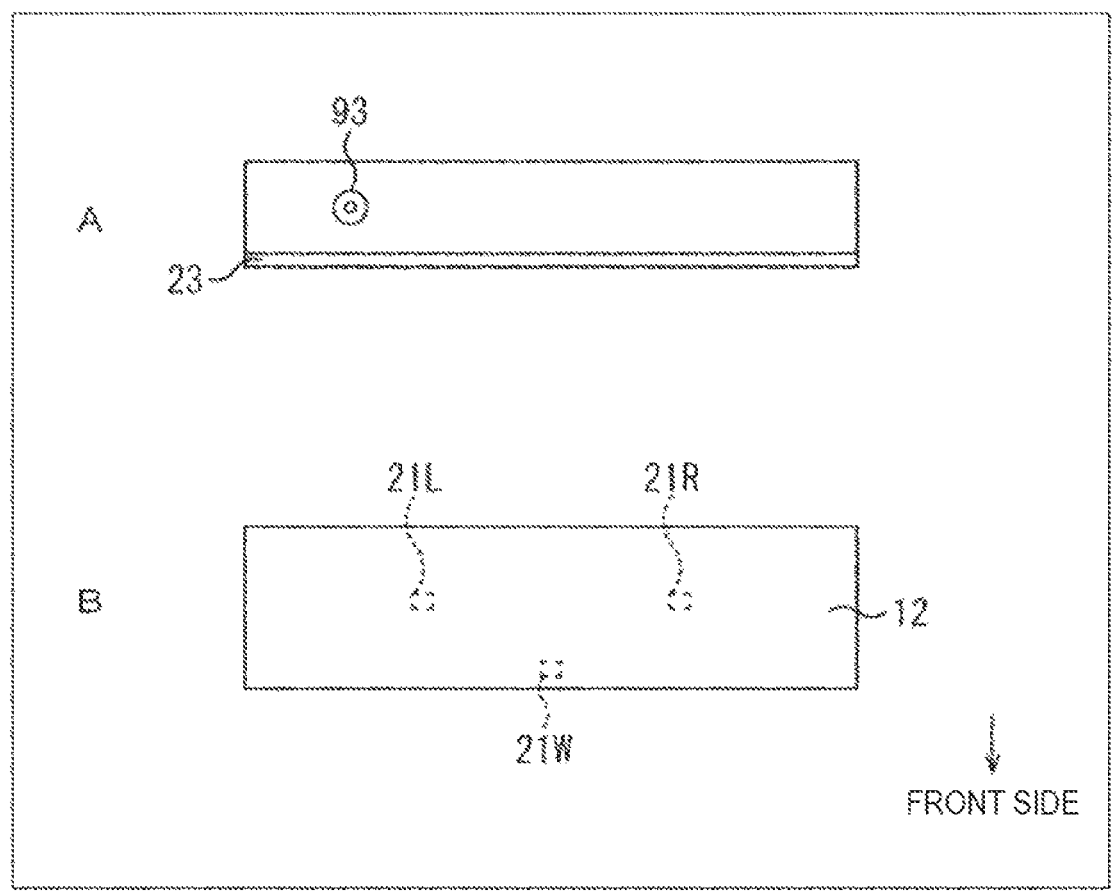
FIG. 3 is a diagram for describing a configuration of an LED indicator in a smart unit.

FIG. 2 is an enlarged side view taken around the smart unit 12 for describing the LED indicator 84 in the smart unit 12, A of FIG. 3 is a front view of the smart unit 12, and B of FIG. 3 is a diagram showing disposition of the LED indicator 84 when the smart unit 12 is viewed from an upper side. Note that, in FIGS. 2 and 3, changes are made to the scale of the smart unit 12, disposition of each part provided in the smart unit 12, and the like in order to facilitate understanding of description.

As shown in B of FIG. 3, the LED indicator 84 includes one white LED 21W and two color LEDs 21L and 21R. The white LED 21W is disposed at the center of the smart unit 12 with respect to the right-left direction and slightly forward with respect to the front-rear direction. The color LED 21L is disposed on the rear-left side of the white LED 21W and the color LED 21R is disposed on the rear-right side of the white LED 21W. The white LED 21W is a white monochromatic LED emitting white. The color LEDs 21L and 21R are configured as three LEDs of R (Red) G (Green), and B (Blue) capable of emitting predetermined colors.

A light beam of the white LED 21W is output from an output unit 23 (A of FIG. 3) provided on the front side of the smart unit 12 via a light guiding plate not shown in the drawing. Light beams of the color LED 21L and the color LED 21R are output from the output unit 23 provided on the front side of the smart unit 12 (A of FIG. 3) and the output unit 23 (not shown) provided on the lower side of the smart unit 12 via the light guiding plate not shown in the drawing.

An electrode pad that is a part of a touch sensor 85 (FIG. 4) and a film antenna 22 that includes an antenna of NFC communication and the like are embedded near the bottom of the smart unit 12 as shown in FIG. 2. Accordingly, the smart unit 12 is designed to be able to detect contacts and proximity (approach within a distance of dozens of millimeters or less) of hands, fingers, and the like of a user and proximity of an NFC communication device thereto as will be described later.

In the following description, the white LED 21W, the color LED 21L, and the color LED 21R are also referred to simply as an LED 21W, an LED 21L, and an LED 21R. In addition, when it is not necessary to specifically identify each of the LED 21W, the LED 21L, and the LED 21R, the LEDs are simply referred to as LEDs 21.

[2. Control Block Diagram]

Figure 4:
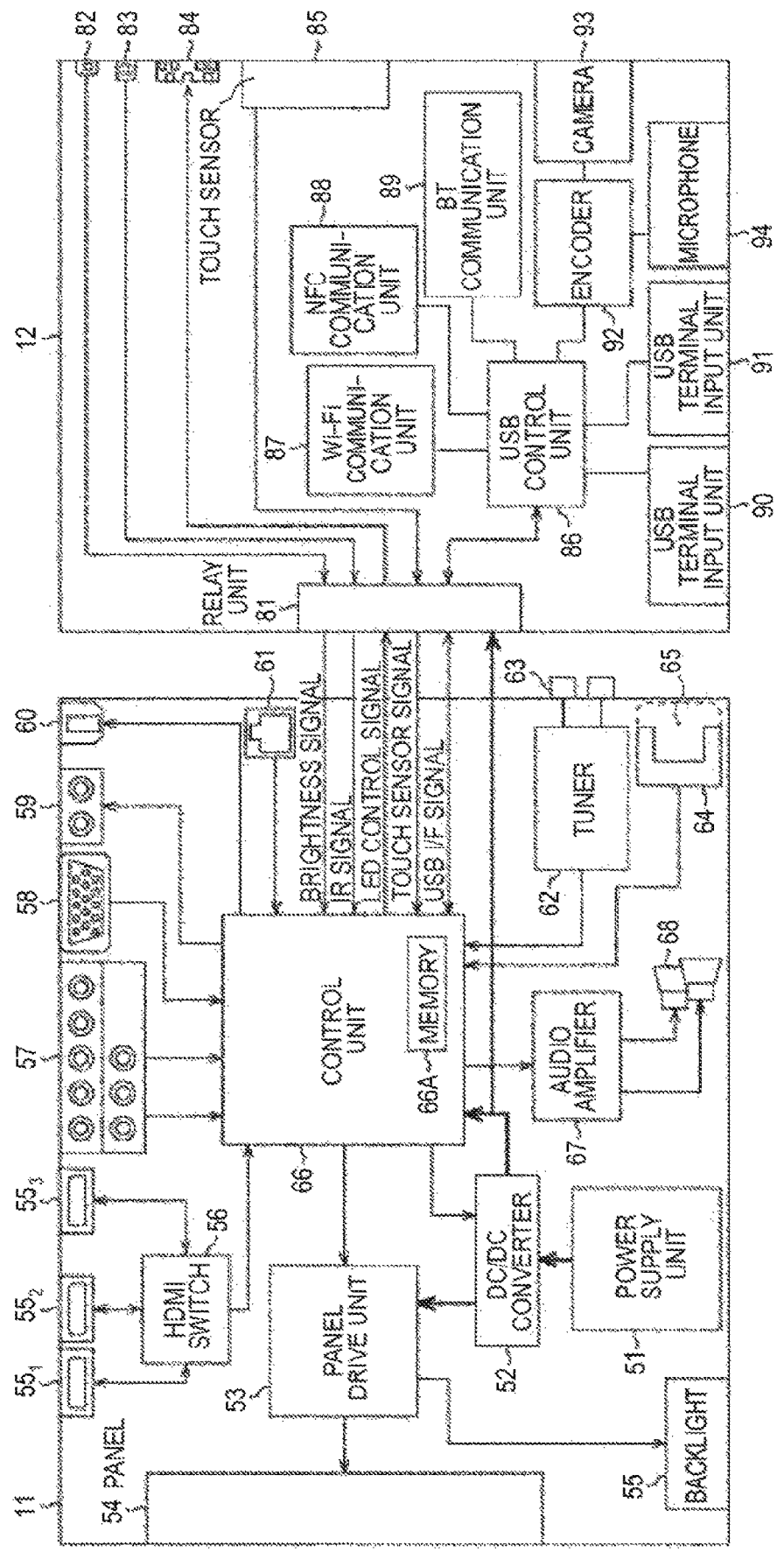
FIG. 4 is a control block diagram of the TV.
Figure 5:
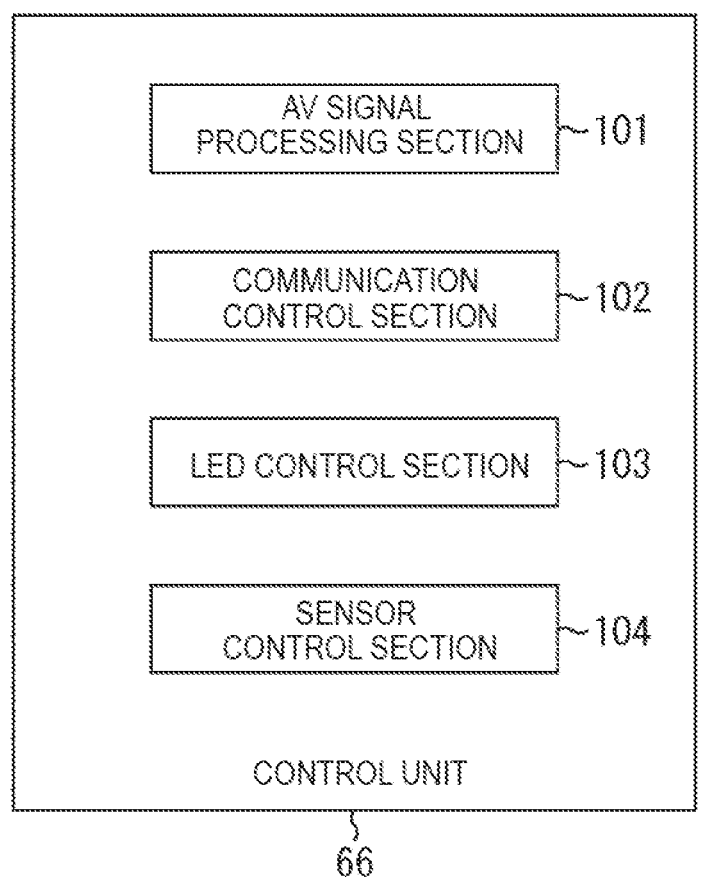
FIG. 5 is a further detailed functional block diagram of a control unit of the TV.

FIG. 4 is a control block diagram of the TV 1.

First, a configuration of the display main body 11 of the TV 1 will be described.

A power supply unit 51 is connected to an external AC power source, converts the received AC power into DC power of a predetermined voltage, and then supplies the power to a DC-DC converter 52. The DC-DC converter 52 converts a first power voltage supplied from the power supply unit 51 into a second power voltage, and then supplies the voltage to each unit of a panel drive unit 53, a control unit 66, a smart unit 12, and the like. Note that the power voltage supplied to each of the units may be different or the same.

The panel drive unit 53 drives a panel 54 and a backlight 55 to display videos based on video signals supplied from the control unit 66. The panel 54 and the backlight 55 correspond to the display 14 of FIG. 1. The panel 54 controls opening of liquid crystal of each of pixels based on driving control of the panel drive unit 53. The backlight 55 emits light at a predetermined luminance based on driving control of the panel drive unit 53. In other words, the display 14 of FIG. 1 is an LCD (Liquid Crystal Display), and the backlight 55 is disposed on the back side of the panel 54.

Each of HDMI terminals $55_1$ to $55_3$ exchanges HDMI (High-Definition Multimedia Interface) signals with external devices serving as connection destinations of each of the terminals. An HDMI switch 56 appropriately switches the HDMI terminals $55_1$ to $55_3$ based on control signals of HDMI to relay the HDMI signals to be exchanged between the control unit 66 and the external devices connected to the HDMI terminals $55_1$ to $55_3$.

An analog AV input terminal 57 causes analog AV signals (Audio and Visual signals) from the external devices to be input to supply the signals to the control unit 66.

A PC input terminal 58 is configured as, for example, a mini D-sub 15-pin terminal, and causes analog video signals among AV signals output by a personal computer to be input to supply the signals to the control unit 66.

An analog audio output terminal 59 outputs analog audio signals supplied from the control unit 66 to an external device serving as a connection destination. An optical digital audio output terminal 60 outputs optical digital audio signals supplied from the control unit 66 to an external device serving as a connection destination.

A LAN terminal 61 is configured as, for example, a 10BASE-T or 100BASE-TX connector or the like, and connected to a predetermined network such as a home network, or the Internet.

A tuner 62 is connected to an antenna (not shown) via an antenna terminal 63, acquires broadcasting signals of a predetermined channel from radio waves received with the antenna, and then supplies the signals to the control unit 66. Note that, in the present embodiment, radio waves that the tuner 62 receives are assumed to be, for example, broadcasting signals of digital terrestrial broadcasting.

A B-CAS (registered trademark) card 65 in which encryption keys for descrambling digital terrestrial broadcasting are stored is inserted into a CAS card I/F 64. The CAS card I/F 64 reads the encryption keys stored in the B-CAS (registered trademark) card 65, and then supplies the keys to the control unit 66.

The control unit 66 performs control of the entire TV 1 based on a control program stored in an internal memory 66A configured as a ROM (Read Only Memory) or the like. The control unit 66 performs, for example, a process of A-D (Analog to Digital) conversion and D-A (Digital to Analog) conversion of video signals and audio signals, a descrambling and decoding processes of broadcasting signals, and the like. In addition, the control unit 66 also performs control based on a brightness signal, an IR signal, a touch sensor signals, a USB I/F signal from the smart unit 12 to be described later and LED control of the LED indicator 84. The control unit 66 can be configured as an SoC (System on a Chip) obtained by integrating a CPU (Central Processing Unit), an MPU (Micro Processing Unit), a DRAM (Dynamic Random Access Memory) and the like in one chip.

The control program stored in the internal memory 66A can be installed via a USB memory or a hard disk device connected to a USB terminal input unit 90 that will be described later, or a wired or wireless transmission medium such as a home network or the Internet.

An audio amplifier 67 amplifies analog audio signals supplied from the control unit 66 and then supplies the signals to a speaker 68. The speaker 68 outputs sounds according to the analog audio signals supplied from the audio amplifier 67.

Next, a configuration of the smart unit 12 of the TV 1 will be described.

Power supplied from the display main body 11 is supplied to each unit of the smart unit 12 via a relay unit 81. In addition, a brightness signal, an IR signal, an LED control signal, a touch sensor signal, and a USB I/F signal that will be described later are exchanged between the display main body 11 and the control unit 66 of the smart unit 12 via the relay unit 81.

A brightness sensor 82 senses brightness around the TV 1 (for example, brightness of a room in which the TV 1 is installed, or the like), and supplies a result of the sensing to the control unit 66 as a brightness signal.

An IR light sensing unit 83 senses IR signals corresponding to operations of a user which are emitted from a remote controller that is not shown when, for example, the user operates the remote controller, and supplies the signals to the control unit 66.

The LED indicator 84 causes the LEDs to turn on or off based on LED control signals from the control unit 66.

The touch sensor 85 has a plurality of electrodes that change an electrostatic capacitance according to proximity of, for example, a finger of a person, or the like. The touch sensor 85 senses a proximity operation and a contact operation of a user based on a change in electrostatic capacitance of the plurality of electrodes, and then supplies a result of the sensing as a touch sensor signal to the control unit 66.

A USB control unit 86 is connected to the relay unit 81, a Wi-Fi (wireless fidelity) communication unit 87, an NFC (near field communication) communication unit 88, a BT (Bluetooth (registered trademark)) communication unit 89, USB (universal serial bus) terminal input units 90 and 91, and an encoder 92.

The USB control unit 86 acquires USB I/F signals based on a USB standard which are supplied from each of the Wi-Fi communication unit 87, the NFC communication unit 88, the BT communication unit 89, the USB terminal input unit 90, the USB terminal input unit 91, and the encoder 92 and then outputs the signal to the control unit 66. In addition, the USB control unit 86 appropriately distributes USB I/F signals supplied from the control unit 66 via the relay unit 81 to the Wi-Fi communication unit 87, the NFC communication unit 88, the BT communication unit 89, the USB terminal input unit 90, the USB terminal input unit 91, or the encoder 92.

The Wi-Fi communication unit 87 transmits data supplied from the USB control unit 86 as a USB I/F signal to another communication device, for example, a mobile telephone or the like, through wireless communication using a Wi-Fi-based communication scheme. In addition, the Wi-Fi communication unit 87 receives data transmitted from another communication device (Wi-Fi device) through Wi-Fi wireless communication and supplies the data to the USB control unit 86 as a USB I/F signal.

The NFC communication unit 88 transmits data supplied from the USB control unit 86 as a USB I/F signal to another communication device (NFC device), for example, a mobile telephone or the like, through proximity wireless communication based on NFC defined in ISO/IEC 18092. In addition, the NFC communication unit 88 receives data transmitted from another communication device through the proximity wireless communication and then supplies the data to the USB control unit 86 as a USB I/F signal.

The BT communication unit 89 transmits data supplied from the USB control unit 86 as a USB I/F signal to another communication device, for example, a mobile telephone or the like, through wireless communication (BT communication) using Bluetooth (registered trademark). In addition, the BT communication unit 89 receives data transmitted from another communication device (BT device) through the BT communication and then supplies the data to the USB control unit 86 as a USB I/F signal.

The USB terminal input unit 90 and the USB terminal input unit 91 are connectors to which USB terminals are connected. For example, a USB memory, a hard disk storage device, and the like are connected to the USB terminal input unit 90 and the USB terminal input unit 91 as external storage devices. The USB terminal input unit 90 and the USB terminal input unit 91 are provided, for example, on both sides of the housing of the smart unit 12 so as to face each other.

The encoder 92 is connected to the camera 93 and a microphone 94. The camera 93 is configured by an imaging sensor such as a CCD (Charge Coupled Device) or CMOS (Complementary Metal Oxide Semiconductor) image sensor, and supplies video signals obtained from imaging to the encoder 92. The microphone 94 supplies audio signals obtained from sound-collecting to the encoder 92. The encoder 92 performs an A-D conversion process of the video signals and audio signals and a signal process such as an encoding process, and supplies processed signals to the USB control unit 86 as USB I/F signals.

Figure 6:
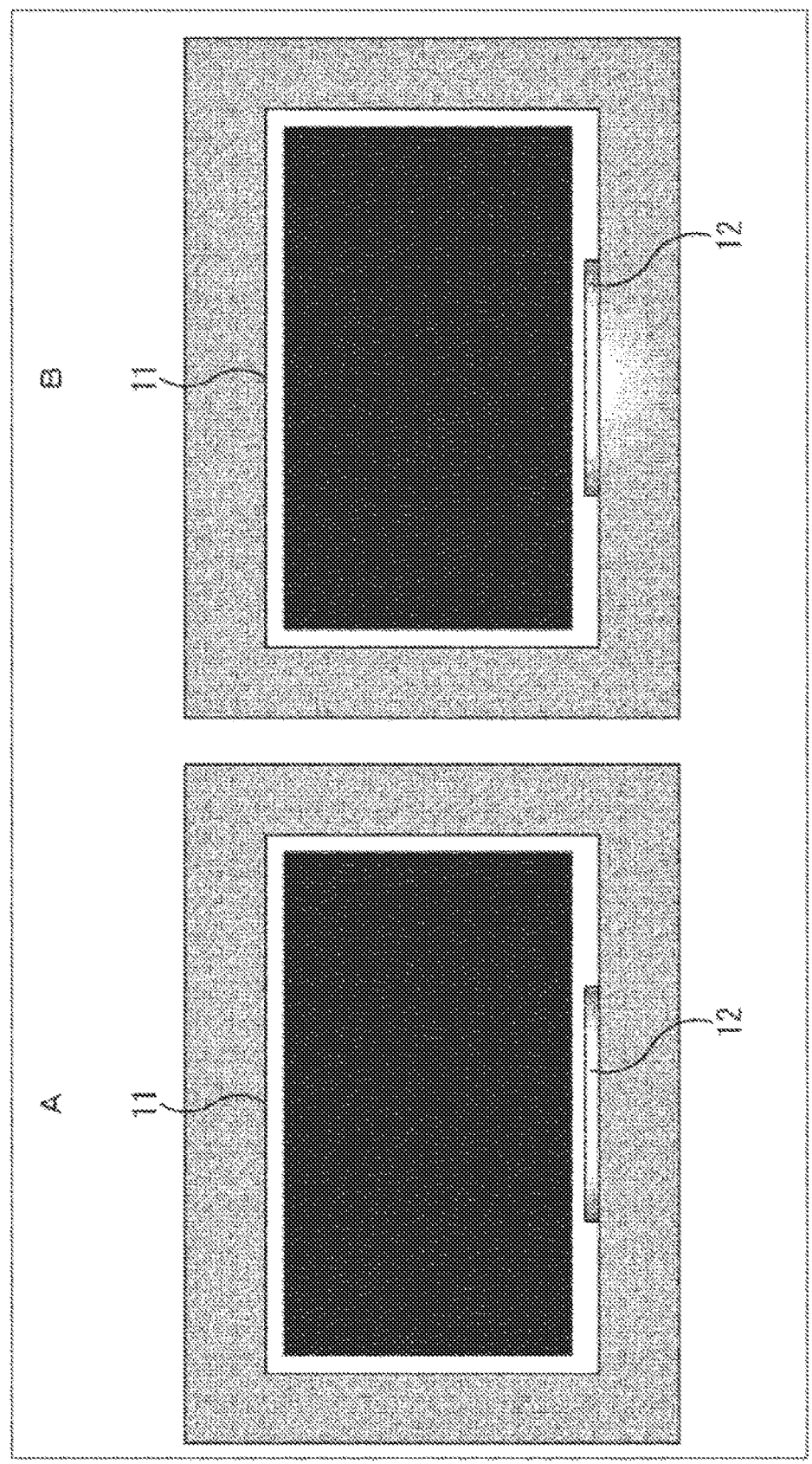
FIG. 6 is a diagram for describing a basic lighting example of an LED indicator.

FIG. 6 shows a further detailed functional block diagram of the control unit 66.

By performing the control program stored in the internal memory 66A in the control unit 66, at least an AV signal processing section 101, a communication control section 102, an LED control section 103, and a sensor control section 104 are realized.

The AV signal processing section 101 performs control for displaying a predetermined image on the display 14. For example, the AV signal processing section 101 performs an input and output processes of video signals and audio signals, an A-D (Analog to Digital) conversion process, a D-A (Digital to Analog) conversion process, a descrambling process and a decoding process of broadcasting signals, and the like.

The communication control section 102 performs control of communication to a network connected via the LAN terminal 61, Wi-Fi communication, NFC communication, BT (Bluetooth (registered trademark)) communication, and the like.

The LED control section 103 performs LED control of the LED indicator 84. To be specific, the LED control section 103 controls currents supplied to LEDs based on PWM (Pulse Width Modulation: Pulse-Width Modulation) control, and controls the luminance of light emission. The PWM control is a scheme to control the average value of current by turning the current to be in an ON state and OFF state through switching, and changing a ratio (duty cycle) of the ON state and the OFF state.

The sensor control section 104 acquires a brightness signal from the brightness sensor 82 an IR signal from the IR light sensing unit 83, an imaging signal imaged by the camera 93, and the like, and performs control according to the acquired signals. The sensor control section 104 also performs control of the AV signal processing section 101, the communication control section 102, and the LED control section 103 according to the acquired signals.

The TV 1 configured as described above provides illumination (an expression using light) that causes a user to instantaneously recognize a function or a state of the TV 1, or an operation performed by the user with respect to the TV 1 in association with a display image of the display 14 and lighting of the LED indicator 84 of the smart unit 12. Hereinafter, various kinds of expressions using the display image of the display 14 and lighting of the LED indicator 84 of the smart unit 12 will be described.

[3. Basic Lighting Example of the LED Indicator 84]

First, a simplest lighting method of the LED indicator 84 of the smart unit 12 will be described.

A of FIG. 6 shows a display example in which only the LED 21W at the center of the LED indicator 84 is lit. B of FIG. 6 shows a display example in which three LEDs 21 are lit to emit white light.

Note that, in drawings of FIG. 6 and thereafter, illustration of each configuration of the smart unit 12 is omitted and light-on or light-off of the LED indicator 84 of the smart unit 12 will be appropriately expressed with a predetermined concentration in order to facilitate understanding of a lighting expression. In addition, in description hereinbelow, light-off or light-on of the LED indicator 84 will also be referred to as light-off or light-on of the smart unit 12.

As described with reference to FIG. 2, a light beam of the LED 21W is output only from (the output unit 23 on) the front side of the smart unit 12. Thus, when only the LED 21W is lit, only the front face of the smart unit 12 emits light in a line shape as shown in A of FIG. 6.

Light beams of the LED 21L and LED 21R are output from (the output unit 23 on) the front side and lower side of the smart unit 12. Thus, when the three LEDs 21 are lit, light is formed in a semi-circular shape in the vertically downward direction from the smart unit 12 in addition to emitted light of the front face of the smart unit 12 as shown in B of FIG. 6.

Figure 7:
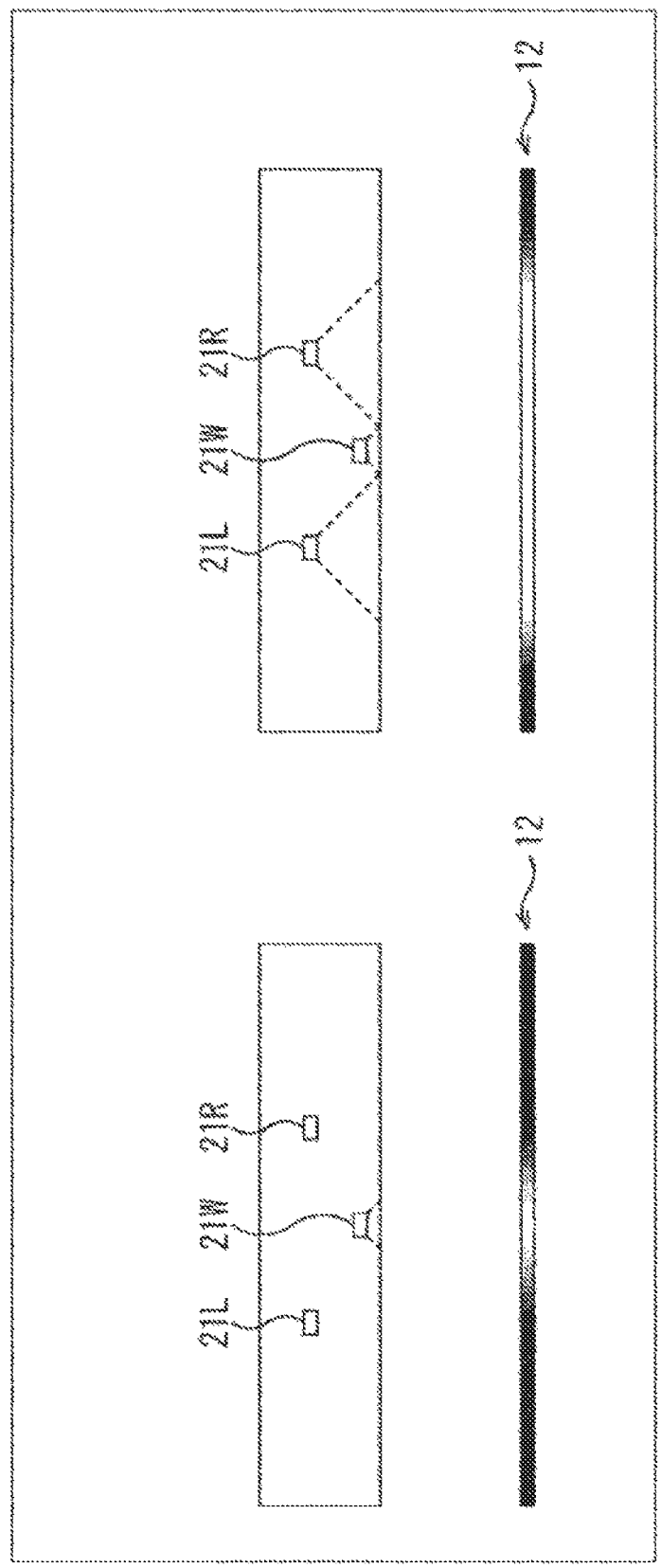
FIG. 7 is a diagram for describing a basic lighting example of an LED indicator.

FIG. 7 shows disposition of the three LEDs 21 when the smart unit 12 is viewed from the upper side and a lighting example of the front side of the smart unit 12.

When only the LED 21W is lit, only the center of the smart unit 12 in a line shape emits light in a spot shape as shown on the left side of FIG. 7 since the LED 21W is disposed on the center-front side of the smart unit 12.

On the other hand, when the two LEDs 21L and 21R disposed on the rear-right and rear-left sides are lit together with the LED 21W at the center, the smart unit 12 emits light in a stripe shape (line shape) as shown on the right side of FIG. 7.

As described above, by dividing uses of the two kinds of light emission states with a spot expression and a stripe expression in the LED indicator 84, it is possible to express differences of states of, for example, a power-on state, a standby state, and the like of the TV 1.

With the expressions of the two kinds of light emission states including the spot expression and the stripe expression, a user can recognize the difference of the two kinds of states of the TV 1 without having to identify the colors. When such expressions are to be given, the two color LEDs 21L and 21R may be lit in white, and thus the expressions can be realized even when the two color LEDs 21L and 21R are white LEDs.

Figure 8:
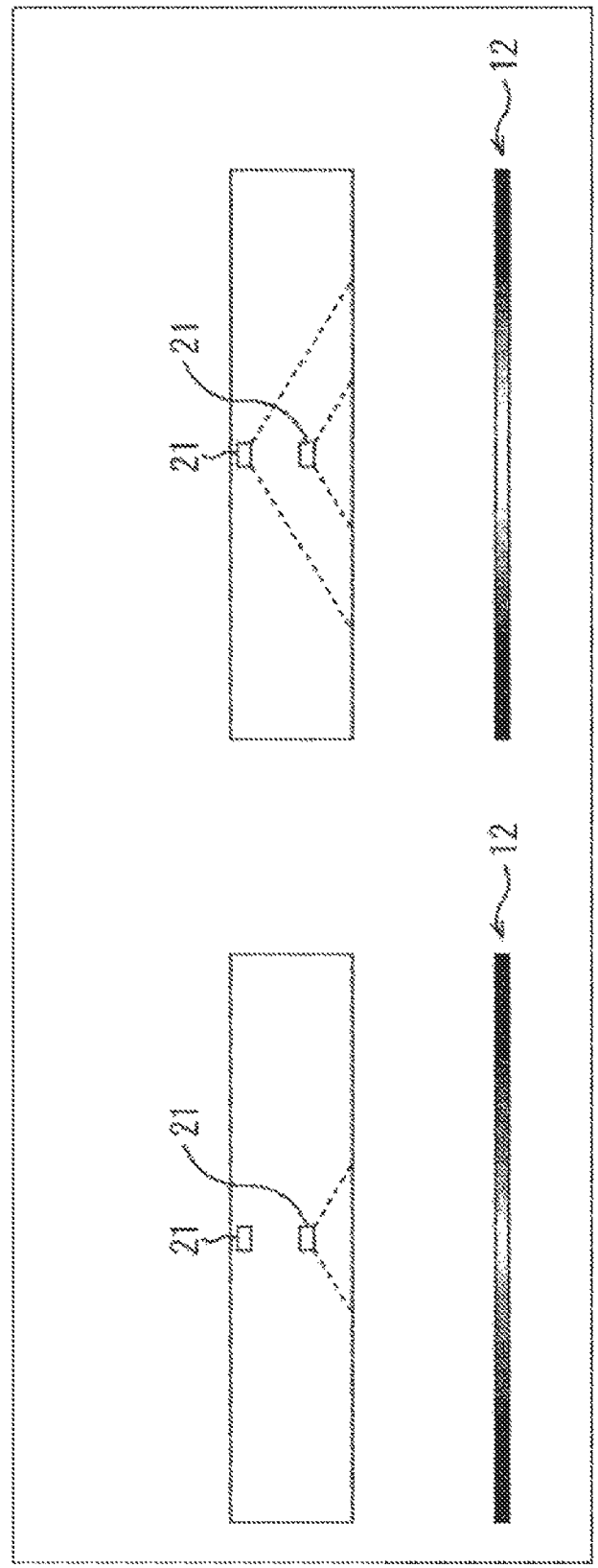
FIG. 8 is a diagram for describing a basic lighting example of an LED indicator.
Figure 9:
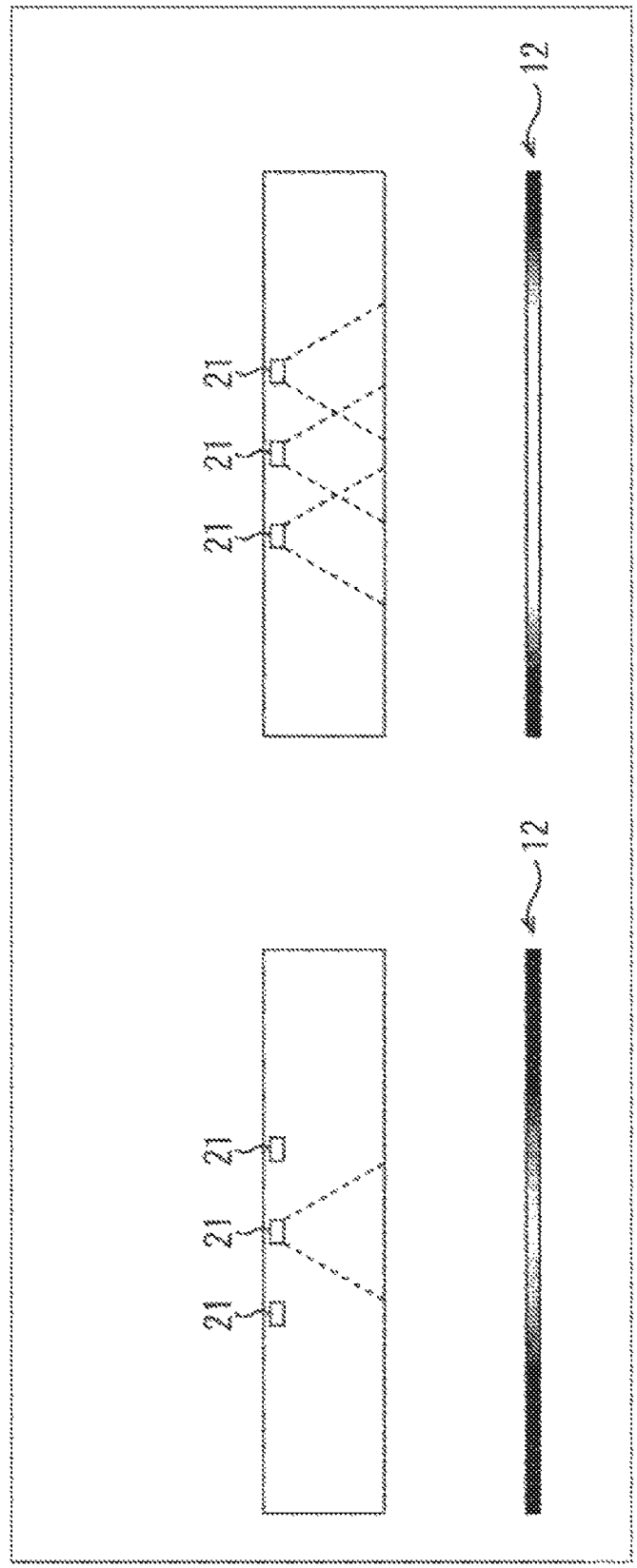
FIG. 9 is a diagram for describing a basic lighting example of an LED indicator.

In addition, in the present embodiment, although the LED indicator 84 is set to include the three LEDs 21, the two kinds of light emission states of the spot expression and the stripe expression can be expressed with, for example, the two LEDs 21 disposed back and forth as shown in FIG. 8. In addition, for example, even when the three LEDs 21 are disposed in the horizontal direction side by side as shown in FIG. 9, the two kinds of light emission state of the spot expression and the stripe expression can be expressed.

In other words, in the present embodiment, although the LED indicator 84 is set to include one LED 21 on the front-center side and two LEDs 21 on the rear-right and rear-left sides, the number of LEDs 21 included in the LED indicator 84 may be two or more, and disposition of the LEDs 21 can also be appropriately decided.

Note that, although FIGS. 6 to 9 are set to be diagrams in which both ends of the smart unit 12 do not emit light for the sake of convenience of description, the LED indicator 84 can actually cause both ends of the smart unit 12 to emit light.

[4. Sequential Lighting Example of the LED Indicator 84]

The examples described with reference to FIGS. 6 to 9 are lighting examples when one or more LEDs 21 are lit at a predetermined light emission luminance or turned off.

Figure 10:
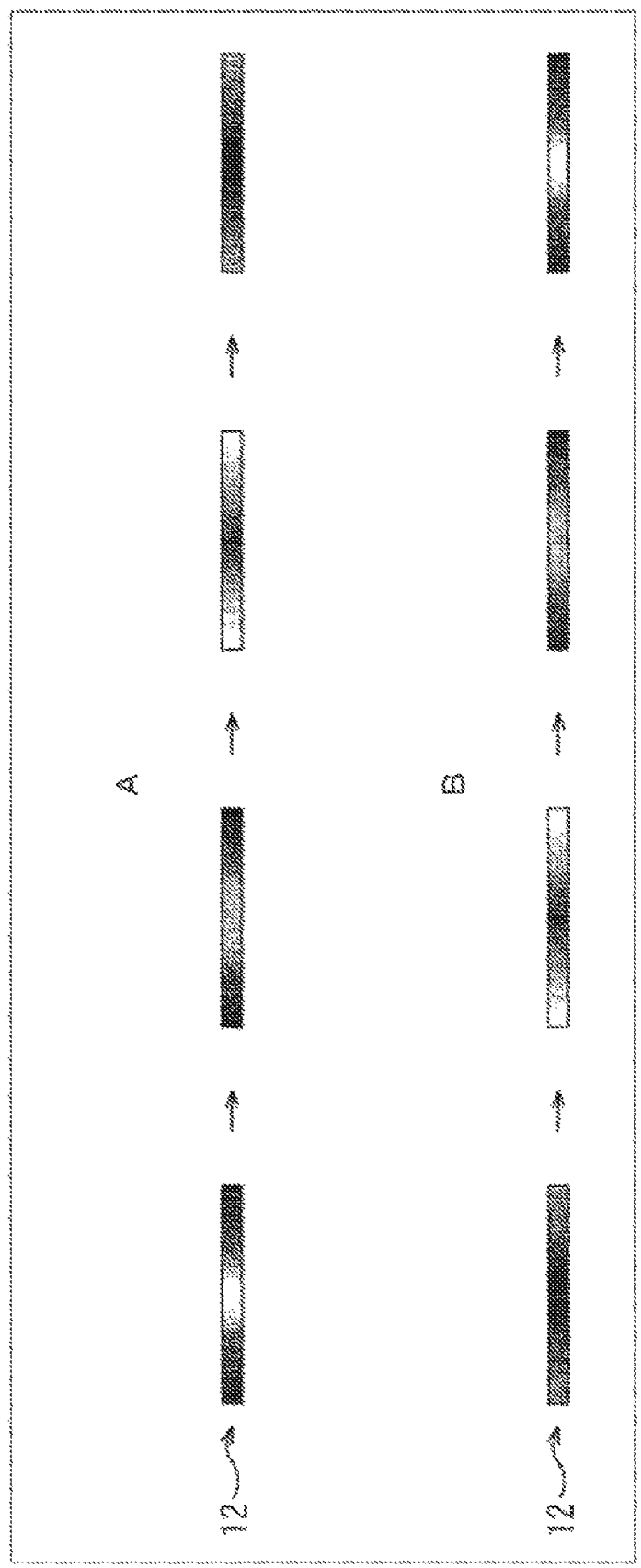
FIG. 10 is a diagram for describing a sequential lighting example of the LED indicator.

FIG. 10 shows a lighting example in which a light emission luminance of one or more LEDs 21 is continuously changed by PWM control.

A lighting expression as shown in A of FIG. 10 is possible when the LED control section 103 performs control in which the white LED 21W on the front-center side is lit first, then light thereof is gradually dimmed, and at the same time, the color LEDs 21L and 21R on the rear-right and rear-left sides are gradually lit to emit white light, and then the light is gradually dimmed. In other words, a lighting expression is possible such that the center part of the smart unit 12 in the line shape is first lit and light thereof moves to the right and left sides as if flowing.

In addition, when opposite control to the lighting control of A of FIG. 10 is performed, a lighting expression as shown in B of FIG. 10 is possible. In other words, the lighting expression is possible such that both ends of the smart unit 12 in the line shape are lit first, and then the light moves to the center part in a flowing manner.

Such a lighting expression in which lighting positions and luminances are changed according to passage of time as described above can be employed as an expression indicating continuous operations of the TV 1. For example, an expression indicating an operation performed when the TV 1 is connected to an external device such as a remote controller, a PC (personal computer), a mobile terminal (smartphone), or the like to transmit or receive data is possible. When the lighting expression of A of FIG. 10 is given, a user can perceive an operation of outputting (transferring) data from the TV 1 to an external device assuming that the smart unit 12 to be a central unit (core) or an input and output unit of the TV 1. When the lighting expression of B of FIG. 10 is given, the user can perceive an operation of inputting data from an external device to the TV 1.

[5. Lighting Examples Associated with Image Displays]

Figure 11:
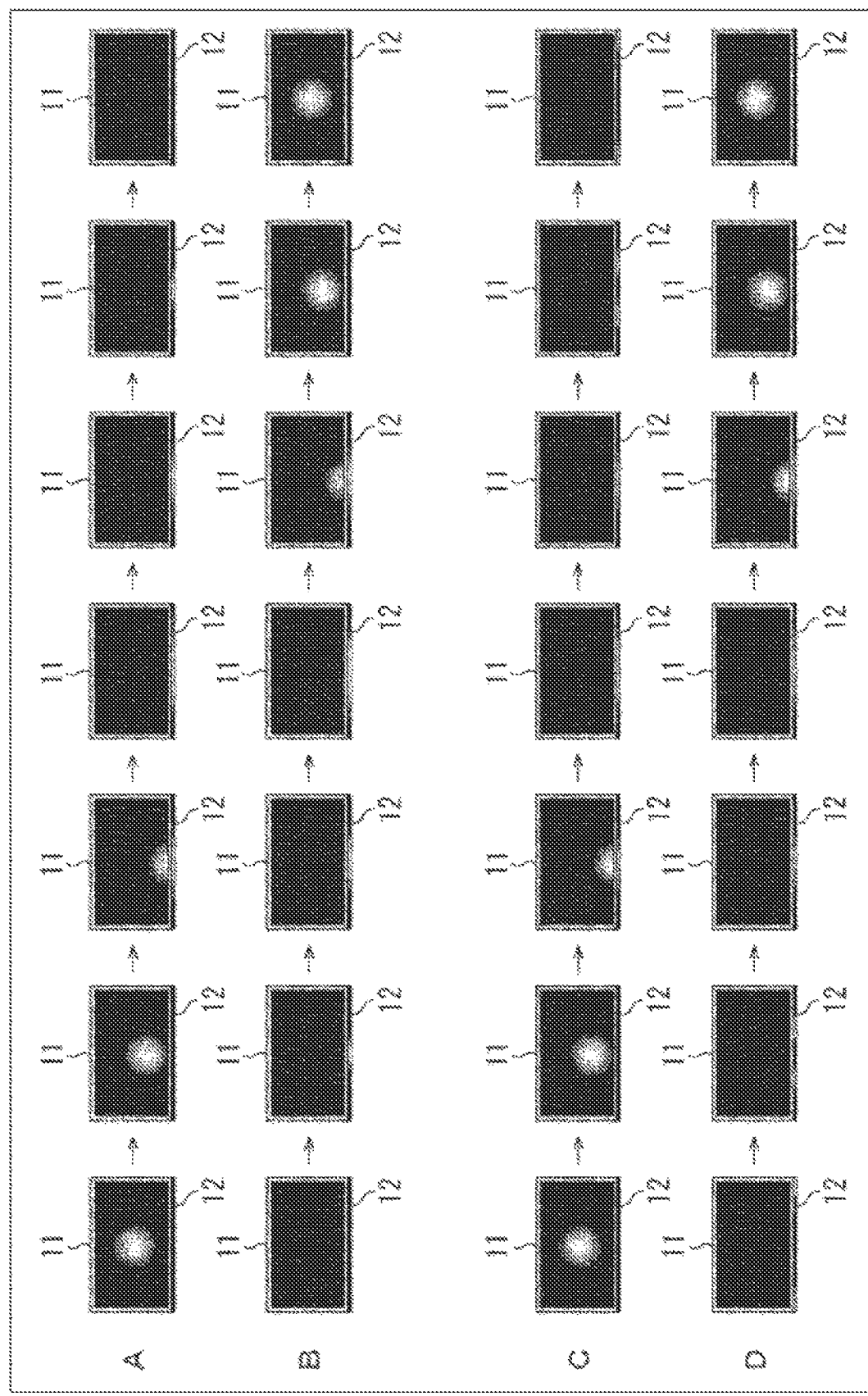
FIG. 11 is a diagram for describing associated lighting examples of the LED indicator with image displays.

FIG. 11 shows examples of associated lighting expressions combined with image displays of the display 14 in the lighting expressions of the LED indicator 84 shown in FIG. 10. Note that, in order to facilitate understanding of lighting expressions of the smart unit 12 in FIG. 11, the width of the smart unit 12 is shown to be the same as the width of the display main body 11.

A of FIG. 11 is an example of a lighting expression in which lighting of the one white LED 21W is combined with an image display of the display 14 and an example of a lighting expression to cause a user to perceive data output in the same manner as in A of FIG. 10.

In A of FIG. 11, an image in which white light is disposed at the screen center is first displayed on the display 14. Then, the light displayed at the screen center gradually moves in a downward direction of the screen that is the direction of the smart unit 12. Then, when the light on the display 14 disappears, the white LED 21W of the smart unit 12 is lit and then the LED turns off.

B of FIG. 11 is an example of a lighting expression in which lighting of the one white LED 21W is combined with an image display of the display 14 and an example of a lighting expression to cause the user to perceive data input in the same manner as in B of FIG. 10.

In B of FIG. 11, the center of the smart unit 12 is first lit with the white LED 21W, and then the LED turns off. At the same time when the white LED 21W turns off, an image in which white light appears near the smart unit 12 in the screen is displayed on the display 14. Then, an image in which the white light displayed on the screen gradually moves in an upward direction of the screen and then disappears at the center of the screen is displayed on the display 14.

C of FIG. 11 is an example of a lighting expression in which lighting of the three LEDs 21 is combined with an image display of the display 14, and an example of a lighting expression that causes the user to perceive data output.

In C of FIG. 11, an image in which white light is disposed at the screen center is first displayed on the display 14, and then the light displayed at the screen center gradually moves in the downward direction of the screen that is the direction of the smart unit 12. Then, the light on the display 14 disappears, and at the same time, a lighting expression is made such that the white LED 21W disposed at the center of the smart unit 12 is lit and then the light of the center of the smart unit 12 moves to the right and left in a flowing manner.

D of FIG. 11 is an example of a lighting expression in which lighting of the three LEDs 21 is combined with an image display of the display 14 and an example of a lighting expression that causes the user to perceive data input.

In D of FIG. 11, the color LEDs 21L and 21R are first lit to emit white light at both ends of the smart unit 12 and then the LEDs turn off. At the same time as the color LEDs 21L and 21R turn off, the white LED 21W is gradually lit, and then the LED turns off. Accordingly, a lighting expression in which both ends of the smart unit 12 are first lit and the light moves to the center part in a flowing manner as in B of FIG. 10 is possible. Then, an image in which the light of the white LED 21W is off and white light appears near the smart unit 12 in the screen is displayed on the display 14. Then, an image in which the white light displayed on the screen gradually moves in the upward direction of the screen and then disappears at the center part of the screen is displayed on the display 14.

As described above, by combining lighting expressions of the LED indicator 84 with the image displays in which white light appears to be absorbed by the smart unit 12 or discharged from the smart unit 12, the user can be made to perceive input and output of data.

[6. Lighting Expression of the LED Indicator 84 Corresponding to an Operation of a TV] Next, a lighting expression of the LED indicator 84 corresponding to an operation of the TV 1 will be described.

[6.1 Activation and Power-Off Operation]

Figure 12:
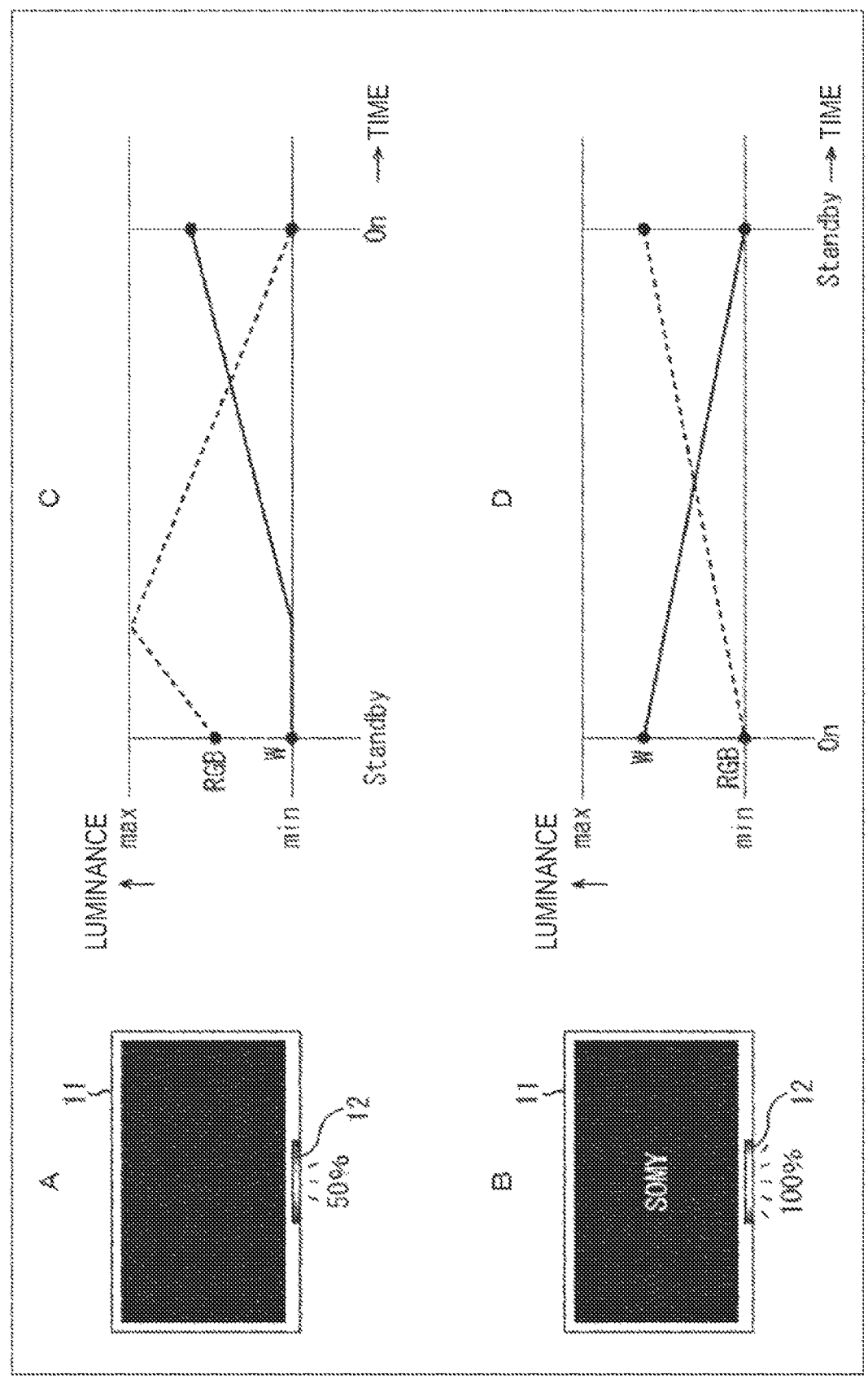
FIG. 12 is a diagram for describing examples of lighting expressions corresponding to activation and a power-off operation.

FIG. 12 shows examples of lighting expressions corresponding to an activation operation for switching a standby state (power-off) to an activated state (power-on) of the TV 1 and a standby operation for switching an activated state to the standby state.

When the TV 1 is in the standby state, the LED control section 103 controls the color LEDs 21L and 21R to emit light with, for example, a luminance of 50% of a maximum luminance (MAX) as shown in A of FIG. 12. Note that, in description provided below, LED control for emitting light with, for example, the luminance of 50% of the maximum luminance will be referred to as lighting with 50% luminance.

Then, a user performs the activation operation for switching the TV 1 from the standby state to the activated state by pressing the power button of the remote controller or the like. According to the operation of the user, the LED control section 103 causes the color LED 21L and the color LED 21R to be lit with 100% luminance as shown in B of FIG. 12. In addition, a predetermined logo ("SOMY") is displayed on the display 14 for a moment.

C of FIG. 12 shows a control sequence of luminances of the three LEDs 21 when the activation operation is detected. The LED control section 103 causes the color LEDs 21L and 21R to be lit with 100% luminance, and then controls such that the LEDs have 0% luminance for a predetermined time. In addition, the LED control section 103 controls such that the white LED 21W that has 0% luminance is gradually lit after a certain time from the activation operation elapses and then has 50% luminance for a predetermined time from the activation operation.

On the other hand, when the user performs the standby operation to switch the TV 1 from the activated state to the standby state, the LED control section 103 performs LED control as shown in D of FIG. 12. In other words, the LED control section 103 controls such that output of the color LEDs 21L and 21R gradually increases from 0% luminance to 50% luminance, and output of the white LED 21W gradually decreases from 50% luminance to 0% luminance.

[6.2 Button Operation]

Figure 13:
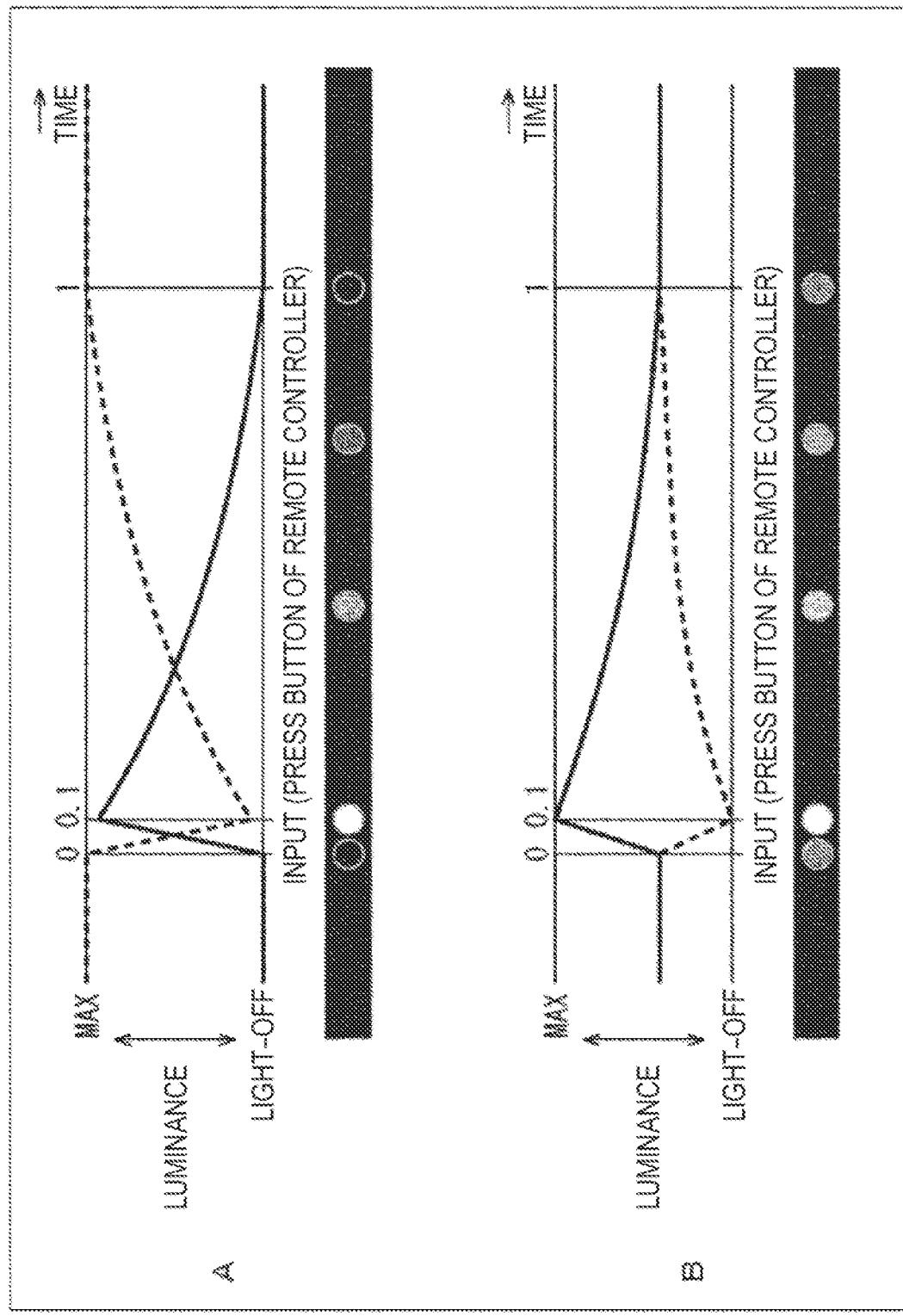
FIG. 13 is a diagram for describing a lighting expression of the LED indicator when a predetermined button is pressed.

FIG. 13 shows a lighting expression of the LED indicator 84 when a predetermined button such as a channel button or a program table button of the remote controller of the TV 1 is pressed.

In a general television receiver set of the past, an LED lamp is lit only at the moment at which a button operation is sensed. In this case, when a line of sight of the user slightly strays from the screen, the user misses lighting of the LED lamp, and thus it is difficult for the user to recognize whether or not the button operation has been sensed.

Thus, the LED control section 103 controls such that output of the three LEDs 21 becomes 90% luminance from 0% luminance at the time of the button operation for a short period of time (for example, 0.1 seconds), and then controls such that the luminance gradually decrease to 0% luminance over a predetermined period of time (for example, 0.9 seconds), for example, as shown in the solid line of A of FIG. 13.

In addition, for example, when an initial state is a state in which light is emitted with a predetermined output (for example, 50% luminance), the LED control section 103 controls such that the output is first raised to the maximum luminance and then returns to the original output as shown in the solid line of B of FIG. 13.

As described above, by giving a lighting expression in which a luminance is changed according to the passage of time and afterglow appears to be left as operation feedback corresponding to the button operation of the user, lighting can be recognized even when the line of sight of the user slightly strays from or misses the screen for a moment, and thus the degree of visual recognition improves.

Note that the lighting expression in which afterglow appears to be left may be controlled opposite to the luminance control described above as indicated by the dotted lines in A of FIG. 13 and B of FIG. 13. In other words, the control indicated by the solid lines of FIG. 13 is control in which a luminance is set to a first luminance and then gradually reduced to a second luminance that is lower than the first luminance, but may also be control in which a luminance is set to a first luminance and then gradually raised to second luminance higher than the first luminance. In addition, it is needless to say that control values of a light emission luminance in the examples described above are mere examples, and a control value is not limited to the exemplified values, and can be set to an arbitrary value (the same applies to other examples).

[6.3 Timer Operation]

Next, a lighting expression of the LED indicator 84 corresponding to an operation of a user for executing a predetermined function will be described. Herein, as the predetermined function, an example of a timer function to turn power of the TV 1 on or off at a predetermined set time will be described.

Figure 14:
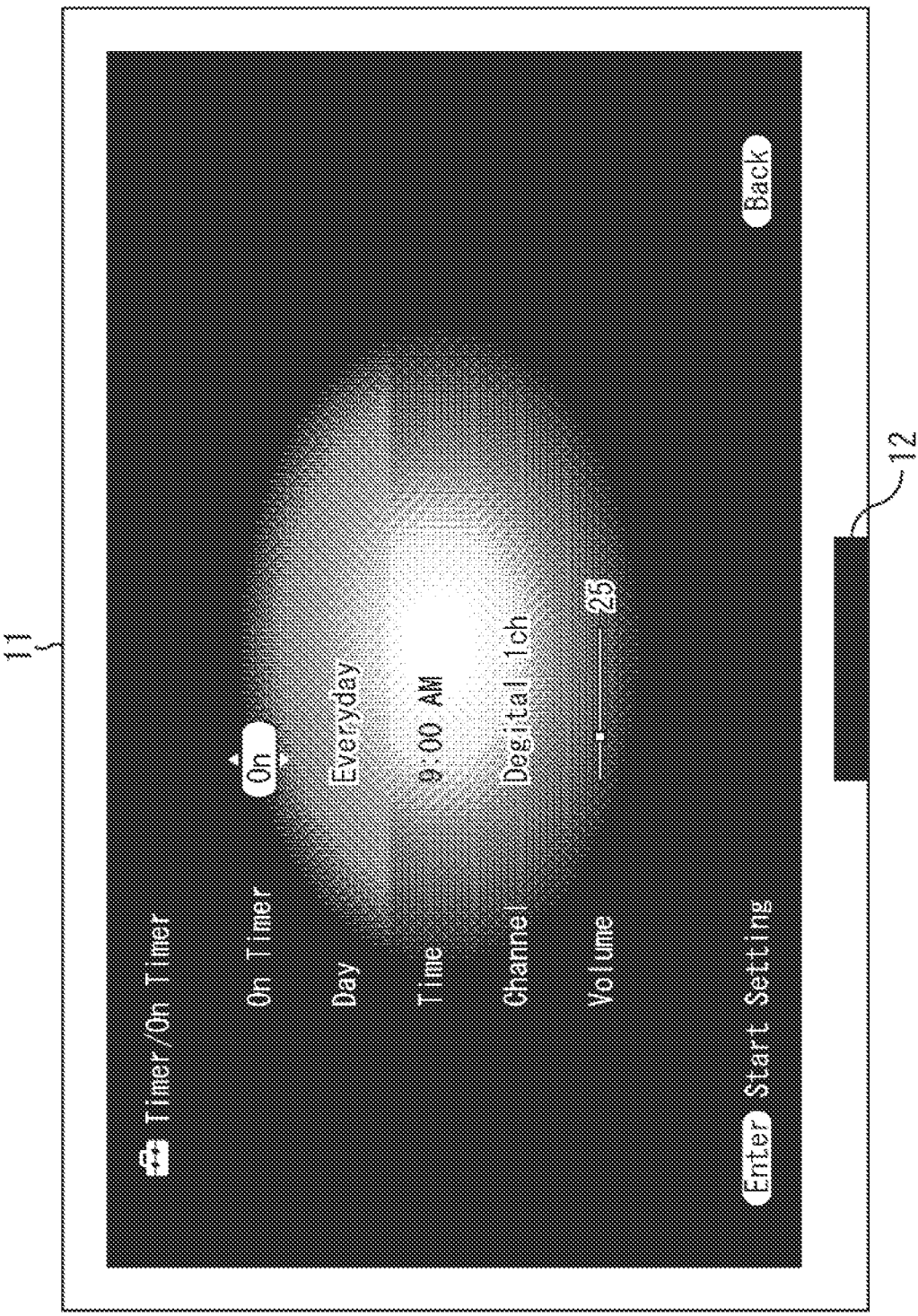
FIG. 14 is a diagram showing a setting screen example in which a timer is set.

FIG. 14 shows a setting screen when a timer is set in the TV 1.

On the setting screen, "On Timer" that is an item for designating whether "power on" is to be set or "power off" is to be set at a designated time, "Day" that is an item for designating days, "Time" that is an item for designating a time, "Channel" that is an item for designating a channel, "Volume" that is an item for designating volume of sounds, and the like are provided.

The above-described items of the setting screen are displayed as a dim background image in a predetermined color in a circular shape starting from the center of the screen in a black background. Here, the color of the dimly lit circle is a color assigned in advance with respect to the timer function, and set to be, for example, orange.

Figure 15:
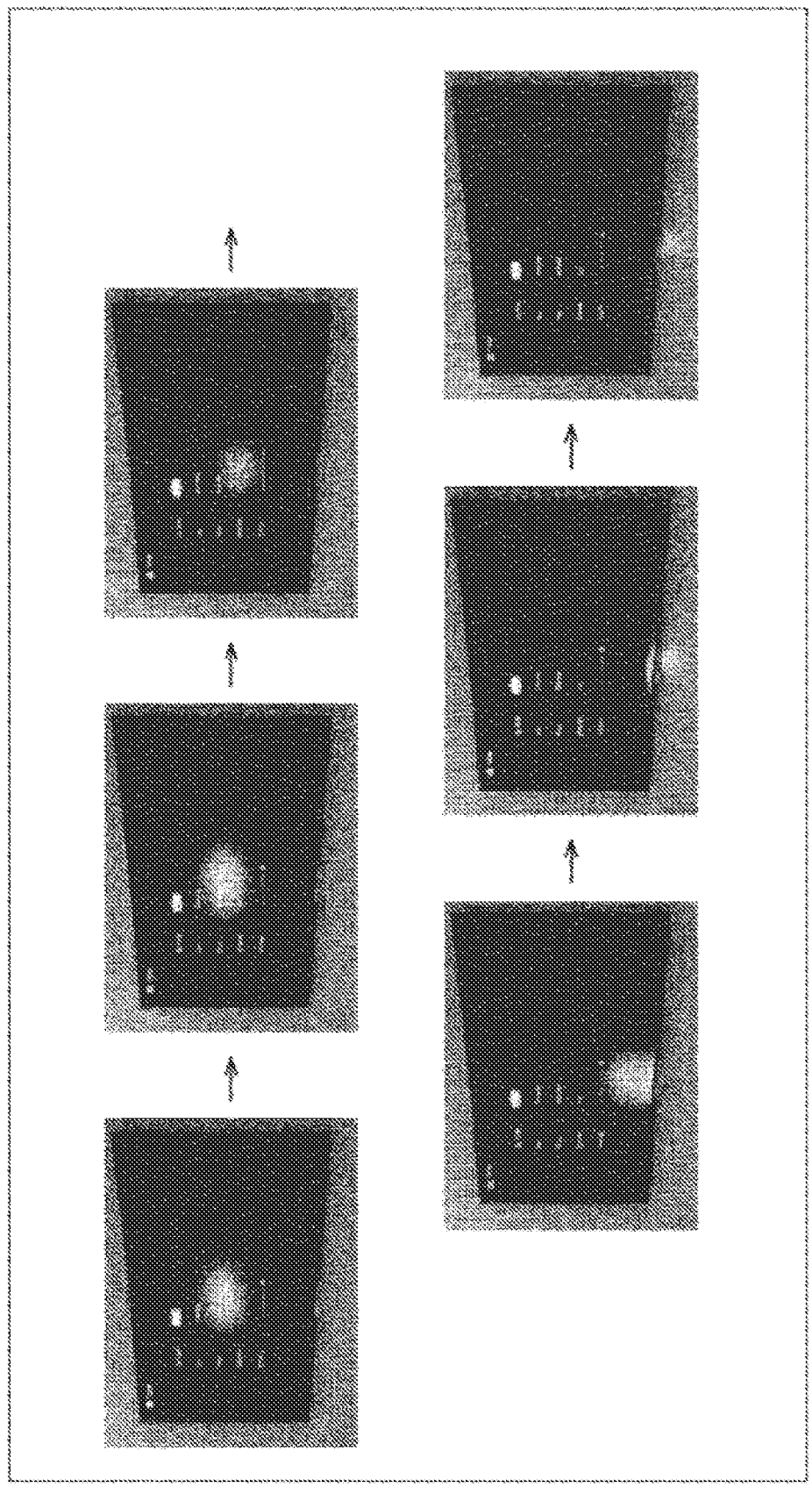
FIG. 15 is a diagram for describing examples of associated expressions when timer setting is operated.

After setting each item of the setting screen to be a desired value, a user presses, for example, a decision button of a remote controller as an operation for confirming (registering) the set content. When the decision button is pressed by the user, the TV 1 performs an associated expression in which an image display of the display 14 is combined with lighting of the LED indicator 84 of the smart unit 12 as shown in FIG. 15.

In other words, in the same manner as the lighting expression shown in A of FIG. 11, the orange light circle of the setting screen gradually moves in the downward direction of the screen that is the direction of the smart unit 12. Then, the LED indicator 84 is lit in synchronization with or in association with disappearance of the orange light circle of the setting screen. For example, when the circular light on the setting screen disappears, the smart unit 12 gradually emits light with the color LEDs 21L and 21R in orange until a luminance reaches the maximum luminance, and then the light is gradually dimmed and remains lit at a constant luminance (for example, 20% luminance).

The state in which the LED indicator 84 of the smart unit 12 remains lit at a constant luminance (for example, 20% luminance) indicates that the function corresponding to the color of the emitted light is being operated in the TV 1. In the present example, since orange is designated for the timer function, the LED indicator 84 is lit in orange at the constant luminance, indicating that the timer function is being operated.

When the smart unit 12 remains lit at the constant luminance (for example, 20% luminance), it means that the predetermined function is being operated in the TV 1, and the user can ascertain what function is being operated by pressing a screen display button of the remote controller.

Figure 16:
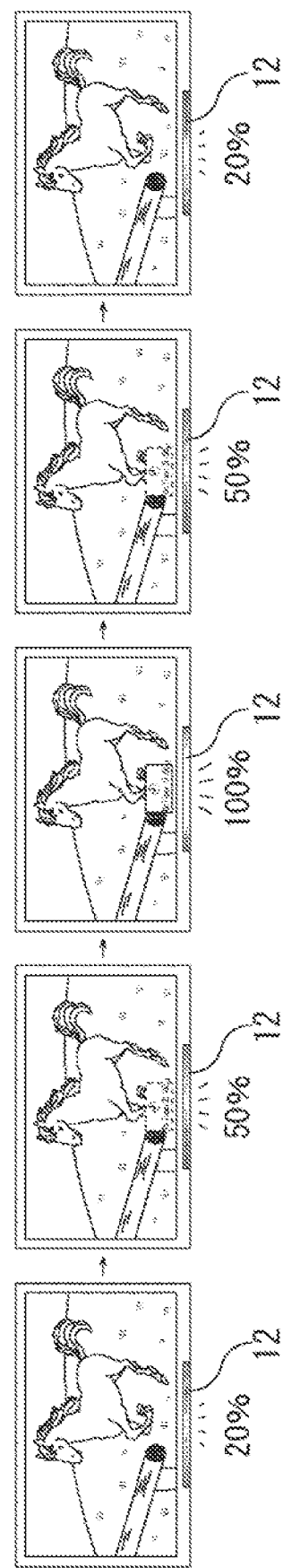
FIG. 16 is a diagram showing an operation of the TV when a screen display button is operated.

FIG. 16 shows an operation of the TV 1 when the timer function is being operated, the user views a predetermined broadcasting program, and the screen display button of the remote controller is pressed.

The leftmost side of FIG. 16 shows a state in which the smart unit 12 is lit in orange indicating the timer function being operated at the constant luminance (for example, 20% luminance).

When the screen display button of the remote controller is pressed, the display image of the display 14 and lighting of the smart unit 12 are changed in the order indicated by the arrows according to the passage of time. In other words, on the display 14, a slave screen indicating the set content of the timer function being operated is displayed in a region of the display image on an upper side of the smart unit 12 in a superimposed manner, and then erased after a predetermined time elapses. In this case, the degree of superimposition of the slave screen on the broadcasting program image that is a master screen increases according to the passage of time and then decreases according to the passage of time. In addition, a light emission luminance of the color orange of the smart unit 12 also increases and then decreases according to the passage of time in synchronization with the degree of superimposition of the slave screen. The slave screen indicating the set content of the timer function indicates supplementary information that supplements the function currently being operated (function corresponding to the lighting color of the smart unit 12).

Figure 17:
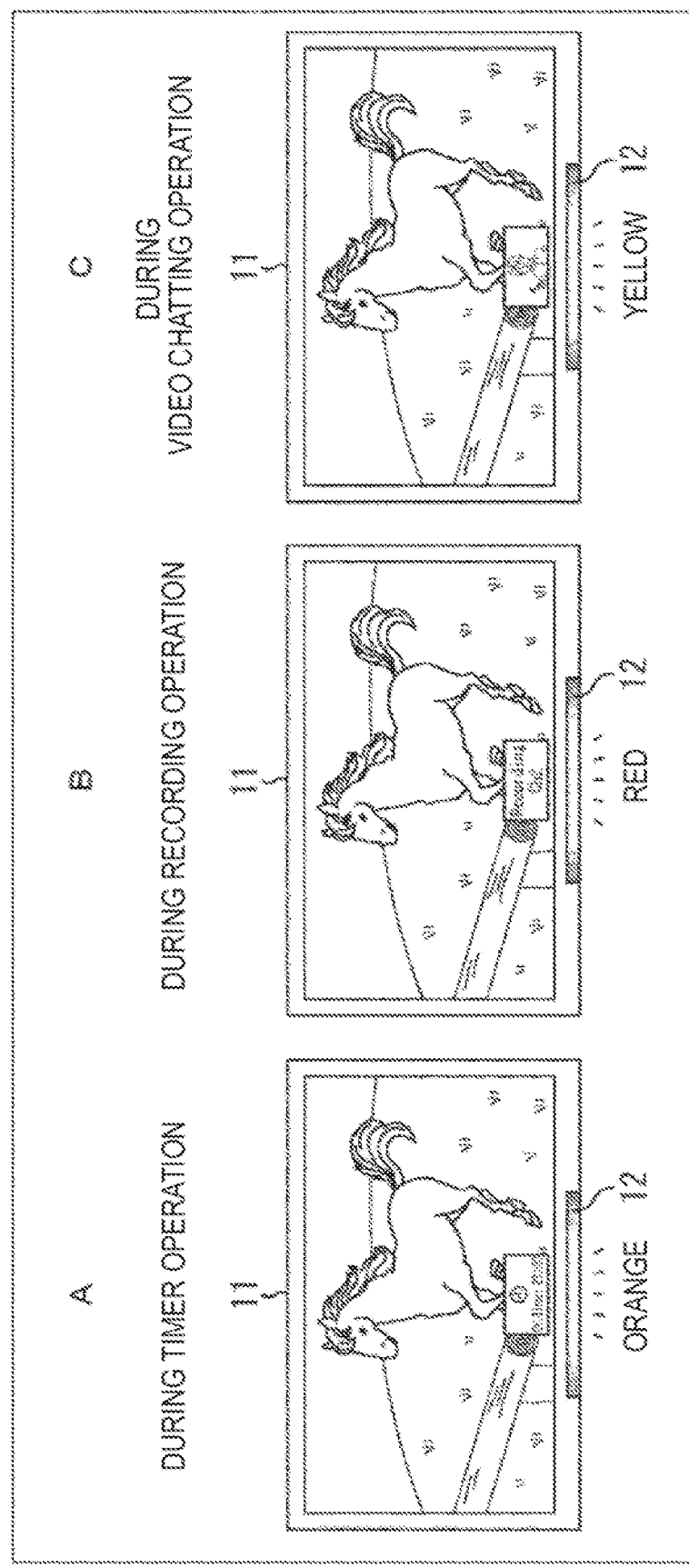
FIG. 17 is a diagram for describing lighting colors of the LED indicator.

In addition, for example, when the TV 1 has a function of recording a concurrent program and the TV 1 is performing the recording operation, the smart unit 12 is lit in red during the recording operation. Then, the screen display button of the remote controller is pressed, the name of the channel, the name of the program, an image of the broadcasting program and the like which are under the recording operation are displayed on the slave screen in the TV 1 as shown in B of FIG. 17, and the smart unit 12 is lit at a luminance in synchronization with the superimposed display of the slave screen in red.

In addition, for example, in a state in which the user is using a video chatting function via the Internet and a program image is displayed in a full screen without displaying a video chatting screen (also referred to as a video chatting image), the smart unit 12 emits yellow light corresponding to the video chatting function. Then, when the screen display button of the remote controller is pressed, the video chatting screen is displayed in the slave screen on the display 14, and the smart unit 12 is lit at a luminance in synchronization with the superimposed display of the slave screen in yellow as shown in C of FIG. 17.

As described above, when the user presses the screen display button of the remote controller, the display 14 displays supplementary information using the slave screen, and the smart unit 12 is lit at a luminance in synchronization with the slave screen in the color corresponding to the type of the supplementary information.

Accordingly, the user can ascertain what function the TV 1 is operating only by seeing the state of the smart unit 12 continuously lit in a predetermined color. In other words, an operation of a predetermined function or a set state of the TV 1 can be instantaneously recognized. In addition, supplementary information of the function being operated can also be displayed as a slave screen when necessary.

[6.4 Other Operations]

Examples of associated lighting expressions corresponding to other operations in which image displays of the display 14 are combined with lighting expressions of the LED indicator 84 will be described with reference to FIGS. 18 to 21.

Note that, in FIGS. 18 to 21, "A" displayed on circular light in display images of the display 14 is a display indicating a predetermined function that a user is currently operating (an up or down key operation or drag operation).

Figure 18:
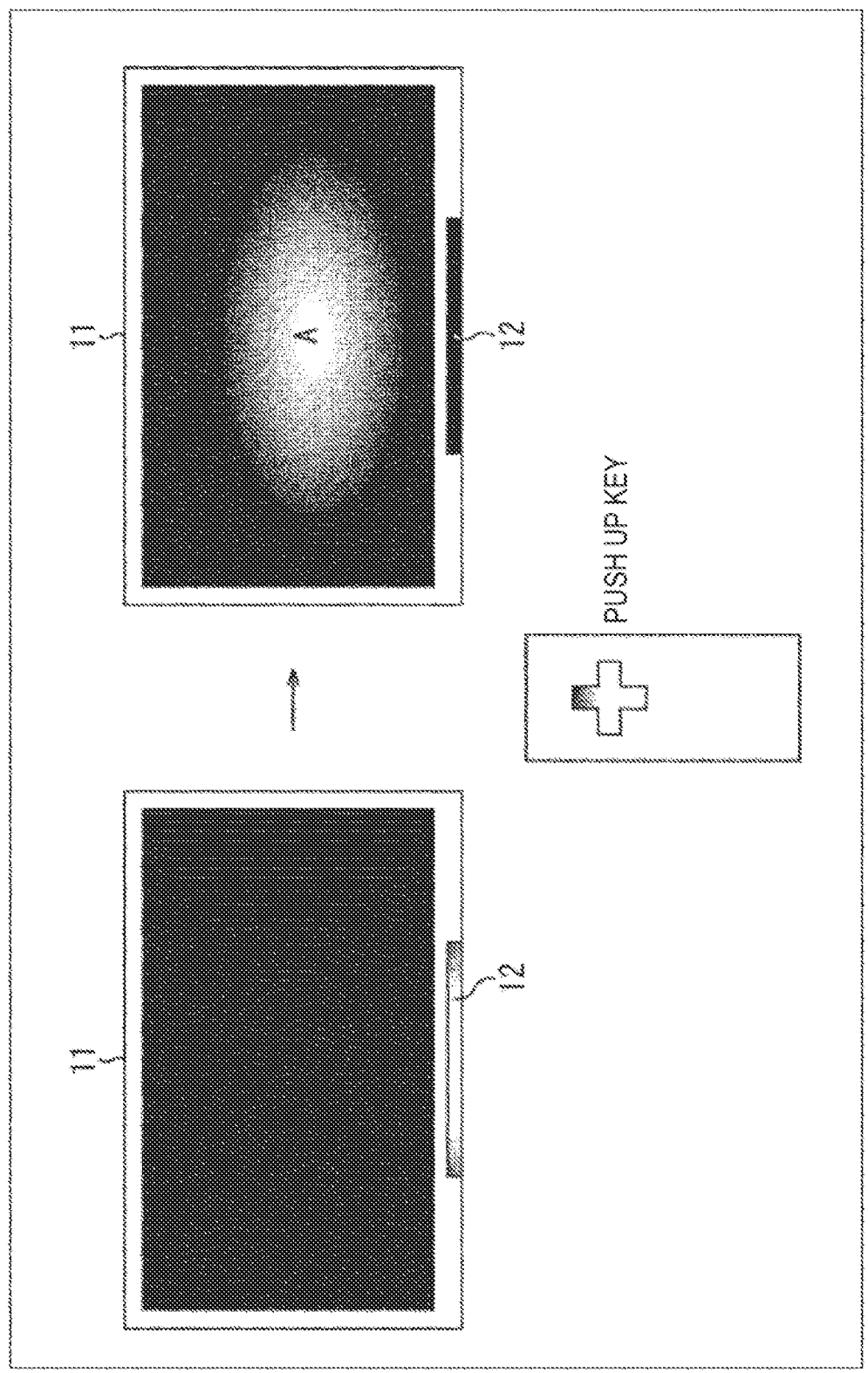
FIG. 18 is a diagram for describing an example of an associated lighting expression corresponding to an operation of an up key.

FIG. 18 shows an associated lighting expression when the up key among four direction keys including the up key, down key, right key, and left key of the remote controller is pressed.

When the up key is pressed, an associated lighting expression is performed to resemble light moving in the upward direction corresponding to the up key. To be specific, the smart unit 12 is first lit. Then, as the light of the smart unit 12 gradually disappears, an image of light displayed near the smart unit 12 moving upward toward the center of the screen is displayed on the display 14.

Figure 19:
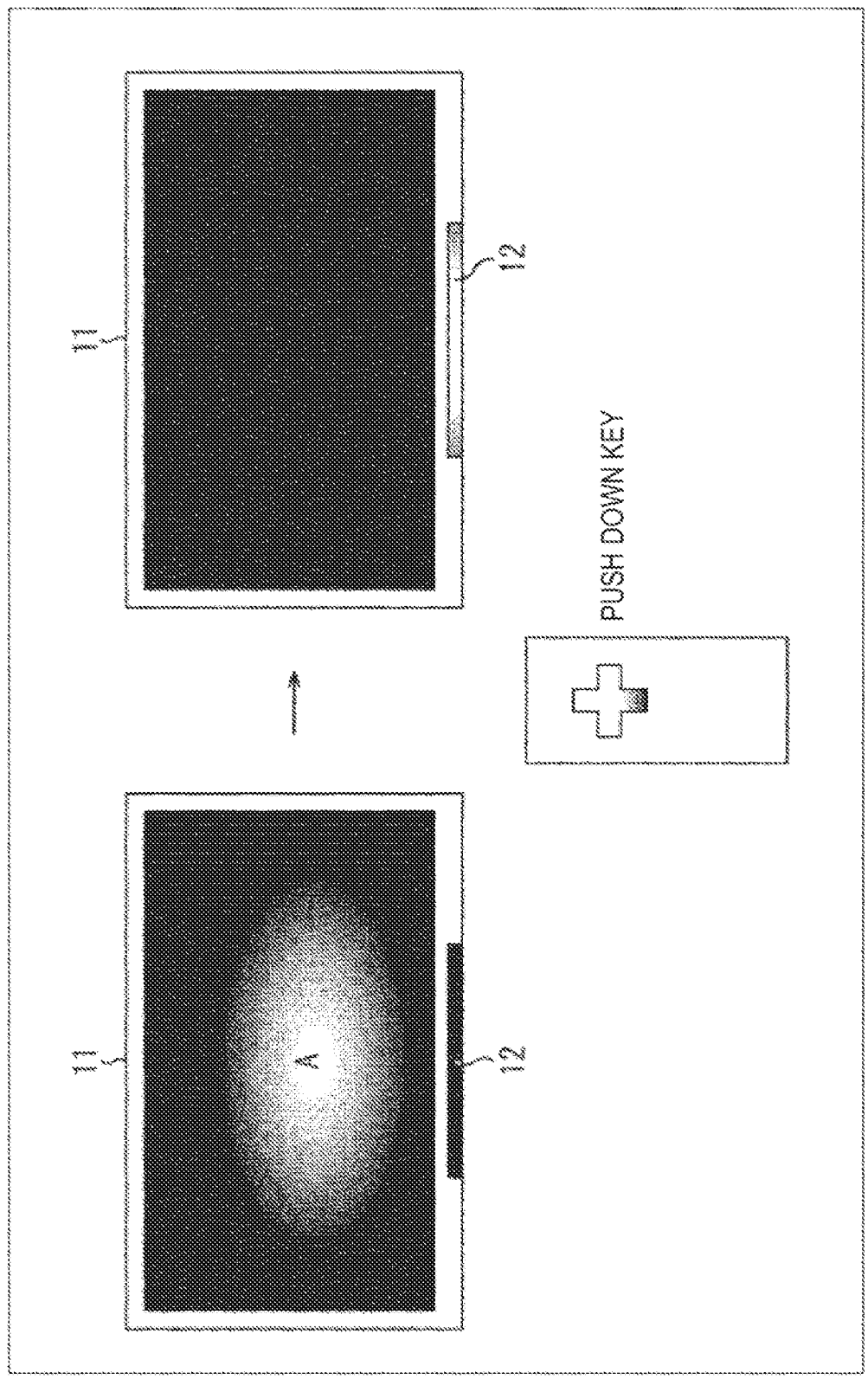
FIG. 19 is a diagram for describing an example of an associated lighting expression corresponding to an operation of a down key.

FIG. 19 shows an associated lighting expression when the down key of the remote controller is pressed.

When the down key is pressed, the associated lighting expression is performed to resemble light moving in the downward direction corresponding to the down key. To be specific, an image with circular light is displayed at the center of the screen of the display 14. Then, an image of the circular light at the center of the screen moving in the downward direction of the screen toward the smart unit 12 is displayed on the display 14. Next, as the light on the display 14 disappears, the smart unit 12 is lit, and then turns off.

Figure 20:
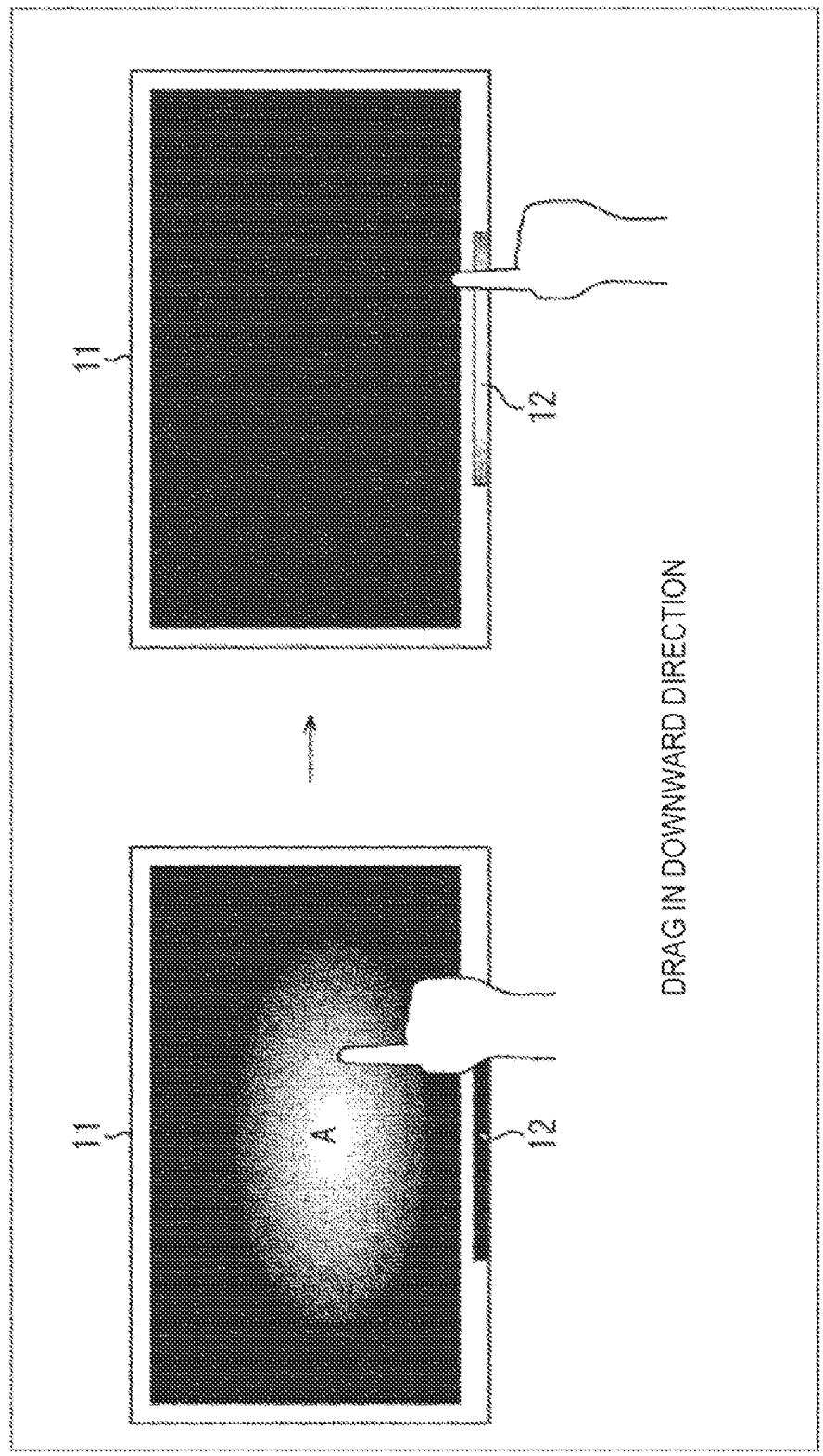
FIG. 20 is a diagram for describing an example of an associated lighting expression corresponding to an operation of downward dragging.

FIG. 20 shows an associated lighting expression when the display 14 of the TV 1 is a touch panel, and the user touches the display 14 with his or her finger and drags the finger in the downward direction of the screen toward the smart unit 12. In this case, the TV 1 performs the same image display and lighting as when the down key of the remote controller is pressed as described in FIG. 19.

Figure 21:
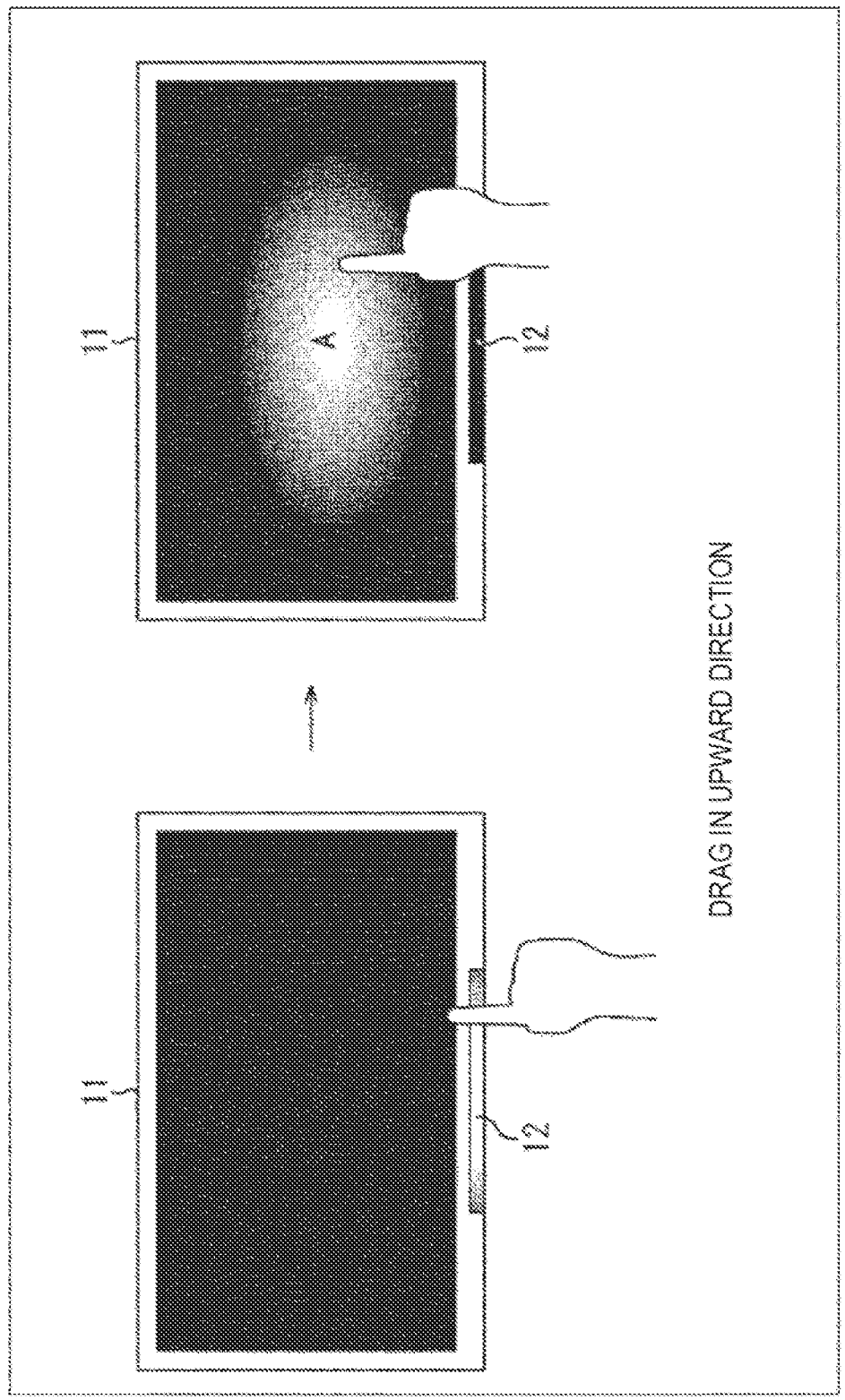
FIG. 21 is a diagram for describing an example of an associated lighting expression corresponding to an operation of upward dragging.

FIG. 21 shows an associated lighting expression when the display 14 of the TV 1 is a touch panel, and the user touches the display 14 with his or her finger and drags the finger in the upward direction of the screen from near the smart unit 12. In this case, the TV 1 performs the same image display and lighting as when the up key of the remote controller is pressed as described in FIG. 18.

As described above, when a predetermined setting operation is performed with respect to the TV 1, an associated lighting expression in which circular light appears to be absorbed by the smart unit 12 or circular light appears to be discharged from the smart unit 12 is performed. Note that the associated lighting expression is not limited to the exemplified "circular" shape, and an arbitrary color and shape can be employed. In addition, instead of the "circular light," predetermined text, a figure, or a combination thereof can be used.

When the smart unit 12 is lit or flickers at a predetermined luminance in a predetermined color, the user can quickly and simply recognize the content (meaning) indicated by lighting or flickering of the smart unit 12 by performing a pre-decided operation as described above.

[7. Associated Lighting Expression with a Screen-Off Operation]

The TV 1 has the camera 93 within the smart unit 12, and can sense a user in front of the TV 1 based on an image captured by the camera 93. In addition, the TV 1 has a screen-off function for not displaying an image for power saving when a state in which the user is not present in front of the TV 1 for a certain period of time is sensed.

Figure 22:
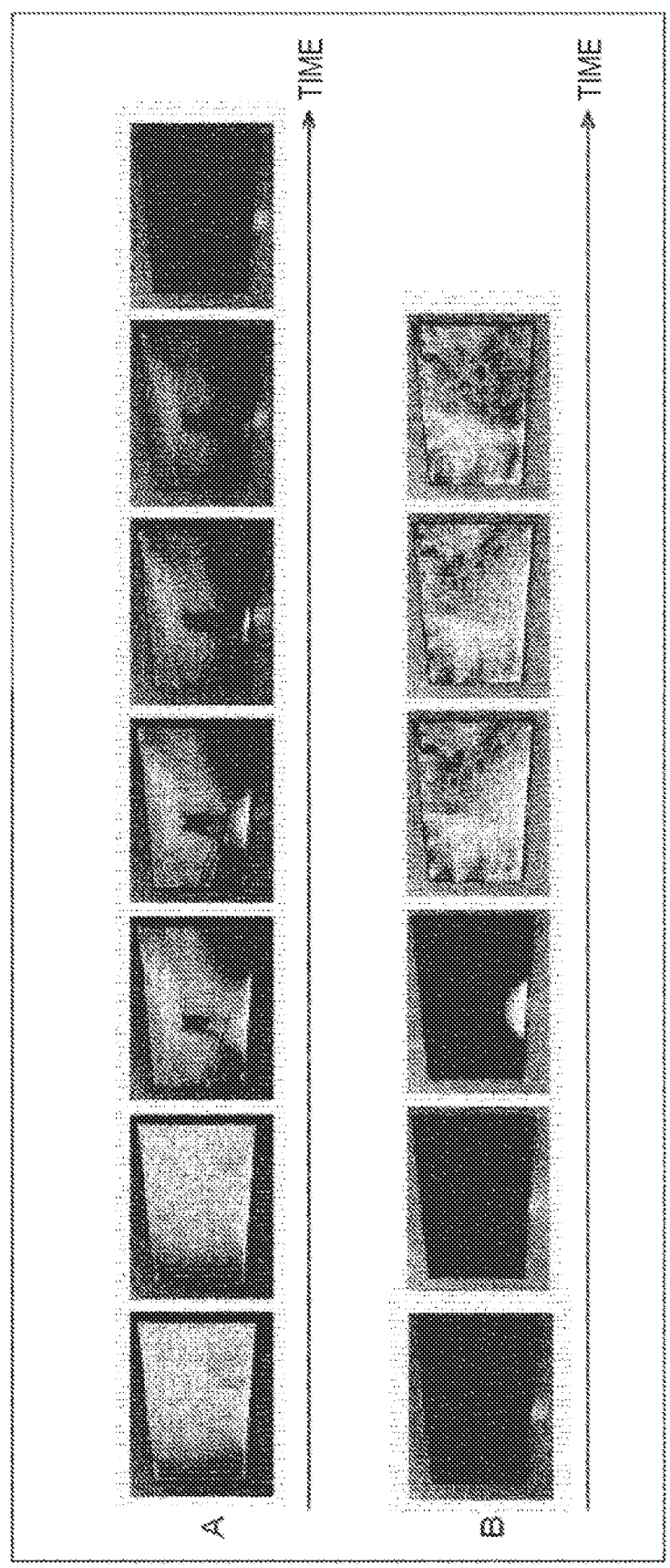
FIG. 22 is a diagram showing examples of associated lighting expressions in a screen-off operation.

A of FIG. 22 shows an associated expression in which an image display of the display 14 is combined with lighting of the smart unit 12 when the TV 1 is transitioned to the screen-off mode.

When a mode is transitioned to the screen-off mode, the control unit 66 controls the image display of the display 14 such that an image of which the screen is to be off appears to be absorbed by the smart unit 12 disposed on the lower side of the display 14 as shown in A of FIG. 22. In other words, in the image displayed on the display 14, as the image of which the screen is to be off is absorbed by the smart unit 12, a light emission luminance near the smart unit 12 increases. In addition, as the image displayed on the display 14 is absorbed by the smart unit 12, the smart unit 12 is lit brightly (a luminance increases). In other words, the control unit 66 controls display of the display 14 and lighting of the smart unit 12 so that a display ratio of the image on the display 14 is inversely proportional to the light emission luminance of the smart unit 12.

B of FIG. 22 shows an associated expression in which an image display of the display 14 is combined with lighting of the smart unit 12 when the mode returns to a normal mode (display mode) from the screen-off mode.

When the mode returns to the normal mode, the control unit 66 controls the image display so that the image to be displayed appears to be discharged from the smart unit 12 as shown in B of FIG. 22. In other words, an image with a high luminance is formed near the smart unit 12 of the display 14 and then the image to be displayed is enlarged over the entire screen. The smart unit 12 gradually shifts to a low luminance as the image to be displayed is displayed on the display 14. In other words, the light emission luminance of the smart unit 12 is lowered in inverse proportion to a display ratio of the image to be displayed on the display 14.

As described above, the control unit 66 performs the associated expression of the display 14 and the smart unit 12 in which the image of which the screen is to be off appears to be absorbed by the smart unit 12 or the image to be displayed appears to be discharged from the smart unit 12. The user can be made to perceive that the smart unit 12 is the core (center portion, or essence) of the TV 1.

[8. Association of a Video Chatting Screen with the LED Indicator 84]

Figure 23:
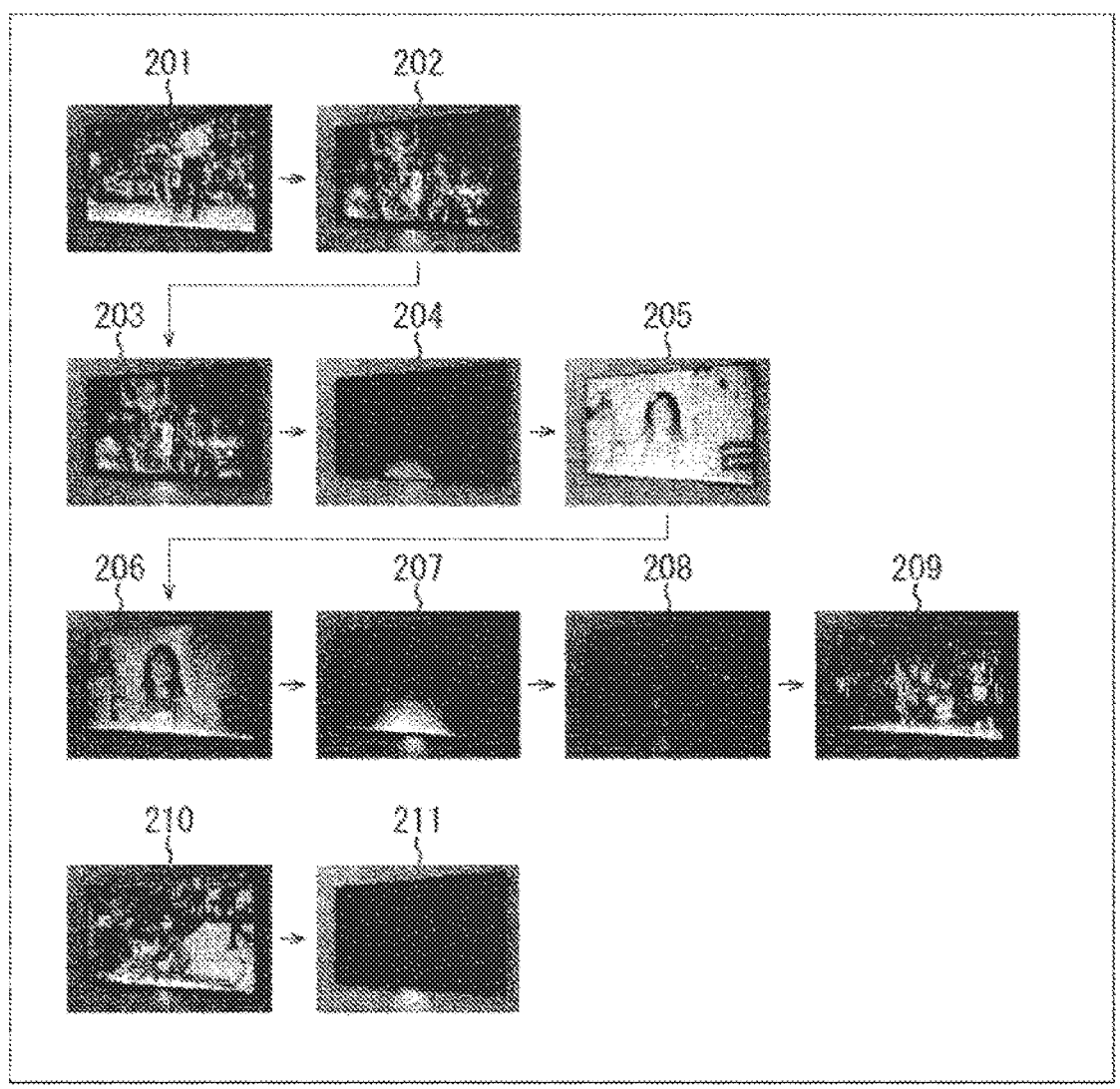
FIG. 23 is a diagram showing screen transitions when a video chatting function is used.

FIG. 23 shows screen transitions when the video chatting function is used in the TV 1 via the Internet.

When a user views a predetermined broadcasting program in the TV 1 as shown in an image 201, and there is an incoming call of video chatting from another user via a network such as the Internet, the TV 1 causes the smart unit 12 to light in synchronization with a sound indicating the incoming call of the video chatting as shown in an image 202. Here, the lighting in synchronization with a sound indicating the incoming call of the video chatting indicates that the light emission luminance of the LED indicator 84 changes according to a tone or volume of the sound indicating the incoming call of the video chatting. As described above with reference to C of FIG. 17, since an emitted light color of the LED indicator 84 is associated with a predetermined function, the user can recognize that the incoming call of the video chatting has arrived by visually recognizing a lighting color of the LED indicator 84 even if the sound indicating the incoming call of the video chatting is not heard.

The user responds to the incoming call of the video chatting by pressing a predetermined button of the remote controller. Then, the control unit 66 of the TV 1 causes a video chatting screen to be displayed in the associated expression in which the image display of the display 14 is combined with the lighting of the smart unit 12 as shown in images 203 and 204 as described with reference to B of FIG. 22. In other words, the control unit 66 controls lighting of the smart unit 12 and the display image of the display 14 such that the video chatting image appears to be discharged from the smart unit 12 over an image of the broadcasting program that is currently viewed.

When the user finishes the video chatting, the control unit 66 of the TV 1 erases the video chatting image with the associated expression in which the image display of the display 14 is combined with the lighting of the smart unit 12 as shown in images 206 to 209 as described with reference to A of FIG. 22. In other words, the control unit 66 controls the lighting of the smart unit 12 and the display image of the display 14 so that the video chatting image appears to be absorbed by the smart unit 12 disposed on the lower side of the display 14.

Note that, in the video chatting, chatting can also be performed in conversation only using voices without displaying the video chatting image on the display 14. In a voice conversation mode in which chatting is performed in conversation only using voices, the video chatting image is erased and the smart unit 12 is lit in synchronization with voices (sounds) of a conversation partner as shown in images 210 and 211.

In the above example, the case in which the video chatting image is displayed on the broadcasting program image being displayed has been described. However, even when another image is displayed and erased, an expression in which such an image display of the display 14 is combined with lighting of the smart unit 12 can be employed.

Figure 24:
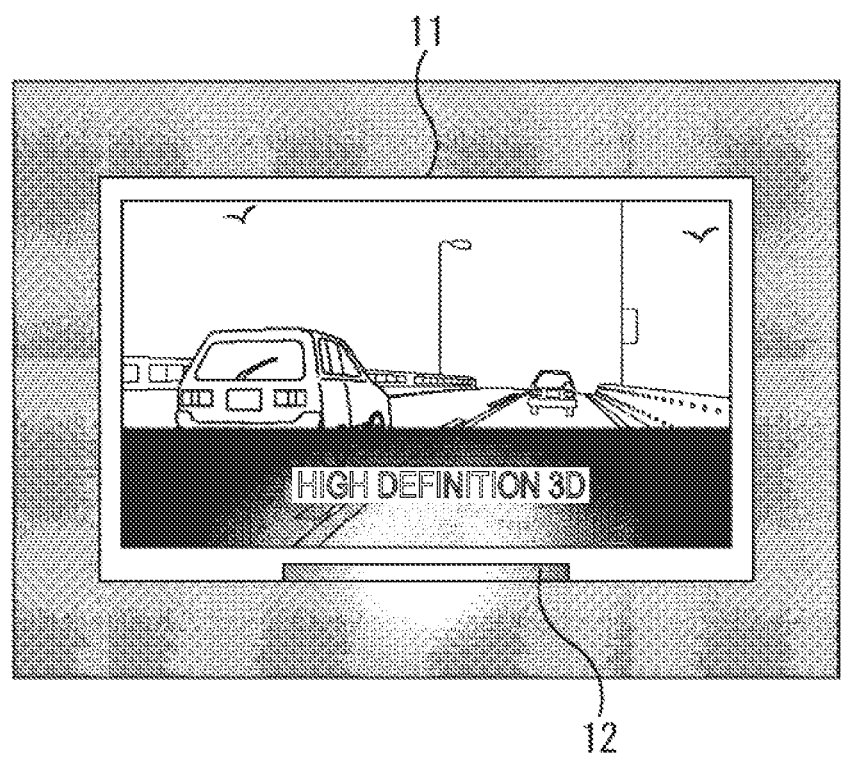
FIG. 24 is a diagram showing an example of an associated lighting expression in electronic POP.

FIG. 24 shows an example in which an expression in which an image display of the display 14 is combined with lighting of the smart unit 12 is applied to electronic POP (Point of purchase advertising).

In addition, such an expression in which an image display of the display 14 is combined with lighting of the smart unit 12 can be employed even when, for example, an individual user is recognized based on a user image captured by the camera 93 of the smart unit 12 and an information provision screen for providing optimum information for the recognized user is displayed and erased. Content of information to be provided to a user on the information provision screen can be changed according to not only the recognized individual user but also a time, date, weather, or the like. For example, when a user is recognized on a weekday morning, a train route, traffic information (traffic jam information) of roads, and the like registered in advance can be presented on the information provision screen.

As described above, when, on a first image being displayed on the display 14, a second image that is another image is displayed in a superimposed manner or erased, the associated expression in which the second image appears to be absorbed by the smart unit 12 or discharged from the smart unit 12 can be employed.

[9. Information Expression of the LED Indicator 84 Based on Video Viewing Experience]

Next, an example in which a user is caused to recognize predetermined information (a state) using an information descriptive image displayed on the display 14 and predetermined lighting of the LED indicator 84 of the smart unit 12 will be described.

[9.1 Correspondence to a Lighting Position]

An example in which a user is caused to recognize predetermined information according to an information descriptive image and a lighting position of the LED indicator 84 will be described with reference to FIG. 25.

As described above, since the three LEDs 21 are disposed side by side in the lateral direction, the LED indicator 84 can cause the LEDs to be independently lit to cause the user to be able to identify three positions of the left, the center and the right positions.

Figure 25:
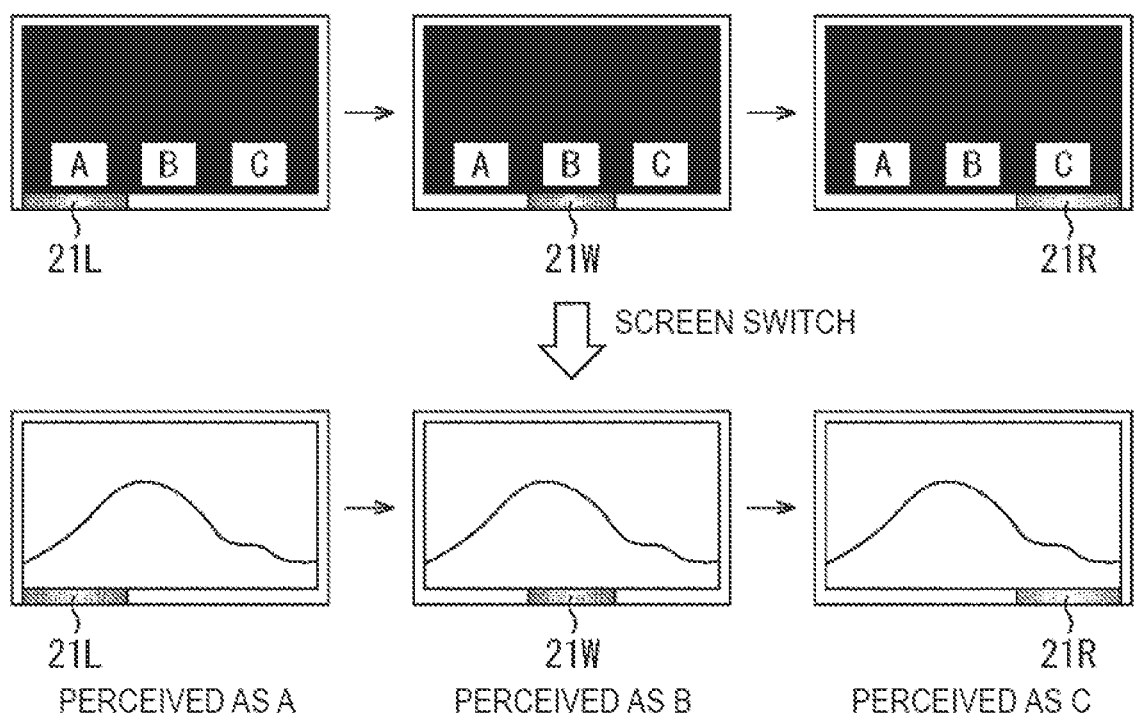
FIG. 25 is a diagram for describing an example of an information expression of the LED indicator corresponding to a lighting position.

Thus, the control unit 66 first causes descriptive images for describing predetermined information to be displayed in positions corresponding to the three LEDs 21 on the left, the center and the right of the display 14 as shown on the upper side of FIG. 25. In the example on the upper side of FIG. 25, an image for describing "information A" corresponding to the LED 21L on the left side, an image for describing "information B" corresponding to the LED 21W at the center, and an image for describing "information C" corresponding to the LED 21R on the right side are displayed.

In addition, while the descriptive images for describing the "information A," "information B," and "information C" are displayed, the control unit 66 causes the three LEDs 21 to be sequentially lit, for example, one by one to cause the user to recognize the correspondence relationship between the information A, information B, and information C and the LEDs 21.

Then, the image displayed on the display 14 is switched and the descriptive images are erased as shown on the lower side of FIG. 25. In the example of the lower side of FIG. 25, an image in which a mountain is drawn is displayed on the display 14 of the TV 1; however, the image itself is insignificant and has no relation to lighting of the smart unit 12.

When the LED 21L on the left side is on during the display of the mountain image on the display 14, the user who sees the LED perceives it as the "information A." When the LED 21W at the center is on, the user who sees the LED perceives it as the "information B." When the LED 21R on the right side is on, the user who sees the LED perceives it as the "information C." In this manner, when predetermined information is to be indicated, the control unit 66 causes the LEDs 21 to be lit in the positions corresponding to the information.

The above example will be described using a specific example. For example, a scene in which video chatting is performed with three partners at the same time is assumed. In this case, the control unit 66 displays a photographed image of a user A as the "information A" of the descriptive image displayed on the display 14, a photographed image of a user B as the "information B," and a photographed image of a user C as the "information C," and then switches the display 14 to a broadcasting program image. Then, the control unit 66 causes the LED 21L on the left side to be lit when the user speaks with the user A, causes the LED 21W at the center to be lit when the user speaks with the user B, and causes the LED 21R on the right side to be lit when the user speaks with the user C. The user in front of the TV 1 can easily recognize a user with whom the user speaks only by seeing a lighting position of the LED indicator 84.

Note that, in the example described above, an image with text that says "this position is for the user A" may be displayed, instead of the photographed images of the user A, the user B, and the user C.

Figure 26:
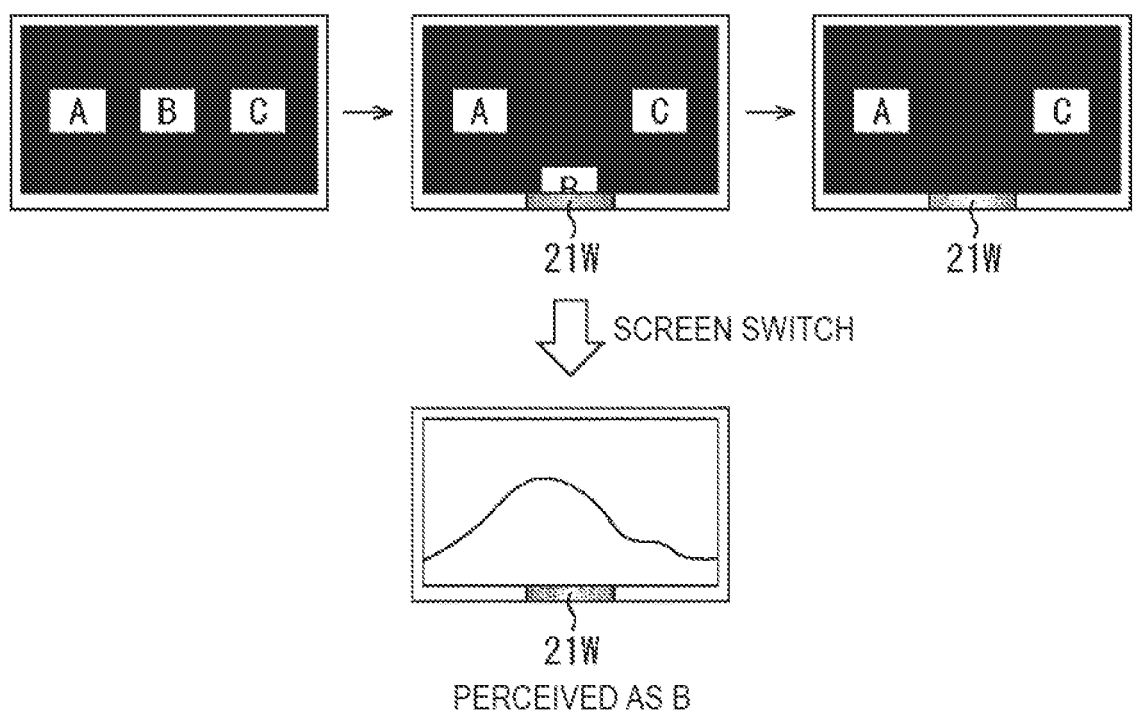
FIG. 26 is a diagram for describing an example of an information expression of the LED indicator corresponding to a lighting position.

FIG. 26 shows another example in which a user is caused to recognize predetermined information according to lighting positions of the LED indicator 84.

In the example of FIG. 26, the control unit 66 displays the descriptive images in the same manner as in FIG. 25, and then moves the image for describing the "information B" in the downward direction of the screen. Then, by causing the LED 21W at the center corresponding to the "information B" to be lit along with disappearance of the image for describing the "information B," the user recognizes the correspondence relationship between the predetermined information and the LED 21. Accordingly, when the LED 21W at the center is lit even after the image is switched, the user who sees the LED perceives the LED as the "information B."

[9.2 Correspondence to a Lighting Cycle]

An example in which a user recognizes predetermined information according to an information descriptive image and a lighting cycle (blinking pattern) of the LED indicator 84 will be described with reference to FIG. 27.

Figure 27:
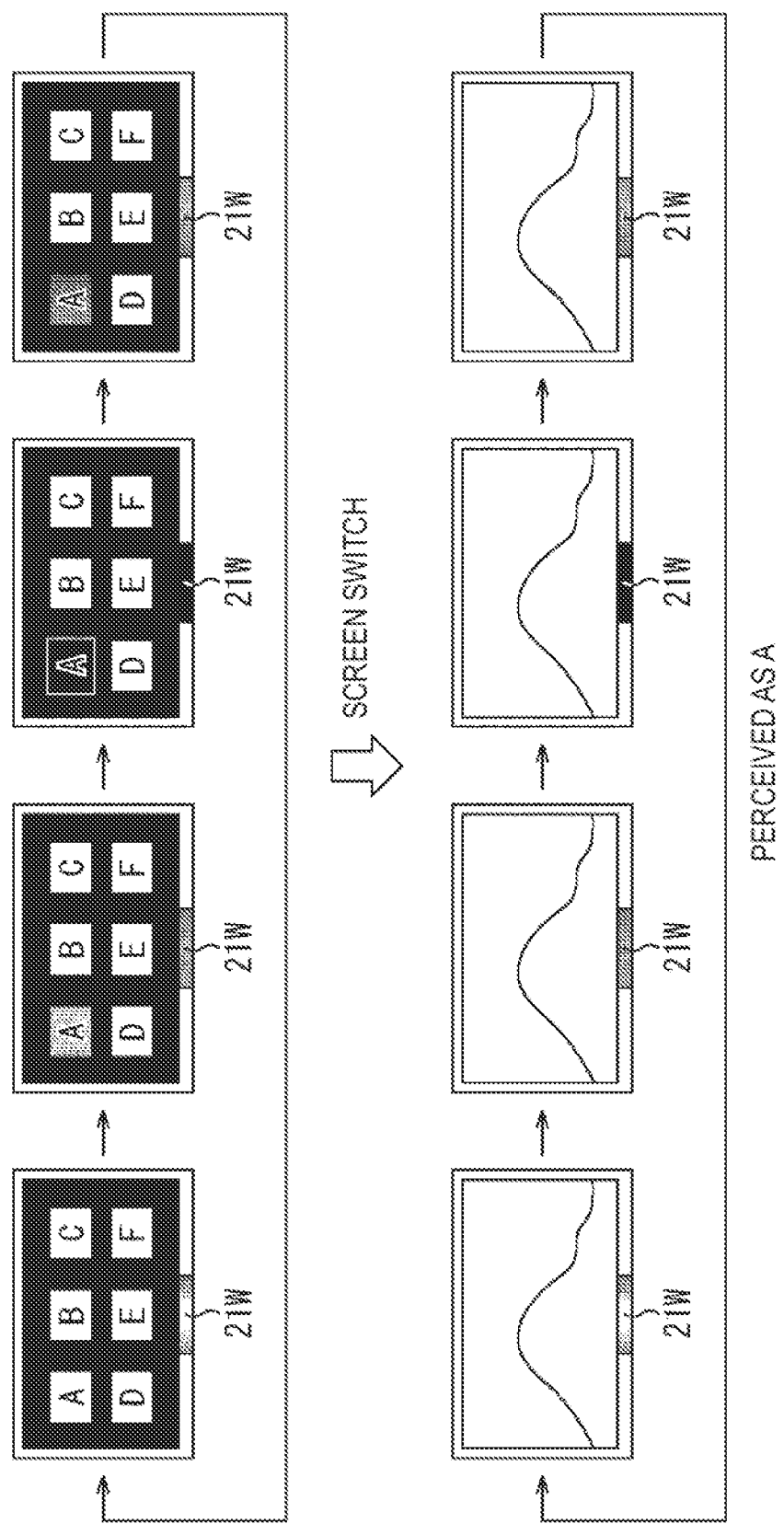
FIG. 27 is a diagram for describing an example of an information expression of the LED indicator corresponding to a lighting position.

In the example of FIG. 27, the number of pieces of information to be described is six including "information A" to "information F."

The control unit 66 first causes the descriptive images of the "information A" to "information F" to be displayed on the display 14 as shown on the upper side of FIG. 27, and the descriptive images of the "information A" to "information F" are sequentially displayed in different blinking patterns. In addition, at this moment, the LED 21W of the LED indicator 84 is also lit with brightness synchronized with the blinking patterns of the images.

Then, after the image of the display 14 is switched, the smart unit 12 is lit in any one blinking pattern among the blinking patterns of the "information A" to "information F" presented earlier in the descriptive images. For example, as shown in FIG. 27, the LED 21W of the smart unit 12 is assumed to be lit (to flicker) in the blinking pattern of the "information A." In this case, even if an irrelevant image is displayed on the display 14, the user perceives that the lighting means the "information A."

[9.3 Correspondence to a Lighting Color]

Next, an example in which the user recognizes predetermined information according to an information descriptive image and a lighting color of the LED indicator 84 will be described with reference to FIG. 28.

First, the control unit 66 causes descriptive images for describing the "information A," "information B," and "information C" to be displayed on the display 14 in the same manner as in the example shown in FIG. 25. However, a difference is that the descriptive images for describing the "information A," "information B," and "information C" are expressed in different colors in FIG. 28. For example, the "information A" is displayed in red, the "information B" is displayed in blue, and the "information C" is displayed in green.

Figure 28:
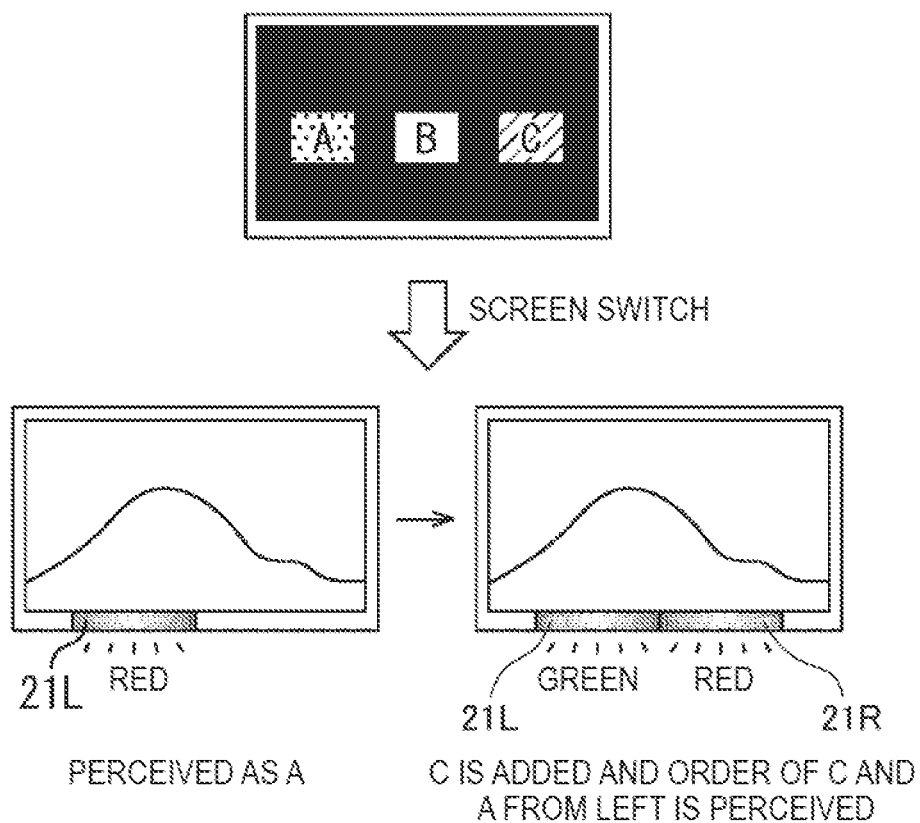
FIG. 28 is a diagram for describing an example of an information expression of the LED indicator corresponding to a lighting position.

Then, after an image of the display 14 is switched and accordingly the descriptive images are erased, if the color LED 21L is lit in red as shown on the left side of FIG. 28, the user who sees the lighting perceives that the lighting means the "information A."

In addition, lighting of the smart unit 12 enables content and ranking of the information to be recognized by defining the right-left direction of the smart unit 12 as a time axis, and arranging and lighting a plurality of colors in the time-axis direction. On the right side of FIG. 28, the color LED 21L displays green and the color LED 21R displays red, and thus the user perceives the order of the "information C" and the "information A" that is the order of the colors green and red.

[10. Associated Expression Corresponding to a User Operation Performed with Respect to the Smart Unit 12]

The smart unit 12 has the touch sensor 85 and thus can sense contact or proximity of a hand or a finger of a user as described above. In addition, the smart unit 12 has the NFC communication unit 88 and the BT communication unit 89, and thus can communicate with other NFC devices or BT devices. Furthermore, since the smart unit 12 has the camera 93, the smart unit can sense operations of a user.

The TV 1 can perform a predetermined associated expression using lighting of the LED indicator 84 and an image display of the display 14 corresponding to various operations of the user with respect to the smart unit 12.

[10.1 Associated Expression Corresponding to a Touch Operation with Respect to the Smart Unit 12]

Figure 29:
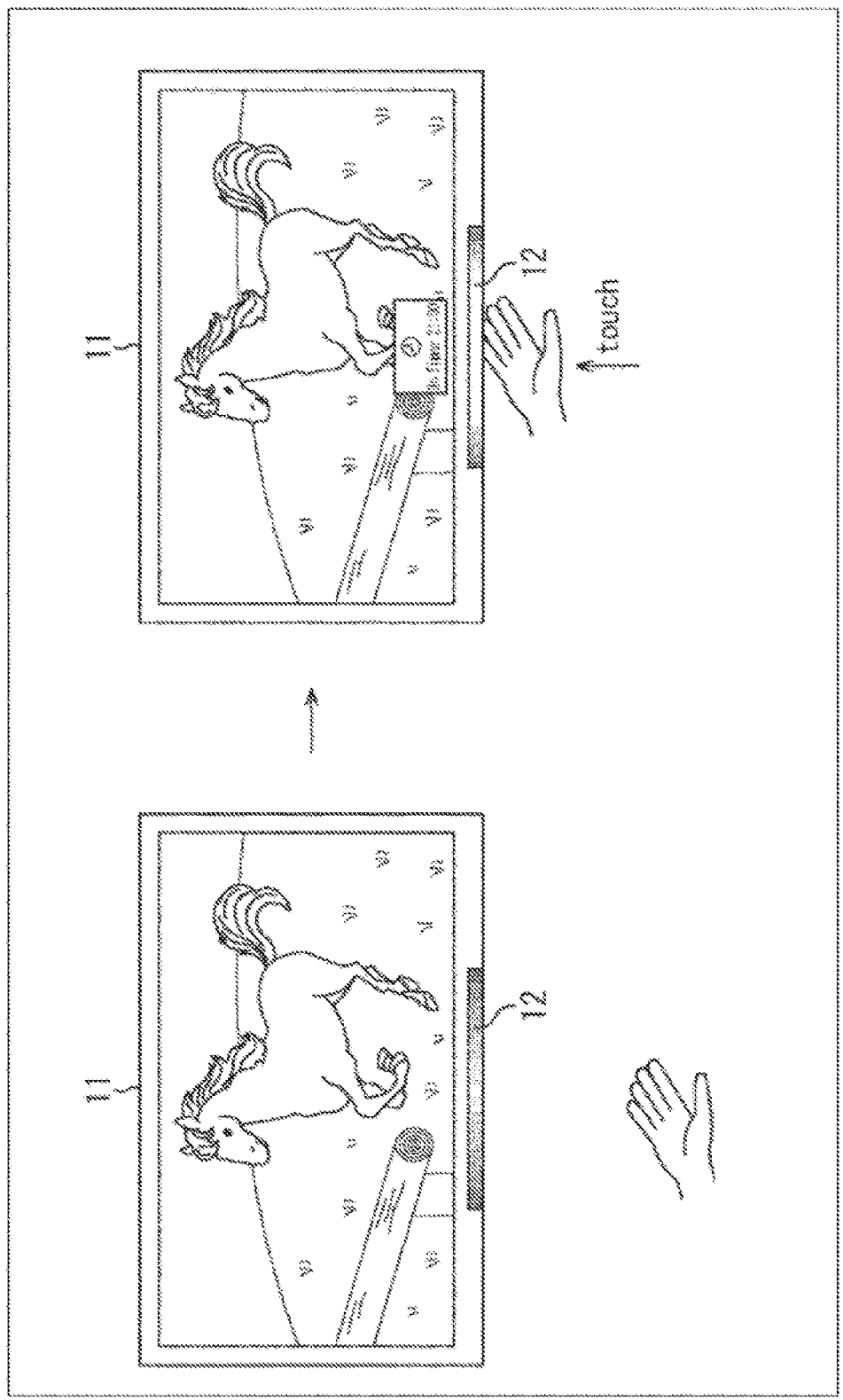
FIG. 29 is a diagram showing an example of an associated expression corresponding to a touch operation with respect to the smart unit.

FIG. 29 shows an example of an associated expression corresponding to a touch operation with respect to the smart unit 12.

The example in which, when the timer function is being operated in the TV 1, the smart unit 12 is lit in orange that is an emitted light color corresponding to the timer function, and when the screen display button of the remote controller is pressed, the supplementary information is displayed on the slave screen has been described above in FIG. 16.

The example of FIG. 29 shows that the same associated expression is performed when a touch operation with respect to the smart unit 12 is detected, instead of pressing of the screen display button of the example of FIG. 16.

When the timer function is being operated in the TV 1, the smart unit 12 is lit in orange that is the emitted light color corresponding to the timer function. The user touches the smart unit 12 that is lit in orange with his or her hand. When the touch operation of the user with respect to the smart unit 12 is detected, the control unit 66 of the TV 1 causes the slave screen to be displayed as supplementary information in a superimposed manner, and causes (the LED indicator 84 of) the smart unit 12 to emit light in a color corresponding to the function in synchronization with the slave screen as shown in FIG. 16.

The user can ascertain what function of the TV 1 is being operated only by seeing the state in which the smart unit 12 is continuously lit in a predetermined color. In other words, an operation of a predetermined function or a set state of the TV 1 can be instantaneously recognized. In addition, with only a simple operation of touching the smart unit 12, the supplementary information of a function being operated can be displayed as a slave screen and content thereof can be retrieved.

Figure 30:
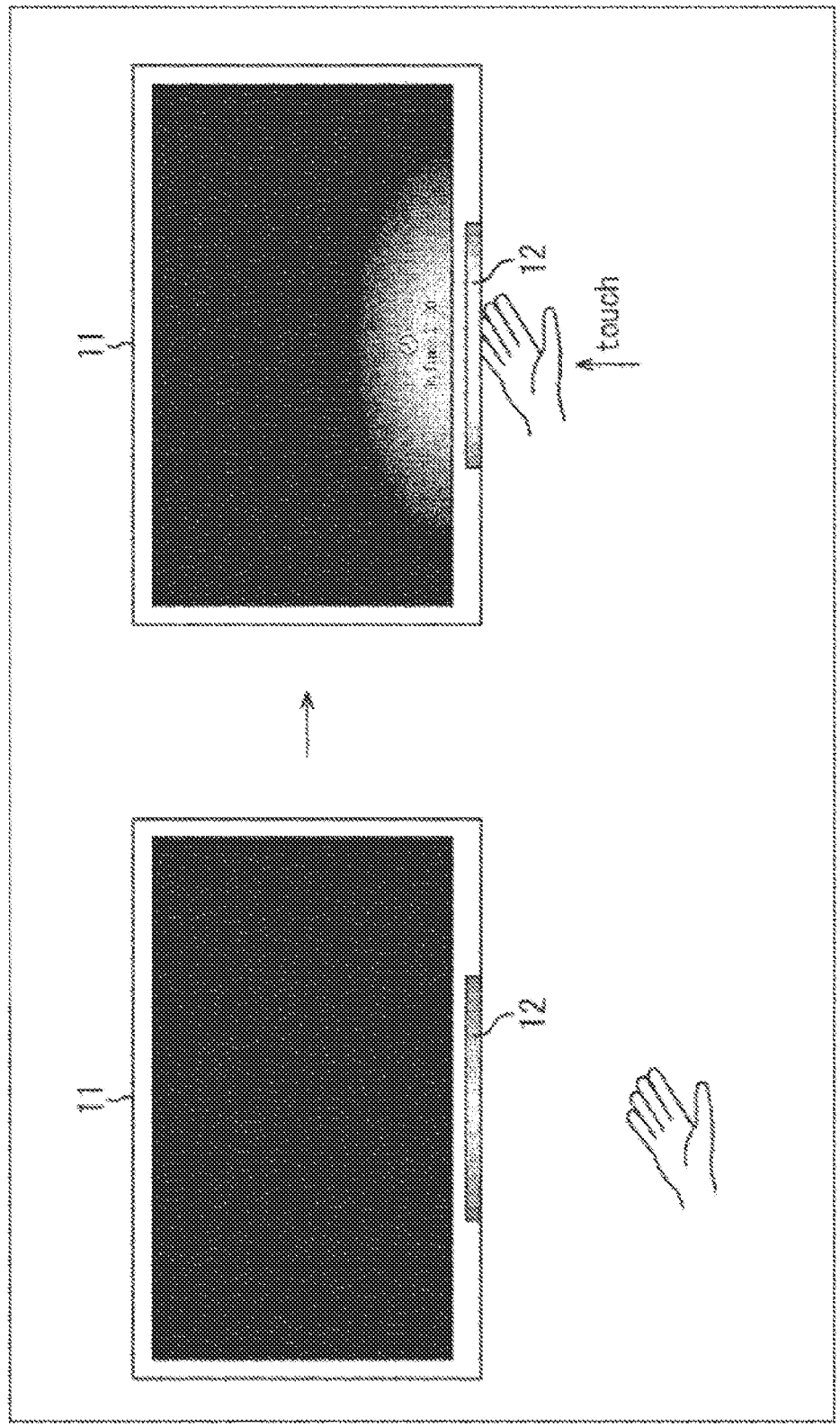
FIG. 30 is a diagram showing an example of an associated expression corresponding to a touch operation with respect to the smart unit.

FIG. 29 is an example in which a predetermined image such as a broadcasting program image is displayed as a master screen as in the case of FIG. 16 described above; however, FIG. 30 shows an example in which an image is not displayed in the standby state of the TV 1 and a touch operation with respect to the smart unit 12 is detected.

Also in this case, when the TV 1 detects a touch operation of a user with respect to the smart unit 12, supplementary information is displayed near the smart unit 12 within the display 14 and the LED indicator 84 of the smart unit 12 is caused to emit light in a color corresponding to the function in synchronization with the display of the supplementary information.

[10.2 Associated Expression Corresponding to an NFC Proximity Operation with Respect to the Smart Unit 12]

Figure 31:
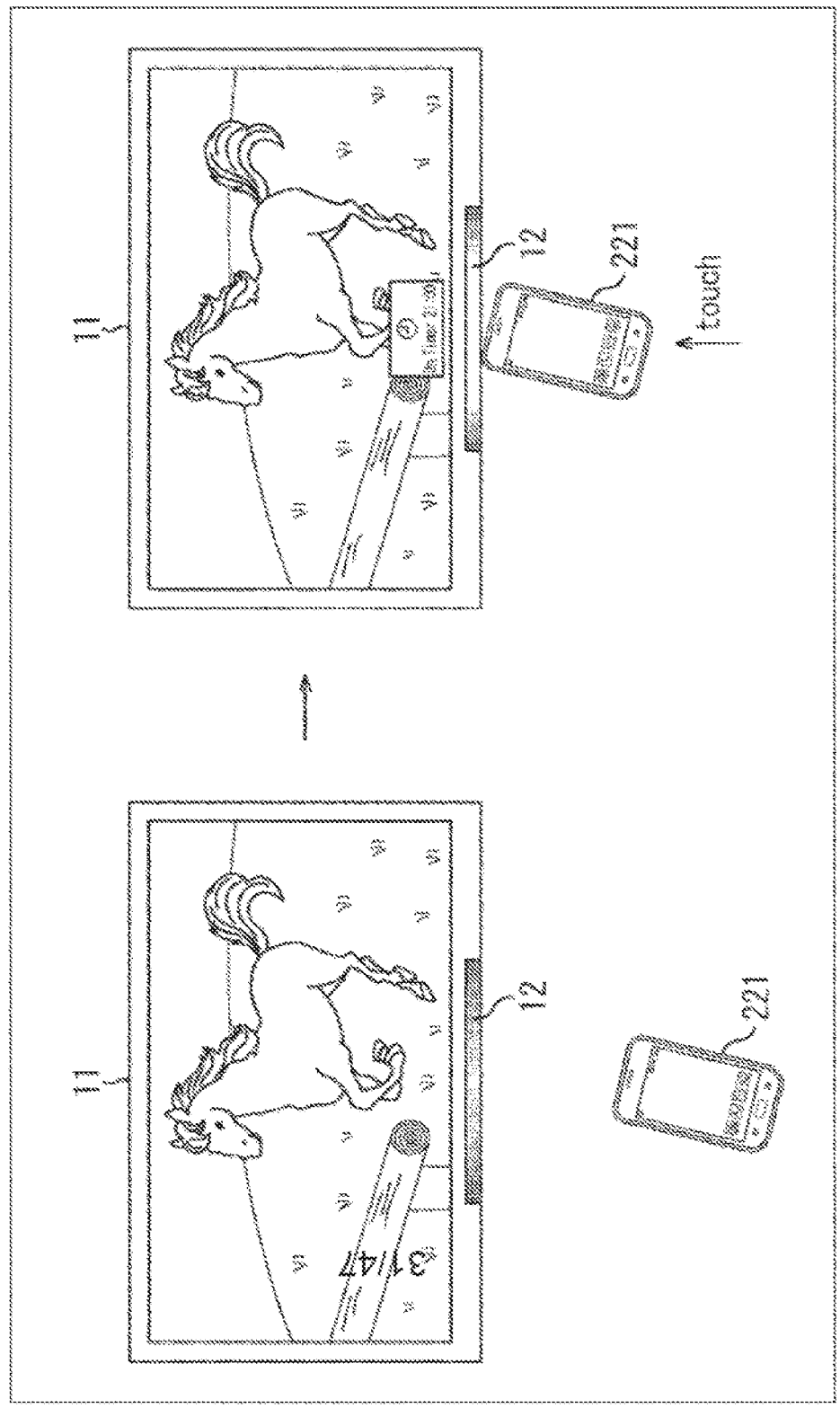
FIG. 31 is a diagram showing an associated expression corresponding to an NFC proximity operation with respect to the smart unit.

FIG. 31 shows an associated expression corresponding to an NFC proximity operation with respect to the smart unit 12.

In the example of FIG. 31, a user holds a mobile terminal (such as a smartphone) 221 that has an NFC communication function and brings the mobile terminal close to the smart unit 12, rather than his or her hand.

When the TV 1 detects proximity of the mobile terminal 221 to the smart unit 12, the smart unit 12 is lit indicating that the proximity has been detected. For example, the LED indicator 84 is lit in synchronization or association with an LED lamp of the mobile terminal 221.

Then, the TV 1 performs the same associated expression as in FIG. 29. In other words, the TV 1 causes the slave screen to be displayed in a superimposed manner as supplementary information and causes the LED indicator 84 to emit light in a color corresponding to the function in synchronization with the slave screen as shown in FIG. 16.

Figure 32:
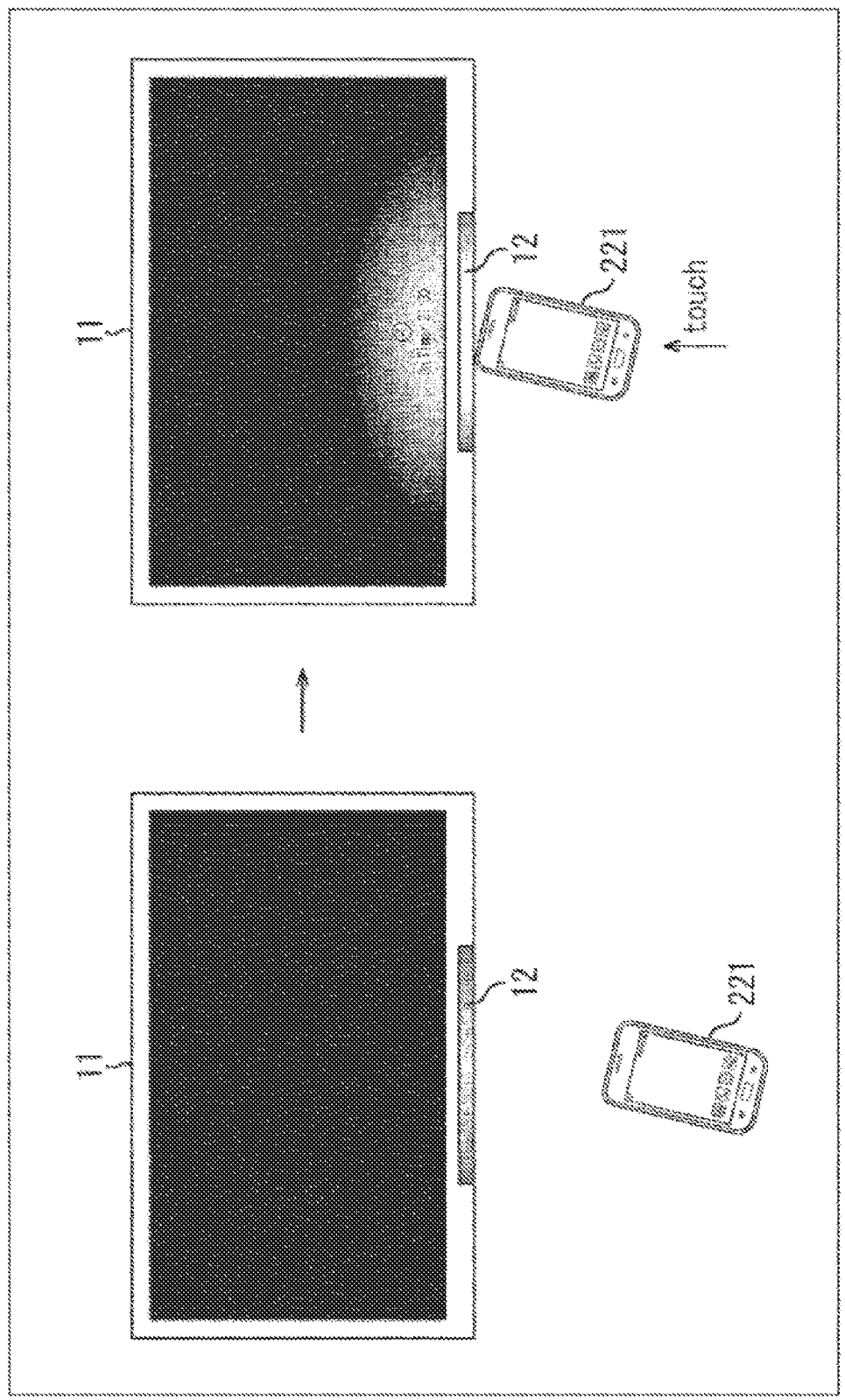
FIG. 32 is a diagram showing an associated expression corresponding to an NFC proximity operation with respect to the smart unit.

FIG. 32 shows an example in which, when the TV 1 is in the standby state, proximity of the mobile terminal 221 to the smart unit 12 is detected.

Also in this case, when proximity of the mobile terminal 221 to the smart unit 12 is detected, the smart unit 12 is lit indicating that the proximity has been detected. Next, supplementary information is displayed near the smart unit 12 within the display 14, and the LED indicator 84 emits light in a color corresponding to the function in synchronization with the display of the supplementary information.

[10.3 Associated Expression Corresponding to Data Transfer Between a Mobile Terminal and the TV 1]

Figure 33:
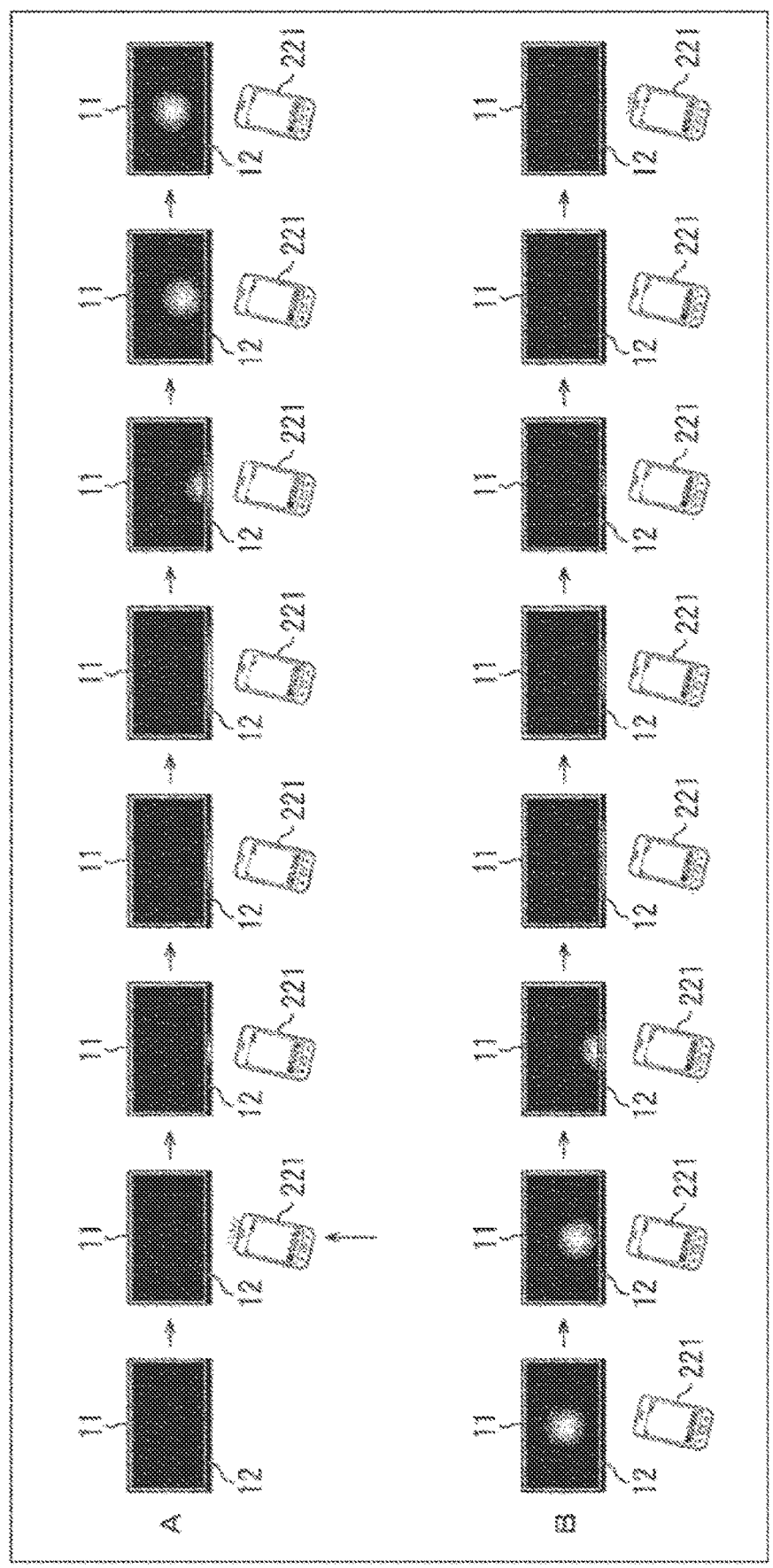
FIG. 33 is a diagram showing an example of an associated expression corresponding to data transfer.

FIG. 33 shows an example of an associated expression corresponding to data transfer performed between the proximate mobile terminal 221 and the smart unit 12.

A of FIG. 33 shows an example of an associated expression when data is transferred from the mobile terminal 221 to the TV 1.

A user brings the mobile terminal 221 close to the smart unit 12 of the TV 1. When proximity of the mobile terminal 221 to the smart unit 12 is detected, the control unit 66 of the TV 1 causes the smart unit 12 to light in synchronization with the LED lamp of the mobile terminal 221. In other words, the LED indicator 84 of the smart unit 12 and the LED lamp of the mobile terminal 221 emit light at the same timing, are continuously on, or repeatedly turn on and off in the same blinking pattern.

Next, data transfer from the mobile terminal 221 to the TV 1 is started using NFC communication. The control unit 66 of the TV 1 starts acquisition of predetermined data from the mobile terminal 221 in the NFC communication.

During the data transfer operation, the control unit 66 of the TV 1 performs a lighting expression indicating data input combined with lighting of the LED lamp of the mobile terminal 221. To be specific, the LED lamp of the mobile terminal 221 is lit first at a predetermined luminance. Then, corresponding to a light-off operation (reduction of a luminance) of the LED lamp of the mobile terminal 221, the control unit 66 of the TV 1 performs the lighting expression as shown in B of FIG. 11 or D of FIG. 11 in which the LED indicator 84 is combined with the image display of the display 14. A of FIG. 32 shows an example in which the TV 1 performs the lighting expression of B of FIG. 11.

B of FIG. 33 shows an example of an associated expression when data is transferred from the TV 1 to the mobile terminal 221.

A lighting expression performed when (the smart unit 12 of) the TV 1 and the mobile terminal 221 detect communication partners as NFC communication devices is the same as in A of FIG. 33.

When data transfer from the TV 1 to the mobile terminal 221 is started, the control unit 66 of the TV 1 performs a lighting expression indicating data output combined with lighting of the LED lamp of the mobile terminal 221. To be specific, the control unit 66 of the TV 1 first performs the lighting expression as shown in A of FIG. 11 or C of FIG. 11 in which the LED indicator 84 is combined with the image display of the display 14. Then, in the mobile terminal 221, corresponding to a light-off operation (reduction of a luminance) of the LED indicator 84, the LED lamp of the mobile terminal 221 is gradually lit and then turns off. B of FIG. 33 shows an example in which the TV 1 performs the lighting expression of A of FIG. 11.

As described above, the TV 1 performs a lighting expression associated (synchronized or linked) with a display unit (LED lamp) of an external device that is a communication partner of NFC communication using the LED indicator 84 to indicate detection of the communication partner.

In addition, the TV 1 indicates data input and output operations by further associating an associated expression in which lighting of the LED indicator 84 is combined with an image display (a video expression) with lighting of the LED lamp of the external device that is a communication partner of NFC communication.

[10.4 Associated Expression Corresponding to a Gesture Operation with Respect to the Smart Unit 12]

The TV 1 has a gesture input mode in which a predetermined command is given to the TV 1 or predetermined information is input using a gesture operation.

Figure 34:
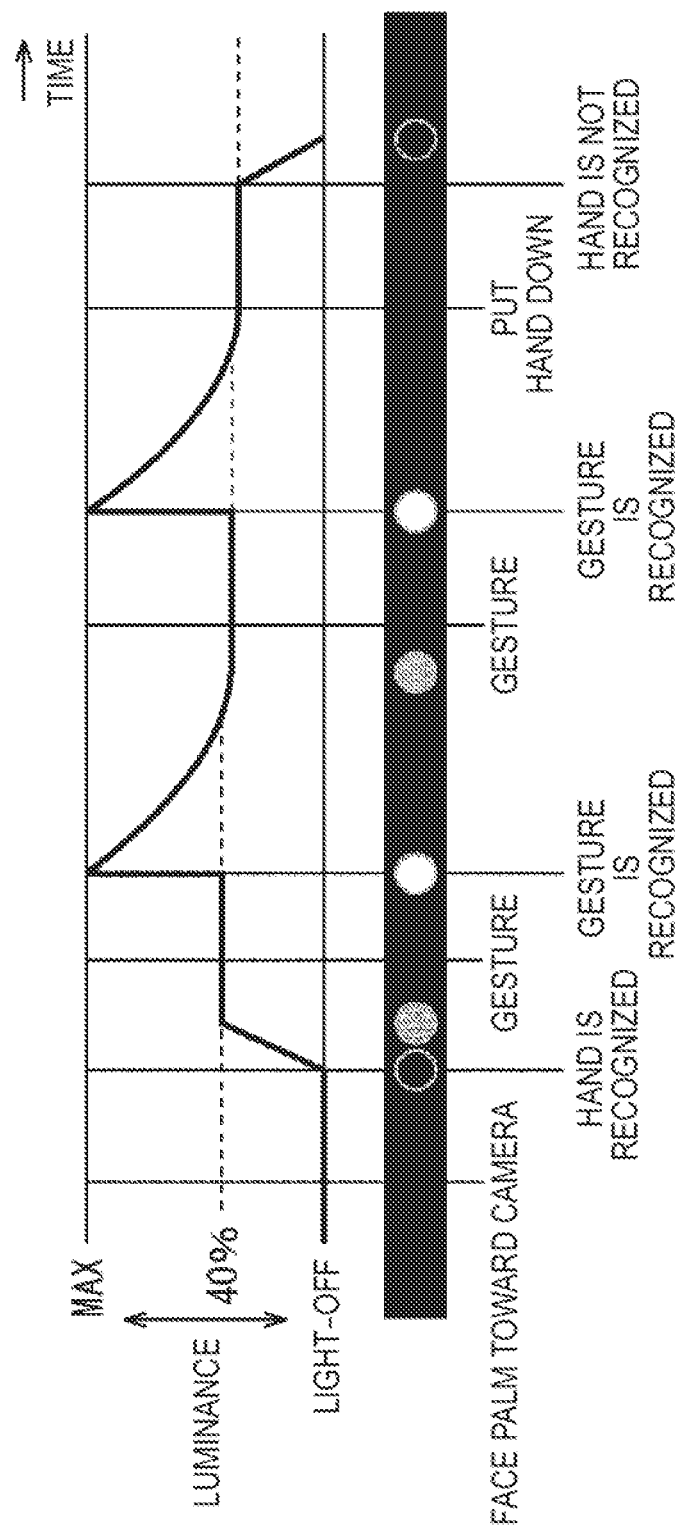
FIG. 34 is a diagram showing an example of an associated expression corresponding to a gesture operation.

The control unit 66 of the TV 1 performs control to cause the LED indicator 84 to be lit as shown in FIG. 34 in the gesture input mode when the user's hand is detected or a gesture is recognized.

In other words, the user positioned in front of the TV 1 has his or her palm toward the (camera 93 of the) TV 1. When the hand of the user is detected based on an image photographed by the camera 93, the control unit 66 causes the LED indicator 84 to be lit at a first luminance (for example, 40% luminance).

When the user makes a predetermined gesture decided in advance and the control unit 66 of the TV 1 recognizes the gesture based on the image photographed by the camera 93, a luminance instantly increases from the first luminance to a second luminance (for example, 100% luminance). Then, the control unit 66 gradually lowers the luminance from the second luminance to the first luminance.

When the gesture is recognized again based on the image photographed by the camera 93, the control unit 66 controls such that the luminance is instantly raised from the first luminance to the second luminance, and gradually returns to the first luminance. On the other hand, when the user puts his or her hand down and it is difficult to detect the palm of the user to be recognized, the control unit 66 causes the LED indicator 84 to turn off.

As described above, when a gesture is recognized, the control unit 66 controls the LED indicator 84 so that a lighting expression that leaves afterglow is made by changing the luminance from the first luminance to the second luminance according to the passage of time. By performing lighting in that manner, it is possible to easily ascertain whether the TV 1 that should receive a predetermined command or information has received a user's instruction.

[10.5 Associated Expression Corresponding to a Pairing Operation of a BT Device]

Figure 35:
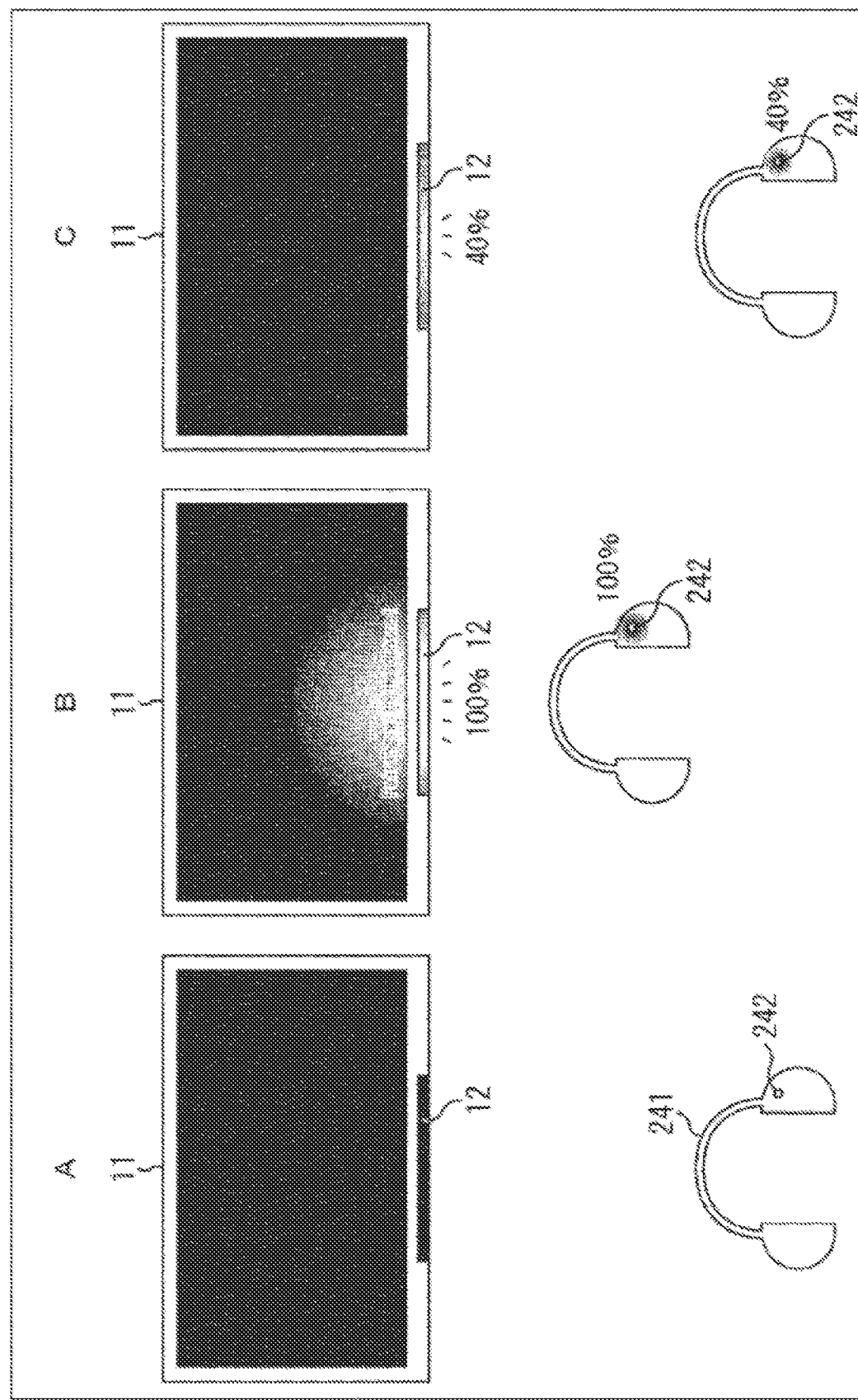
FIG. 35 is a diagram showing an example of an associated expression corresponding to a pairing operation of a BT device.

FIG. 35 shows an example of an associated expression corresponding to a pairing operation of a BT device.

Headphones 241 shown in FIG. 35 are a BT device that receives audio signals of a broadcasting program or the like from the TV 1 using BT communication and outputs sounds. The headphones 241 have an LED lamp 242 that emits predetermined light according to a power state or a communication state.

As shown in A of FIG. 35, before the TV1 and the headphones 241 which are BT devices are paired, the LED indicator 84 of the TV 1 the LED lamp 242 of the headphones 241 are off together.

A user performs a pairing operation of the TV 1 with the headphones 241. In other words, by the user performing a predetermined operation decided in advance on the headphones 241, the headphones 241 are transitioned to the pairing mode. In addition, the TV 1 is transitioned to the paring mode, and the control unit 66 of the TV 1 searches for a BT device located within a communicable range, thereby detecting the headphones 241.

The control unit 66 of the TV 1 executes a pairing operation with the detected headphones 241. Accordingly, the same passcodes (PIN codes) are shared between the TV 1 and the headphones 241.

When the pairing is completed, the TV 1 makes an associated expression in which lighting of the LED indicator 84 is combined with an image display (a video expression) indicating the completion of the pairing as shown in B of FIG. 35. In other words, the TV 1 causes the LED indicator 84 to emit light at a first luminance (for example, 100% luminance) and causes an image of semi-circular light to be displayed on the display 14 having the smart unit 12 as its center. In the image displayed on the display 14, text "Pairing with Headphone!" is also displayed. The lighting of the LED indicator 84 and the image display are controlled so as to be in synchronization with the same blinking pattern of the LED lamp 242 of the headphones 241. Note that the lighting of the LED indicator 84 and the image display may be performed so as to be linked with the blinking pattern of the LED lamp 242 of the headphones 241 with a predetermined time interval.

In second and succeeding connections of the TV 1 and the headphones 241 in which pairing is set, even when the BT devices are mutually detected, the same synchronized lighting control as in B of FIG. 35 is performed. In addition, when the TV 1 is in connection with the headphones 241 using BT communication, the LED indicator 84 of the smart unit 12 and the LED lamp 242 of the headphones 241 are continuously lit at a second luminance (for example, 40% luminance) lower than the first luminance.

[10. 6 Associated Expression with a Wi-Fi Device on a Home Network]

The TV 1 causes the smart unit 12 to be lit according to a communication state with another communication device connected to a home network in a wired or wireless manner.

The TV 1 is, for example, a DLNA-certified device corresponding to DLNA (Digital Living Network Alliance) guidelines, and can acquire content from other DLNA-certified devices based on the DLNA guidelines and display images of the acquired content on the display 14.

An operation (function) of outputting (images of) content that has been reproduced and displayed in a first DLNA-certified device from the first DLNA-certified device to a second DLNA-certified device is called "throw." On the other hand, an operation (function) of inputting (images of) content that has been reproduced and displayed in the second DLNA-certified device to the first DLNA-certified device is called "catch."

Figure 36:
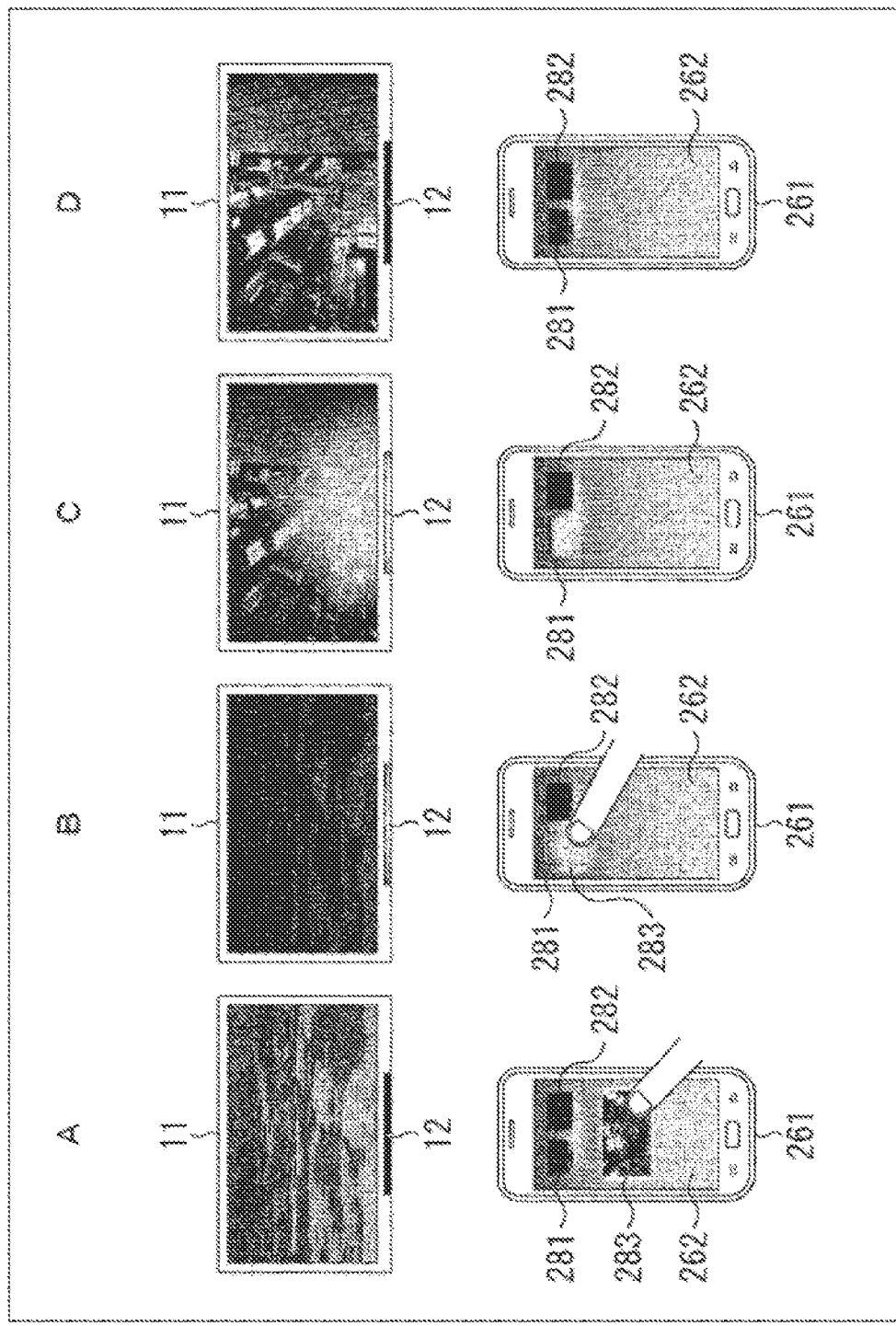
FIG. 36 is a diagram showing an example of an associated expression with a Wi-Fi device.

FIG. 36 shows an example of an associated expression of the TV 1 and a mobile terminal 261 made when content is thrown from the mobile terminal 261 that is the first DLNA-certified device to the TV 1 that is the second DLNA-certified device.

A user first selects a throw process of content that is being currently reproduced and displayed in the mobile terminal 261. Accordingly, throw device icons 281 and 282 which are icons of DLNA-certified devices connected to a home network are displayed as throw destination candidates on a display 262 of the mobile terminal 261 as shown in A of FIG. 36. In this example, it is assumed that the throw device icon 281 corresponds to the TV 1 and the throw device icon 282 corresponds to a personal computer (not shown) connected to the home network. Hereinbelow, the throw device icon 281 is also referred to as a TV icon 281 and the throw device icon 282 is referred to as a PC icon 282.

A user drags a content icon 283 that uses a thumbnail of reproduced and displayed content using his or her finger to move the content icon to the throw device icon 281 or 282 to which the content is desired to be thrown.

The user separates the dragged finger on the TV icon 281 from the display 262 to select the TV 1 as a throw destination.

When the dragged finger is separated on the TV icon 281, the content icon 283 disappears as if being absorbed by the TV icon 281 as shown in C of FIG. 36, and finally becomes as shown in D of FIG. 36. While the content icon 283 disappears as if being absorbed by the TV icon 281 and is no longer displayed, the LED indicator 84 of the smart unit 12 gradually brightens from a first luminance (50% luminance) to a second luminance (100% luminance) as shown in C of FIG. 36. Then, as shown in D of FIG. 36, as the LED indicator 84 gradually turns off from the second luminance, the image of the content reproduced and displayed in the mobile terminal 261 is displayed on the display 14 of the TV 1.

Figure 37:
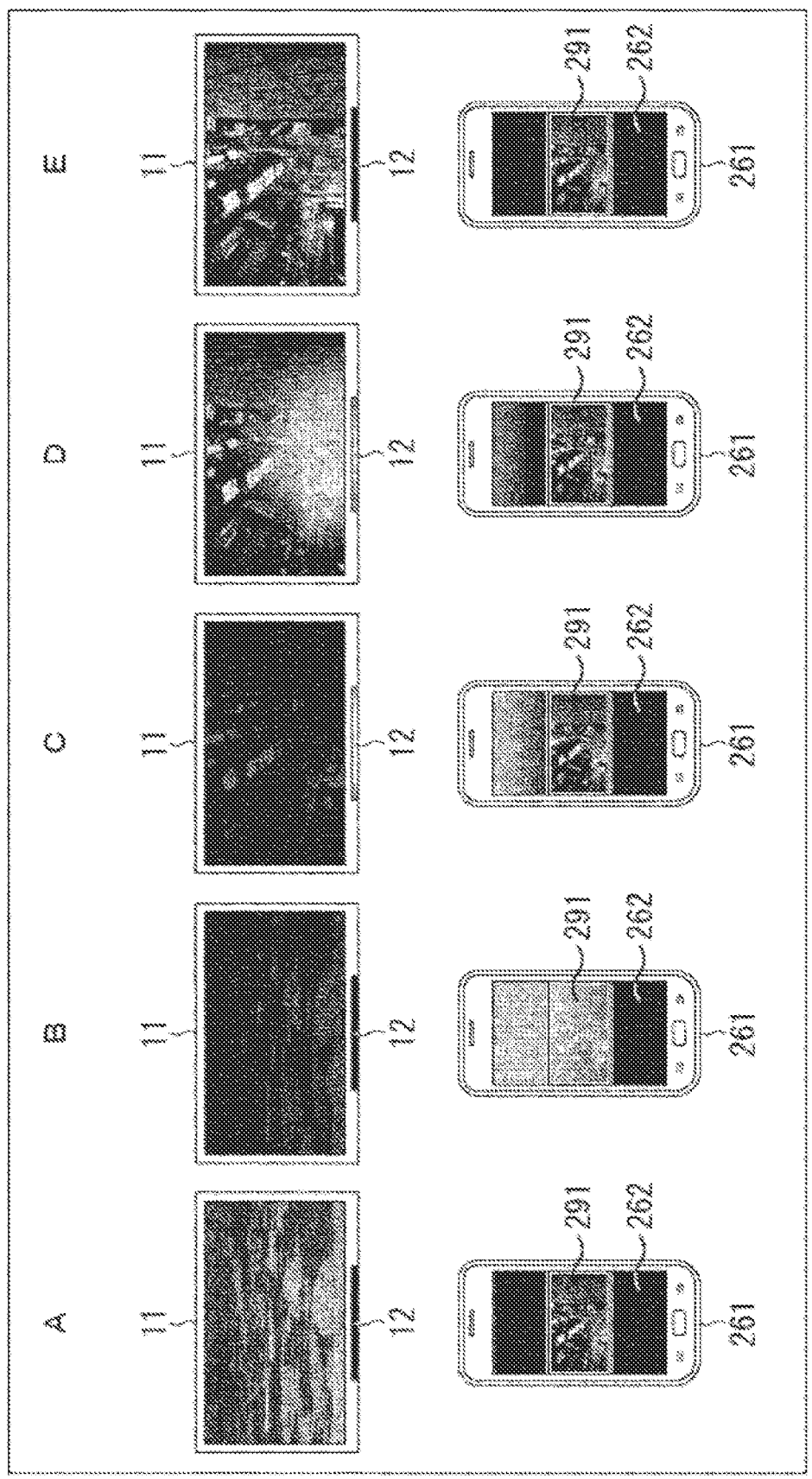
FIG. 37 is a diagram showing an example of an associated expression with a Wi-Fi device.

FIG. 37 shows a state in which a content image 291 reproduced and displayed on the display 262 of the mobile terminal 261 is gradually displayed on the TV 1. As shown in the sequence of A of FIG. 37, B of FIG. 37, C of FIG. 37, D of FIG. 37, and E of FIG. 37, the content image 291 being reproduced in the mobile terminal 261 is gradually displayed on the TV 1.

[Various Operations of Catch and Throw]

Associated communication of catch or throw and an associated expression of the display 14 and the LED indicator 84 of the TV 1 corresponding thereto will be described with reference to FIGS. 38 to 44.

Figure 38:
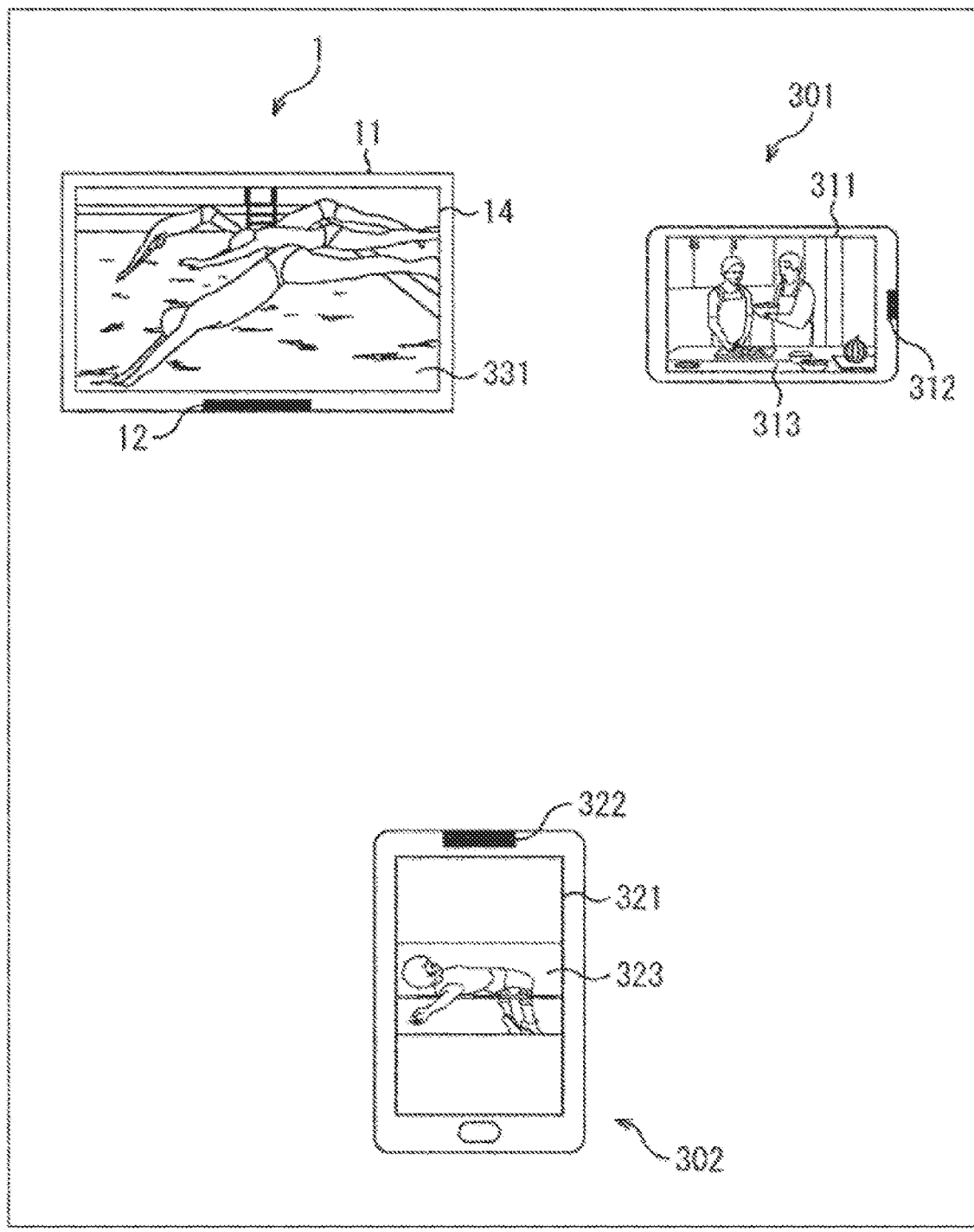
FIG. 38 is a diagram showing an example of an associated expression with a Wi-Fi device.

First, the TV 1, a tablet terminal 301, and a mobile terminal 302 that is also called a smartphone as shown in FIG. 38 are connected to a home network to which the TV 1 is connected.

The tablet terminal 301 has a display 311 and an LED lamp 312, a control unit (not shown) that controls the display and the lamp, and a wireless communication unit (not shown) that performs wireless communication of Wi-Fi communication, NFC communication, BT communication, or the like. A predetermined content image 313 is displayed on the display 311 of the tablet terminal 301. The mobile terminal 302 also has a display 321 and an LED lamp 322, a control unit (not shown) that controls the display and the lamp, and a wireless communication unit (not shown). A predetermined content image 323 is displayed on the display 321 of the mobile terminal 302. A content image 331 of a broadcasting program or the like is displayed on the display 14 of the TV 1.

Figure 39:
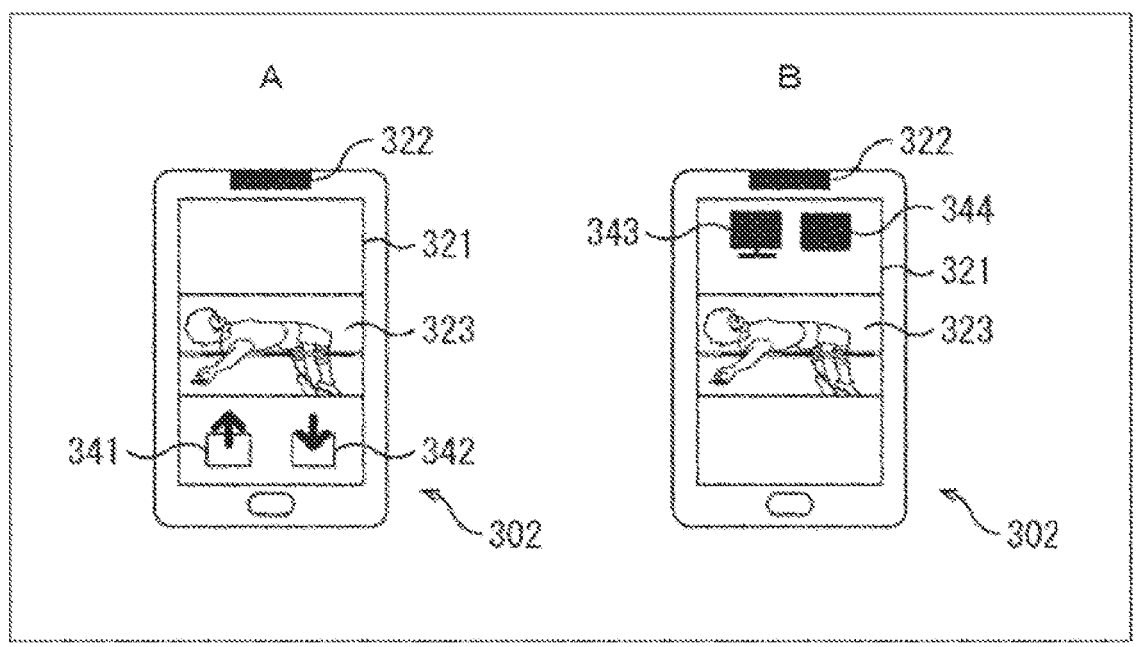
FIG. 39 is a diagram showing an example of an associated expression with a Wi-Fi device.

When a user performs a predetermined operation decided in advance such as tapping the display 321 of the mobile terminal 302, a throw-catch instruction screen as shown in A of FIG. 39 is displayed on the display 321. On the throw-catch instruction screen, a throw selection icon 341 that is operated when a throw process is executed and a catch selection icon 342 that is operated when a catch process is executed are displayed.

When the content image 323 reproduced and displayed in the mobile terminal 302 is to be thrown, the user taps (selects) the throw selection icon 341 displayed on the display 321.

When the throw selection icon 341 is tapped and a throw (process) is selected, a TV icon 343 corresponding to the TV 1 and a tablet icon 344 corresponding to the tablet terminal 301 are displayed on the display 321 of the mobile terminal 302 as throw destination candidates as shown in B of FIG. 39.

When the user taps and selects any of the TV icon 343 or the tablet icon 344 displayed in the mobile terminal 302 as a throw destination, the content image 323 reproduced and displayed in the mobile terminal 302 is thrown to the TV 1 or the tablet terminal 301.

Figure 40:
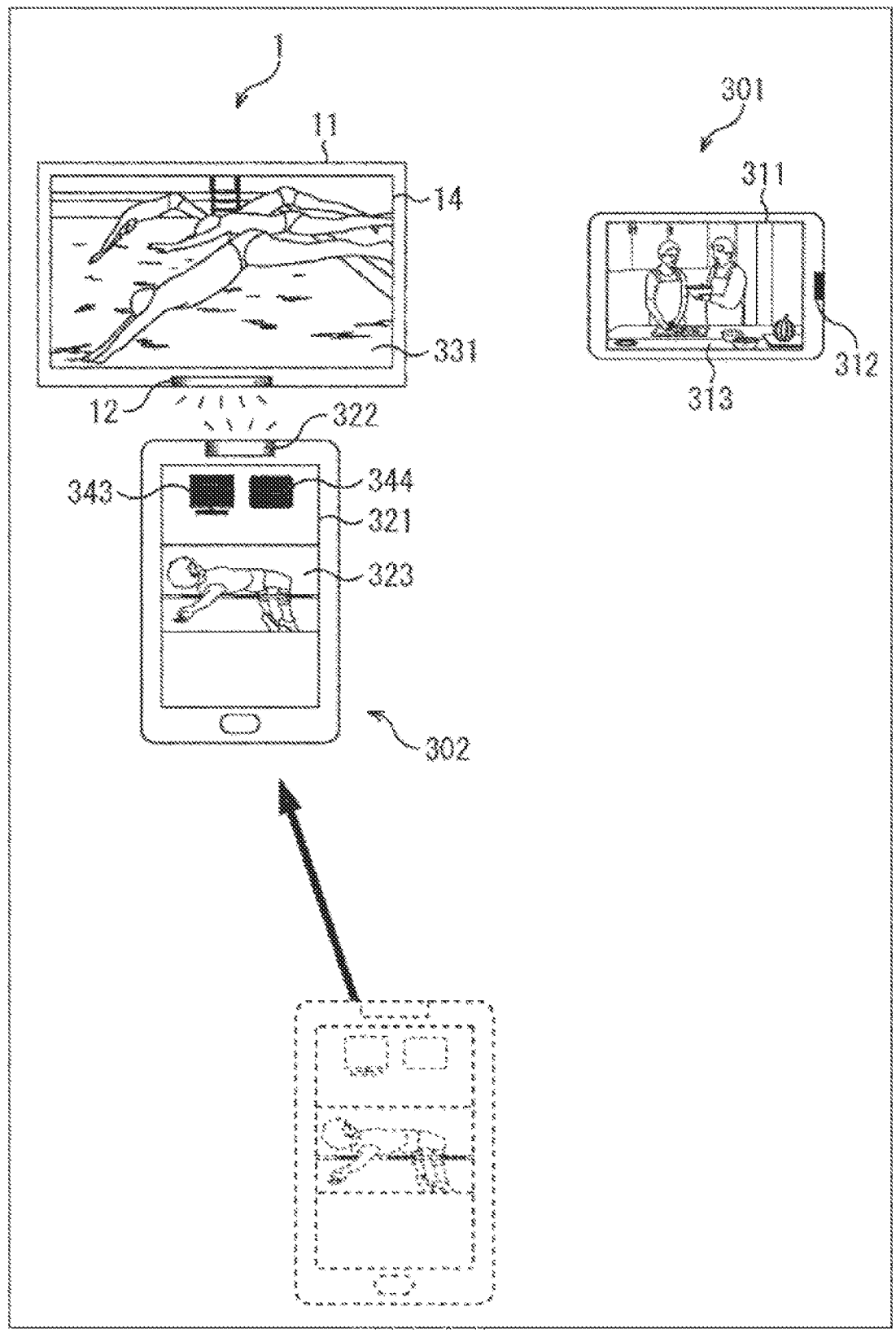
FIG. 40 is a diagram showing an example of an associated expression with a Wi-Fi device.

In addition, in the state in which the throw destination selection screen shown in B of FIG. 39 is displayed on the display 321 of the mobile terminal 302, the user brings the mobile terminal 302 that he or she is holding close to the smart unit 12 of the TV 1 as a throw destination as shown in FIG. 40. Then, the TV 1 and the mobile terminal 302 detect mutual proximity using NFC communication, the TV 1 is selected as a throw destination, and the content image 323 reproduced and displayed in the mobile terminal 302 is thrown to the TV 1.

In the throw process, the associated expression of the display 14 and the LED indicator 84 of the TV 1 described with reference to FIG. 37 is executed between the TV 1 as a throw destination and the mobile terminal 302.

On the other hand, even when the catch selection icon 342 is tapped to select a catch (process) on the throw-catch instruction screen shown in A of FIG. 39, the same catch destination selection screen as B of FIG. 39 is displayed on the display 321 of the mobile terminal 302. Then, according to tapping of the TV icon 343 or the tablet icon 344, or proximity of the mobile terminal 302, a DLNA-certified device that is a catch target is designated. As a result, a content image is input from the designated DLNA-certified device and then displayed on the display 321 of the mobile terminal 302.

Figure 41:
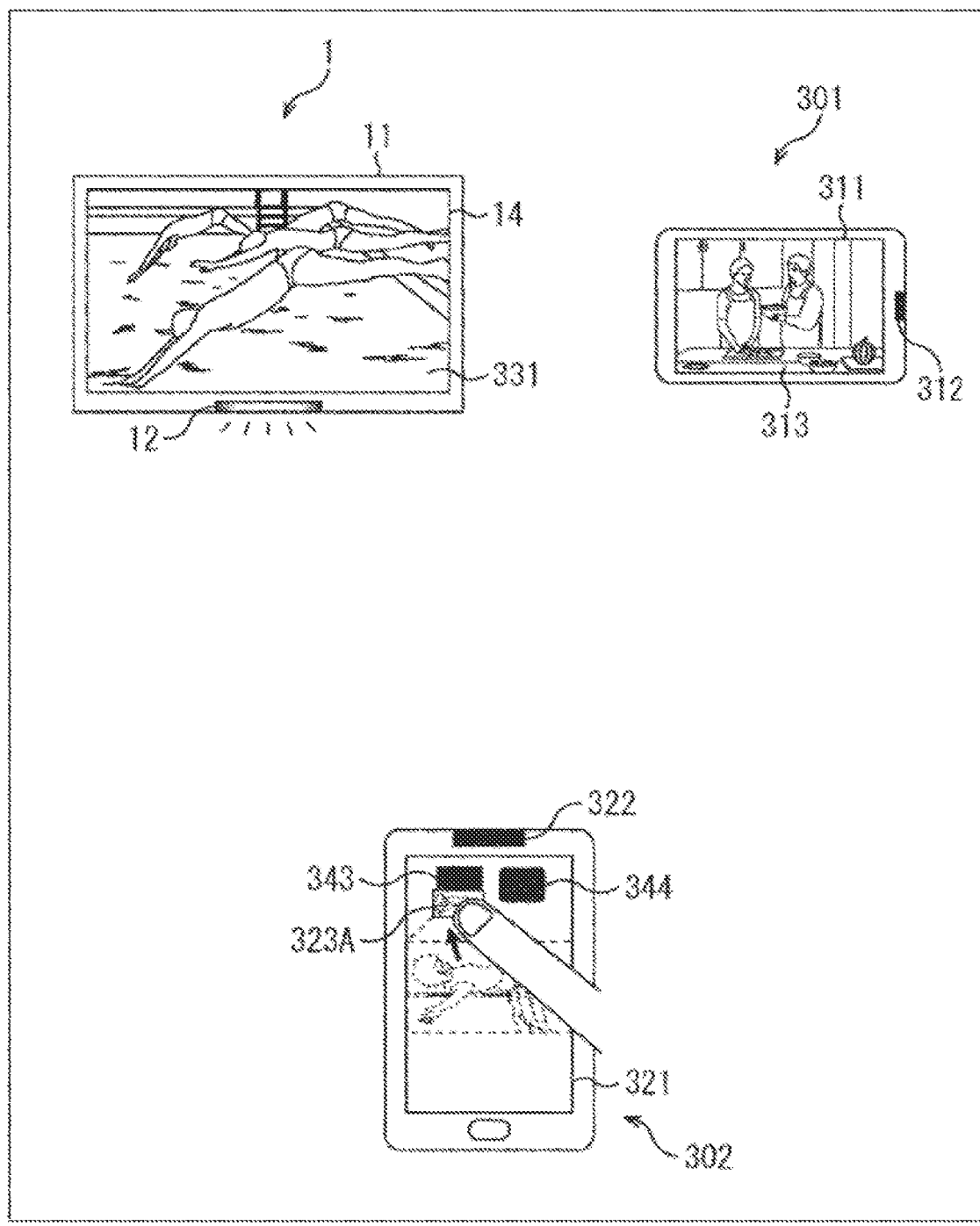
FIG. 41 is a diagram showing an example of an associated expression with a Wi-Fi device.
Figure 42:
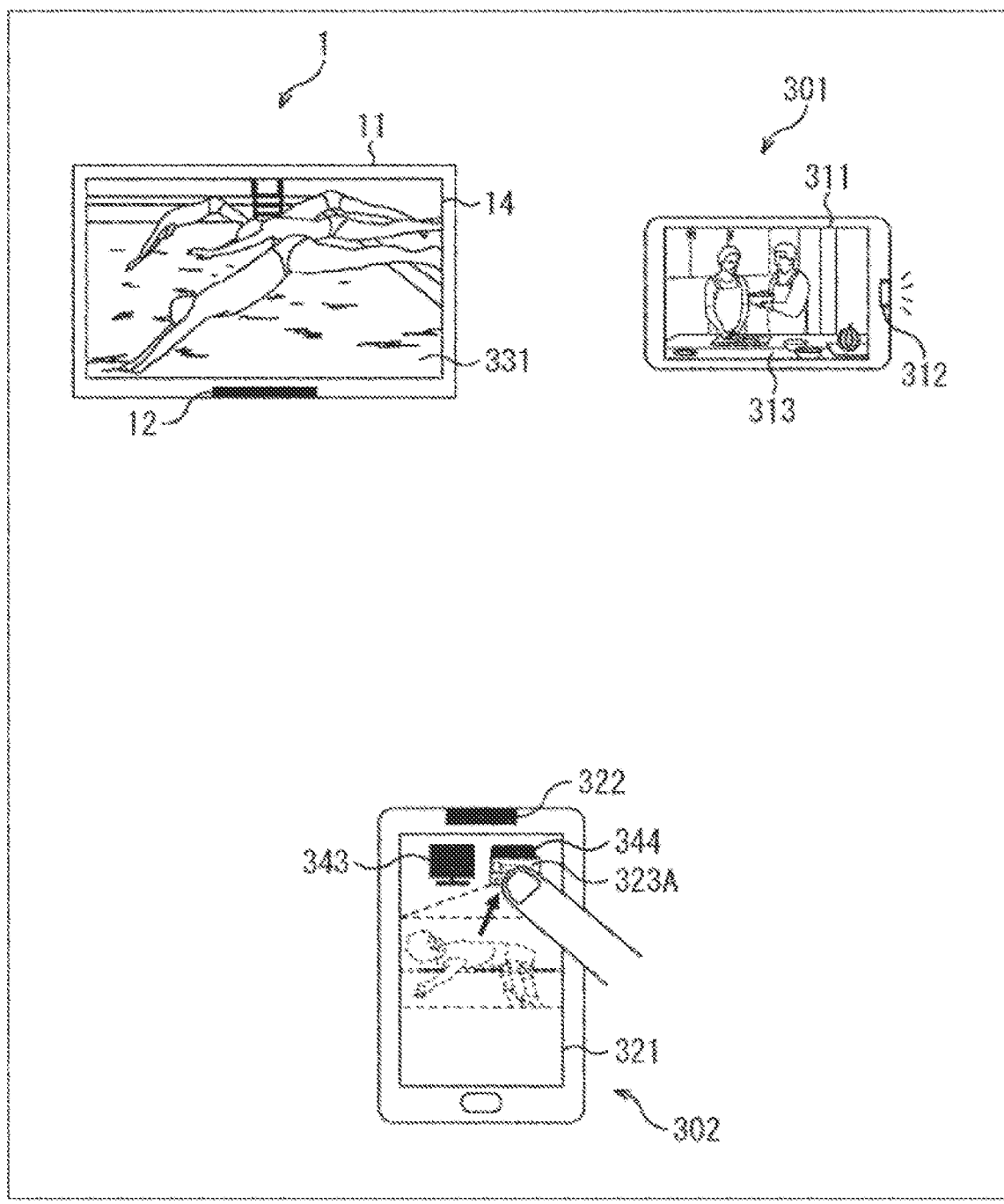
FIG. 42 is a diagram showing an example of an associated expression with a Wi-Fi device.

FIGS. 41 and 42 are diagrams for describing another operation method of associated communication.

In the mobile terminal 302, the TV 1 or the mobile terminal 302 can be designated as a throw destination by performing an operation of dragging the content image 323 displayed on the display 321 in the upward direction of the drawing from the state of the mobile terminal 302 in which the throw destination selection screen of B of FIG. 39 is displayed, and then separating a finger on the TV icon 343 or the tablet icon 344.

At this moment, when a content image 323A that is a reduced image of the content image 323 is in a state of being superimposed on the TV icon 343 after the dragging as shown in FIG. 41, the LED indicator 84 of the smart unit 12 of the TV 1 corresponding to the TV icon 343 is lit in a predetermined cycle. In other words, the mobile terminal 302 causes the LED indicator 84 of the smart unit 12 to be lit in the predetermined cycle by transmitting a control signal indicating the selection to the TV 1 that has been selected as a throw destination as the content image 323A is in the state of being superimposed on the TV icon 343.

On the other hand, when a content image 323A that is a reduced image of the content image 323 is in a state of being superimposed on the tablet icon 344 after the dragging as shown in FIG. 42, the LED lamp 312 of the tablet terminal 301 corresponding to the tablet icon 344 is lit in a predetermined cycle. In other words, the mobile terminal 302 causes the LED indicator 84 of the smart unit 12 to be lit in the predetermined cycle by transmitting a control signal indicating the selection to the tablet terminal 301 that has been selected as a throw destination as the content image 323A is in the state of being superimposed on the tablet icon 344.

In this manner, the TV 1 and the tablet terminal 301 emit light in the predetermined cycle when they are selected as an output destination of the content image 323 by the mobile terminal 302. Accordingly, the user can easily recognize a device that is a throw destination (output destination of content data).

Figure 43:
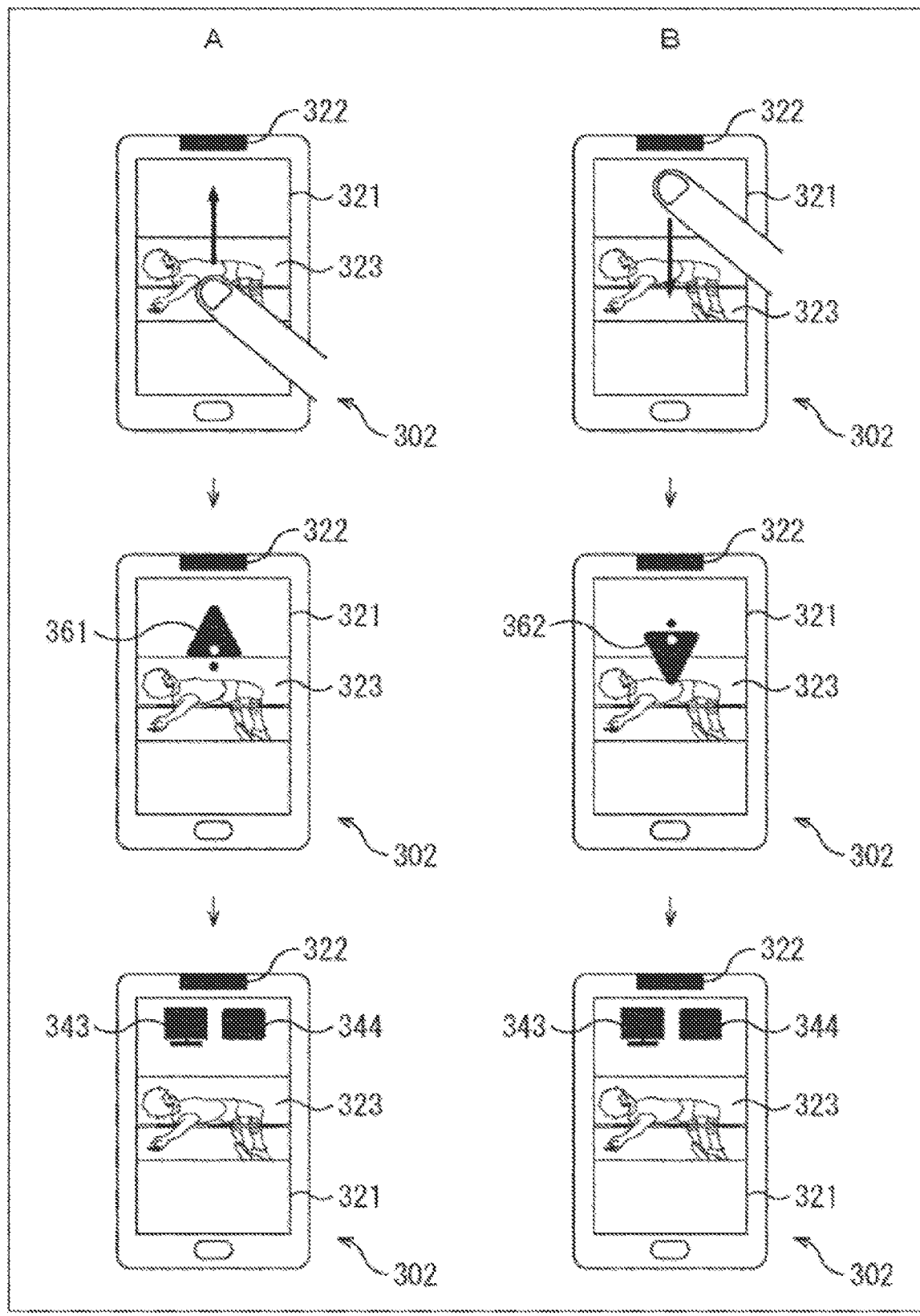
FIG. 43 is a diagram showing an example of an associated expression with a Wi-Fi device.

FIG. 43 is a diagram for describing still another operation method of the associated communication.

In the state of the mobile terminal 302 reproducing and displaying the content image 323 as shown in FIG. 38, the user drags a surface of the display 321 of the mobile terminal 302 in the upward direction of FIG. 43 as shown in A of the drawing. When the dragging operation of the user in the upward direction is detected, the mobile terminal 302 recognizes that a throw command has been instructed and causes a throw icon 361 indicating a throw operation to be displayed on the display 321 in a superimposed manner. Then, the same throw destination selection screen as in B of FIG. 39 is displayed on the display 321.

On the other hand, the user drags a surface of the display 321 of the mobile terminal 302 in the downward direction of FIG. 43 as shown in B of the drawing. When the dragging operation of the user in the downward direction is detected, the mobile terminal 302 recognizes that a catch command has been instructed and causes a catch icon 362 indicating a catch operation to be displayed on the display 321 in a superimposed manner. Then, the same catch destination selection screen as in B of FIG. 39 is displayed on the display 321.

An operation after the throw destination or catch destination selection screen is displayed will be omitted since the operation is the same as the example described above.

Figure 44:
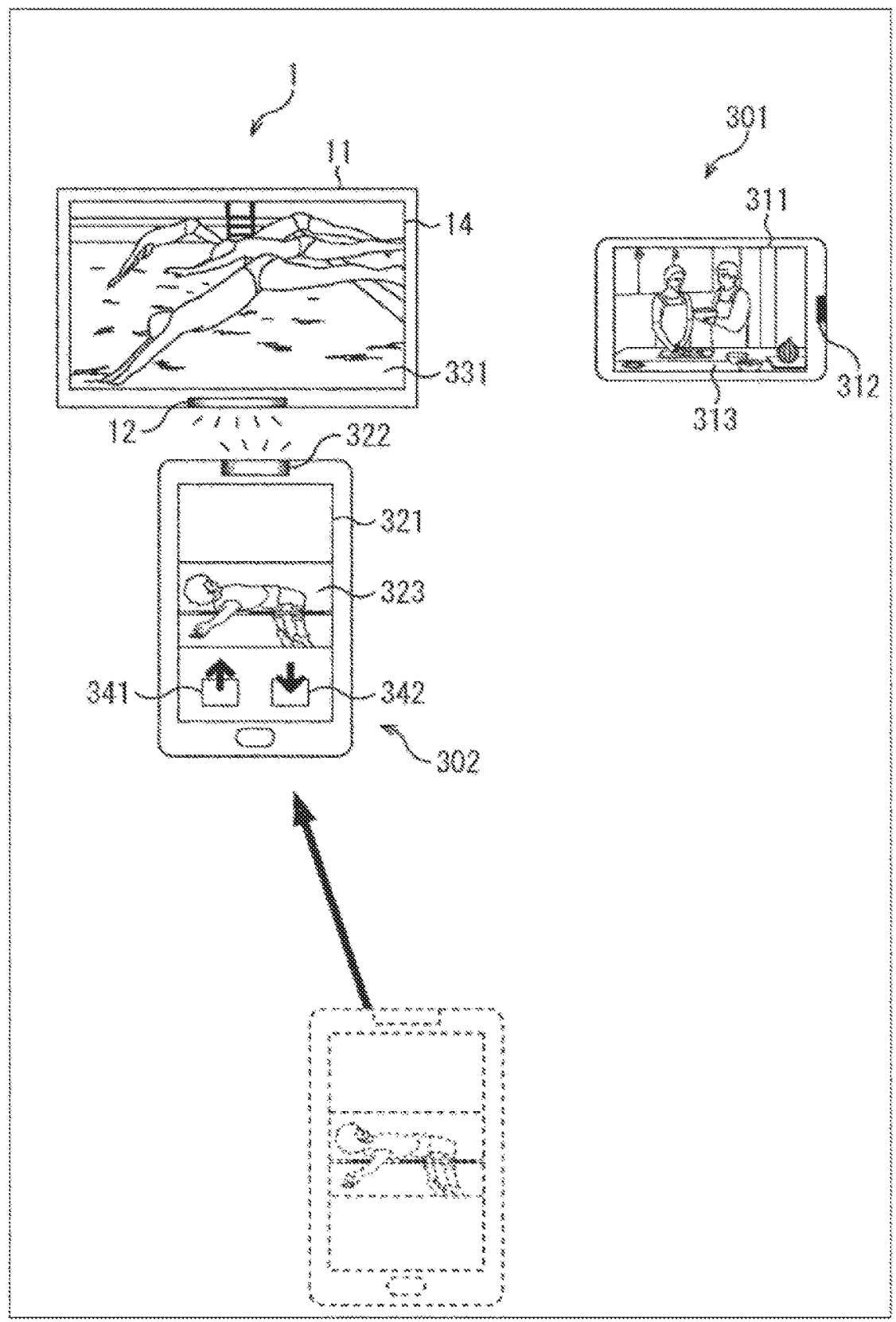
FIG. 44 is a diagram showing an example of an associated expression with a Wi-Fi device.

FIG. 44 is a diagram for describing still another operation method of the associated communication.

In the state of the mobile terminal 302 reproducing and displaying the content image 323 as shown in FIG. 38, the user brings the mobile terminal 302 that he or she is holding close to the smart unit 12 of the TV 1 that serves as an associated communication destination as shown in FIG. 44. Then, the TV 1 and the mobile terminal 302 detect mutual proximity using NFC communication. Then, the LED indicator 84 of the smart unit 12 of the TV 1 and the LED lamp 322 of the mobile terminal 302 are lit in a synchronized manner.

At the same time, the mobile terminal 302 causes the same associated communication selection screen as in A of FIG. 39 to be displayed on the display 321. When the throw selection icon 341 is tapped (selected) on the associated communication selection screen, the content image 323 reproduced and displayed in the mobile terminal 302 is thrown to the TV 1. On the other hand, when the catch selection icon 342 is tapped (selected) on the associated communication selection screen, the content image 331 reproduced and displayed in the TV 1 is caught by the mobile terminal 302 from the TV 1, and then displayed on the display 321 of the mobile terminal 302.

Figure 45:
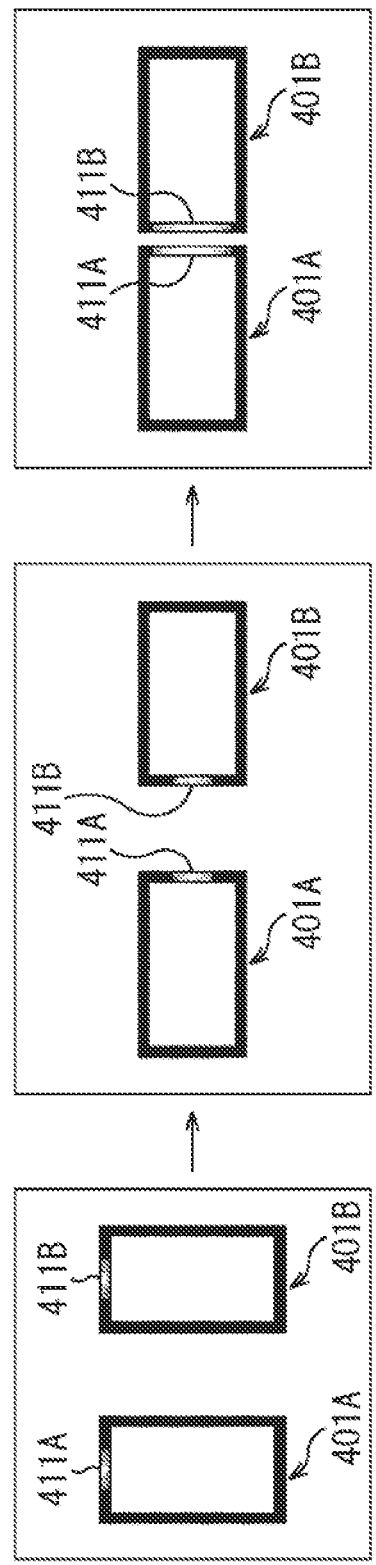
FIG. 45 is a diagram showing an example of an associated expression with a Wi-Fi device.
Figure 46:
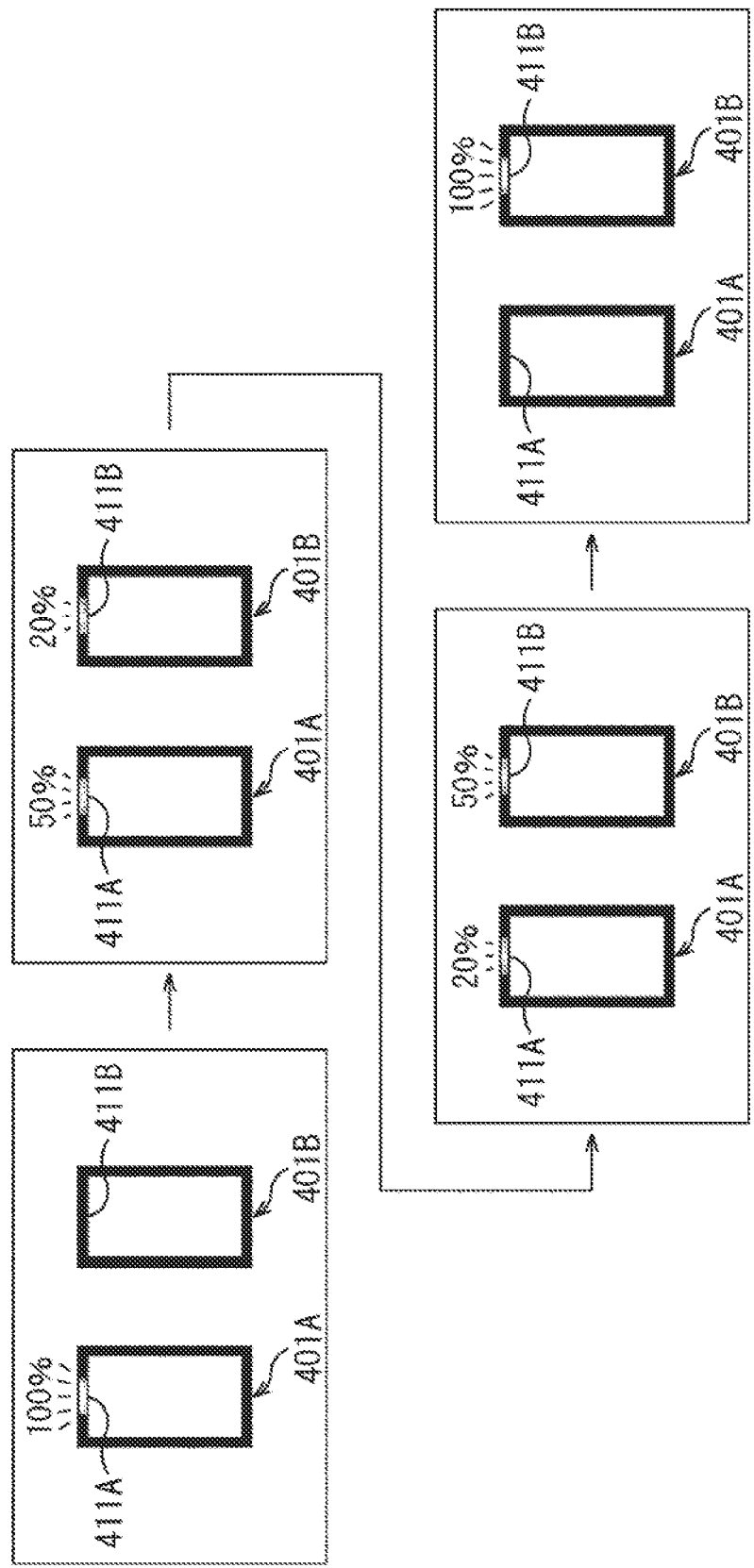
FIG. 46 is a diagram showing an example of an associated expression with a Wi-Fi device.

Two communication devices 401 (401A and 401B) of FIGS. 45 and 46 are devices with the same functions as the TV 1, the tablet terminal 301, and the mobile terminal 302 described above having LED indicators 411 (411A and 411B).

When associated communication such as catch and throw is started between the communication devices 401A and 401B by bringing the two communication devices 401A and 401B into proximity with each other, a user can easily ascertain which parts of the devices should be brought close to each other by first setting the LED indicator 411A of the communication device 401A and the LED indicator 411B of the communication device 401B to be lit as shown in FIG. 45.

Then, when the user brings a periphery of the lightening LED indicator 411A of the communication device 401A close to a periphery of the LED indicator 411B of the communication device 401B, the communication device 401A and the communication device 401B detect (recognize) each other. When the communication device 401A and the communication device 401B detect each other, the devices are lit in the same lighting method. For example, the LED indicator 411A of the communication device 401A and the LED indicator 411B of the communication device 401B blink at the same time. Accordingly, the user can easily recognize that the communication device 401A and the communication device 401B have recognized each other. Instead of changing a light emission luminance, a color or a shape of a lighting portion may be changed.

In addition, during communication of data, lighting of the LED indicator 411A of the communication device 401A and the LED indicator 411B of the communication device 401B is controlled so as to make transitions of light corresponding to movement of the data as shown in FIG. 46. In other words, control in which the LED indicator 411A of the communication device 401A that is a data transfer source is first lit at a high luminance, and then the LED indicator 411B of the communication device 401B that is a transfer destination is lit at a high luminance when the LED indicator 411A turns off can be repeatedly executed in a predetermined unit of data. Accordingly, the user can instantaneously recognize exchange of data between the communication devices 401A and 401B. Alternatively, the LED indicator 411A of the communication device 401A and the LED indicator 411B of the communication device 401B may perform lighting such that light is repeatedly turned on and off at the same timing.

[11. Flowchart for Realizing an Associated Expression]

Figure 47:
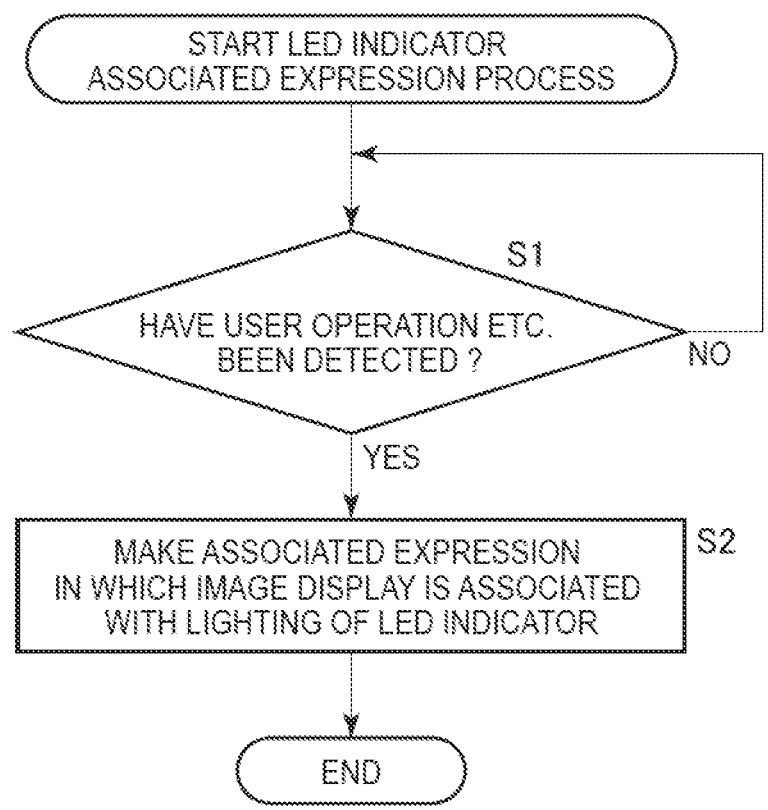
FIG. 47 is a flowchart for describing a process for realizing an associated expression.

FIG. 47 is a flowchart of a process performed by the TV 1 to realize an associated expression between an image display of the display 14 and lighting of the LED indicator 84 described above.

In the process, first in Step S1, the control unit 66 of the TV 1 determines whether or not an operation of a user and the like have been detected, as a trigger to perform an associated expression. The operation of the user and the like correspond to various kinds of operations or device states including a button operation of the remote controller described above, a user operation using a gesture, proximity of another communication device to the smart unit 12, reception of a message requesting associated communication, and the like.

The process of Step S1 is repeated until the operation of the user and the like are determined to be detected, and when the operation of the user and the like are determined to be detected in Step S1, the process proceeds to Step S2. Then, in Step S2, the control unit 66 of the TV 1 makes an associated expression in which an image display of the display 14 is associated with lighting of the LED indicator 84 as described above.

Although associated expressions mainly made by the TV 1 have been described in the above examples, the present technology can be applied to image display units such as LCD or EL (Electro Luminescence) displays of mobile terminals like smartphones, tablet terminals, and the like, and overall display devices with indicators (lighting parts) like LEDs indicating predetermined operations and states using illumination, in addition to television receiver sets.

An embodiment of the present technology is not limited to the above-described embodiments, and can be variously modified within the scope not departing from the gist of the present technology.

Additionally, the present technology may also be configured as below.

(1)

A display device including:

an indicator unit disposed at least in a part of a periphery of a display unit and including an indicator configured to be lit at a predetermined luminance; and an indicator control unit configured to control lighting of the indicator, wherein the indicator control unit performs control such that a lighting method of the indicator is changed according to passage of time.

(2)

The display device according to (1), wherein, when a predetermined setting operation is performed with respect to the display device, the indicator control unit performed control such that a light emission luminance of the indicator is set to be a first luminance and then gradually changes to a second luminance different from the first luminance.

(3)

The display device according to (1) or (2), wherein the indicator control unit performs control such that a lighting color of the indicator turns into a color according to a type of information.

(4)

The display device according to any one of (1) to (3), wherein the indicator control unit causes the lighting method of the indicator to be changed according to passage of time in synchronization with an image of the display unit that is an image which appears to be absorbed by the indicator unit or an image which appears to be discharged from the indicator unit.

(5)

The display device according to any one of (1) to (4), wherein the indicator unit at least includes a first indicator and a second indicator of which lighting positions are different, wherein a display control unit configured to cause an image causing a user to recognize first information corresponding to the first indicator and second information corresponding to the second indicator to be displayed on the display unit is further included, and wherein the indicator control unit causes the first information to be indicated by causing the first indicator to be lit and causes the second information to be indicated by causing the second indicator to be lit.

(6)

The display device according to any one of (1) to (5), further including:

a display control unit configured to cause an image causing a user to recognize first information corresponding to a first blinking pattern of the indicator and second information corresponding to a second blinking pattern thereof to be displayed on the display unit, wherein the indicator control unit causes the first information to be indicated by causing the indicator to be lit in the first blinking pattern and causes the second information to be indicated by causing the indicator to be lit in the second blinking pattern.

(7)

The display device according to any one of (1) to (6), further including:

a display control unit configured to cause an image causing a user to recognize first information corresponding to a first lighting color of the indicator and second information corresponding to a second lighting color thereof to be displayed on the display unit, wherein the indicator control unit causes the first information to be indicated by causing the indicator to be lit in the first lighting color and causes the second information to be indicated by causing the indicator to be lit in the second lighting color.

(8)

A display control method of a display device including an indicator unit disposed at least in a part of a periphery of a display unit and including an indicator configured to be lit at a predetermined luminance and an indicator control unit configured to control lighting of the indicator, the method including:

performing control such that a lighting method of the indicator is changed according to passage of time by the indicator control unit.

(9)

A program causing a computer configured to control a display device including an indicator unit disposed at least in a part of a periphery of a display unit and including an indicator configured to be lit at a predetermined luminance, to execute a process of:

performing control such that a lighting method of the indicator is changed according to passage of time.

(10)

A display device including:

an indicator unit disposed at least in a part of a periphery of a display unit and including an indicator configured to be lit at a predetermined luminance; and an indicator control unit configured to control lighting of the indicator, wherein the indicator control unit sets a light emission luminance of the indicator to be a first luminance and then gradually changes the light emission luminance to a second luminance different from the first luminance.

(11)

The display device according to (10), wherein the indicator control unit causes a lighting color of the indicator to turn into a color corresponding to a function being currently operated.

(12)

The display device according to (10) or (11), wherein the indicator control unit changes a light emission luminance of the indicator from the first luminance to the second luminance before or after an image in which a peripheral region of the indicator is set to have a high luminance is displayed on the display unit.

(13)

A display control method of a display device including an indicator unit disposed at least in a part of a periphery of a display unit and including an indicator configured to be lit at a predetermined luminance and an indicator control unit configured to control lighting of the indicator, the method including:

setting a light emission luminance of the indicator to be a first luminance and then gradually changing the light emission luminance to a second luminance different from the first luminance by the indicator control unit.

(14)

A program causing a computer configured to control a display device configured to include an indicator unit disposed at least in a part of a periphery of a display unit and including an indicator configured to be lit at a predetermined luminance, to execute a process of:

setting a light emission luminance of the indicator to be a first luminance and then gradually changing the light emission luminance to a second luminance different from the first luminance.

REFERENCE SIGNS LIST 1 television receiver set
11 display main body
12 smart unit
14 display
15 frame part
66 control unit
84 LED indicator
85 touch sensor
87 Wi-Fi communication unit
88 NFC communication unit
89 BT communication unit
93 camera
101 AV signal processing section
102 communication control section
103 LED control section
104 camera control section

The invention claimed is:

1. A display device comprising:
a display area;
an indicator unit disposed at least in a part of a periphery of a display unit and including at least first and second indicators configured to be lit, the first indicator providing light in a spot shape from one light source being lit and located closer to a user viewing a display area than the second indicator providing light in a stripe shape from one or more light sources being lit and the one light source being lit; and
an indicator control unit configured to control lighting of the first and second indicators,
wherein the indicator control unit is configured to cause a lighting method of the first or second indicator to be changed in accordance with a function of the display device accessed via the display area, and wherein the display device is configured to display information within the display area based on an individual in an image captured by a camera associated with the display device.

2. The display device according to claim 1, wherein, when a predetermined setting operation is performed with respect to the display device, the indicator control unit is configured to perform control such that a light emission luminance of the first or second indicator is set to be a first luminance and then changes to a second luminance different from the first luminance.

3. The display device according to claim 1, wherein the indicator control unit is configured to perform control such that a lighting color of the first or second indicator turns into a color according to a type of information.

4. The display device according to claim 1, wherein lighting positions of the first indicator and of the second indicator are different, and wherein the indicator control unit causes first information to be indicated by causing the first indicator to be lit and causes second information to be indicated by causing the second indicator to be lit.

5. The display device according to claim 1, wherein the indicator control unit is configured to cause first information to be indicated by causing the first indicator to be lit in a first blinking pattern and cause second information to be indicated by causing the first or second indicator to be lit in a second blinking pattern.

6. The display device according to claim 1, wherein the indicator control unit is configured to cause first information to be indicated by causing the first indicator to be lit in a first lighting color and cause second information to be indicated by causing the first or second indicator to be lit in a second lighting color.

7. The display device according to claim 1, wherein the function of the display accessed via the display area comprises one or more of a timer function, a recording function and a video chatting function.

8. The display device according to claim 7, wherein the display area includes a slave screen area in which a light emission luminance of the slave screen area changes according to the passage of time associated with the timer function.

9. The display device according to claim 1, wherein the information comprises one or more of a train route and traffic information.

10. The display device of claim 1, wherein the display device includes a front side comprising the display area and the first indicator is positioned within the indicator unit closer to the front side of the display device than the second indicator.

11. The display device of claim 10, wherein the first indicator comprises a white LED and the second indicator comprises a color LED.

12. The display device of claim 1, wherein indicator control unit causes the lighting method to be changed in accordance with the function of the display device using spot shaped light of the first indicator and striped shaped light of the second indicator.

13. A display control method of a display device including a display area, an indicator unit disposed at least in a part of a periphery of a display unit, the indicator unit including a first indicator and a second indicator, each configured to be lit, and an indicator control unit configured to control lighting of the first and second indicators, the method comprising:
  causing a lighting method of the first and second indicators to be changed in accordance with a function of the display device accessed via the display area by changing a spot shape lighting pattern associated with the first indicator or stripe shaped lighting pattern associated with the second indicator;
  causing the spot shaped lighting pattern by lighting one light source located closer to a user viewing a display area than the second indicator;
  causing the stripe shaped lighting pattern by lighting one or more light sources and the one light source;
  capturing an image of an individual using a camera; and
  controlling display of content on the display device based on the image of the individual captured using the camera.

14. A non-transitory computer readable storage medium having stored thereon a program causing a computer configured to control a display device including a display area, an indicator unit disposed at least in a part of a periphery of a display unit, the indicator unit including first and second indicators configured to be lit, to execute a process of:
  causing a lighting method of the first and second indicators to be changed in accordance with a function of the display device accessed via the display area by changing a spot shape lighting pattern associated with the first indicator or stripe shaped lighting pattern associated with the second indicator;
  causing the spot shaped lighting pattern by lighting one light source located closer to a user viewing a display area than the second indicator;
  causing the stripe shaped lighting pattern by lighting one or more light sources and the one light source;
  capturing an image of an individual using a camera; and
  controlling display of content on the display device based on the image of the individual captured using the camera.

* * * * *